United States Patent
Ohori et al.

(10) Patent No.: US 12,430,525 B2
(45) Date of Patent: Sep. 30, 2025

(54) CODE READER

(71) Applicant: Keyence Corporation, Osaka (JP)

(72) Inventors: Hiroomi Ohori, Osaka (JP); Taichi Tajika, Osaka (JP); Hideaki Miyoshi, Osaka (JP); Hiroyuki Morita, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/791,473

(22) Filed: Aug. 1, 2024

(65) Prior Publication Data

US 2025/0086415 A1    Mar. 13, 2025

(30) Foreign Application Priority Data

Sep. 8, 2023  (JP) .................. 2023-146166
Sep. 8, 2023  (JP) .................. 2023-146172
Jan. 26, 2024 (JP) .................. 2024-010537
Jan. 26, 2024 (JP) .................. 2024-010547

(51) Int. Cl.
*G06K 7/14* (2006.01)

(52) U.S. Cl.
CPC .................. *G06K 7/1404* (2013.01)

(58) Field of Classification Search
CPC ........... G06K 7/10821; G06K 7/10861; G06K 7/1096; G06K 7/1404
See application file for complete search history.

(56) References Cited

U.S. PATENT DOCUMENTS

| | | | |
|---|---|---|---|
| 6,783,068 B2 | 8/2004 | Hecht | |
| 7,243,850 B2 * | 7/2007 | Tamburrini | G06K 7/109 235/462.25 |
| 2011/0127333 A1 * | 6/2011 | Veksland | G06K 7/1096 235/462.24 |
| 2013/0292470 A1 | 11/2013 | Shearin et al. | |
| 2024/0242045 A1 | 7/2024 | Ohori et al. | |
| 2024/0242047 A1 | 7/2024 | Ohori et al. | |

OTHER PUBLICATIONS

U.S. Appl. No. 18/988,975 (3110-440) filed Dec. 20, 2024 (63 pages).

* cited by examiner

*Primary Examiner* — Thien M Le
*Assistant Examiner* — April A Taylor
(74) *Attorney, Agent, or Firm* — Kilyk & Bowersox, P.L.L.C.

(57) ABSTRACT

A code reader includes an illumination section, an imaging unit having a Scheimpflug optical system, a control unit that executes decoding processing on the code attached to a workpiece based on an image output from the imaging unit, and a housing that stores the illumination section, the imaging unit, and the control unit and has a light receiving window. The light receiving window is provided on the first side surface of the housing, and has a short side extending in a lateral direction and a long side, longer than the short side, extending in a longitudinal direction. A plane formed by the light receiving window intersects a plane formed by the focal plane of the Scheimpflug optical system. The illumination section is disposed adjacent to the light receiving window in the lateral direction of the light receiving window.

14 Claims, 37 Drawing Sheets

CODE READER

CROSS-REFERENCE TO RELATED APPLICATIONS

The present application claims foreign priority based on Japanese Patent Application No. 2023-146166, filed Sep. 8, 2023, No. 2023-146172, filed Sep. 8, 2023, No. 2024-010537, filed Jan. 26, 2024, and No. 2024-010547, filed Jan. 26, 2024, the contents of which are incorporated herein by references.

BACKGROUND OF THE INVENTION

1. Technical Field

The disclosure relates to a code reader that reads a code attached to a workpiece conveyed by a conveyance device.

2. Description of the Related Art

This type of code reader is used, for example, in a case where a code attached to a workpiece conveyed by a conveyance device is read at a distribution site or the like. The code reader disclosed in US 2013/0292470 A is configured to be able to read a code attached to a bottom surface of a workpiece, and a gap of a conveyance device is used to read the code. That is, in a case where the conveyance device includes a plurality of conveyors, a gap is formed between the conveyors arranged in the conveyance direction. By installing the code reader upward immediately below the gap between the conveyors, when the workpiece being conveyed passes through the gap between the conveyors, the code reader irradiates the bottom surface of the workpiece with illumination light and receives reflected light reflected from the bottom surface, whereby a code image can be generated.

The workpieces are sorted or the like on the basis of information obtained by decoding the code regions of the generated code image.

In a distribution site, it is desired to further increase the moving speed of the workpiece conveyed by the conveyance device. However, when the moving speed of the workpiece is increased, the exposable time when the code reader captures an image of the code is shortened, so that it is a problem to secure the brightness of the image.

SUMMARY OF THE INVENTION

The disclosure has been made in view of such a point, and an object thereof is to speed up decoding processing by obtaining an image with brightness necessary for decoding processing.

In order to achieve the above object, in the present aspect, a code reader that reads a code attached to a workpiece conveyed by a conveyance device can be assumed. A code reader includes: an illumination section that irradiates a workpiece with illumination light; an imaging unit that includes a Scheimpflug optical system including a lens for condensing reflected light from a code attached to a workpiece and an image sensor having a light receiving surface inclined with respect to an optical axis of the lens, and that generates and outputs an image based on an amount of light received by the light receiving surface; a control unit that executes decoding processing on the code attached to the workpiece based on an image output from the imaging unit; and a housing that stores the illumination section, the imaging unit, and the control unit, and has a light receiving window for transmitting the reflected light to an inside.

The light receiving window is provided on the first side surface of the housing, and has a short side extending in a lateral direction and a long side, longer than the short side, extending in a longitudinal direction. A plane formed by the light receiving window intersects a plane including a focal plane formed by the Scheimpflug optical system so as to extend from a near side to a far side of the imaging unit, and the illumination section is disposed adjacent to the light receiving window in the lateral direction when viewed in a direction facing the light receiving window.

According to this configuration, for example, when the housing is installed such that the range of the depth of field of the Scheimpflug optical system includes the gap of the conveyance device, the longitudinal direction of the light receiving window is made to correspond to the longitudinal direction of the gap of the conveyance device, whereby an image of the code attached to the workpiece through the gap can be captured. At this time, since the illumination section is adjacent in the lateral direction of the light receiving window, the illumination optical axis and the optical axis of the lens of the imaging unit are close to each other, and the visual field range of the imaging unit is brightly illuminated by the illumination section. As a result, an image with brightness necessary for decoding processing is obtained.

The illumination section may include a near illumination section having an optical axis intersecting the focal plane on the near side with respect to the far side of the focal plane and a far illumination section having an optical axis intersecting the focal plane on the far side with respect to the near side of the focal plane. In this case, a region where the illumination light of the near illumination section and the illumination light of the far illumination section overlap with each other on the focal plane may be unevenly distributed on the far side rather than the near side, or a light flux of the far illumination section may be larger than a light flux of the near illumination section.

An angle of an optical axis of the near illumination section with respect to the focal plane may be larger than an angle of an optical axis of the far illumination section with respect to the focal plane, the near illumination section and the far illumination section may be arranged adjacent to each other in an inward direction of the housing from the first side surface, and the near illumination section may be arranged on a first side surface side.

The housing may further include a lower surface adjacent to the first side surface, an inclination angle of a far light emitting substrate of the far illumination section with respect to the lower surface may be larger than an inclination angle of a near light emitting substrate of the near illumination section with respect to the lower surface, and the far light emitting substrate may be disposed above the near light emitting substrate with reference to the lower surface.

The housing may further include a partition member that is disposed between the illumination section and the imaging unit and optically separates the illumination section from the imaging unit. As a result, stray light caused by the illumination light can be prevented from entering the lens of the imaging unit, so that the image becomes clearer.

The code reader may further include a heat dissipation portion. In this case, since the heat dissipation portion is provided adjacent to the illumination section of the housing and can be thermally connected to the illumination section, heat of the illumination section can efficiently flee to the outside.

The heat dissipation portion may be disposed on a second side surface adjacent to the first side surface of the housing. In addition, the illumination section may include a light emitting substrate on which one or more light emitting elements are arranged, and the code reader may further include a support member that supports the light emitting substrate, extends in a direction intersecting the second side surface, and has thermal conductivity. The support member can be thermally connected to the light emitting substrate and the heat dissipation portion. That is, by providing the heat dissipation member on the second side surface side of the housing, the illumination light can be emitted from the first side surface side while securing a wide area that can be used for heat dissipation and enhancing the heat dissipation effect.

The code reader may further include an internal reflection member that is stored in the housing and turns back light incident on the imaging unit. In this case, the imaging unit may be disposed near one end in the longitudinal direction in the housing, and the illumination section and the internal reflection member may be disposed near the other end in the longitudinal direction in the housing. As a result, it is possible to bring the optical axis of the lens of the imaging unit close to the illumination optical axis while separating the imaging unit from the illumination section that easily generates heat. In addition, by turning back the light incident on the imaging unit, the optical path length can also be lengthened, so that the visual field is widened.

The code reader may further include a connector portion connected to the outside. In this case, since the illumination section and the internal reflection member can be arranged between the light receiving window and the connector portion, a compact housing can be realized by arranging the illumination section and the internal reflection member close to the light receiving window and providing the connector portion on the back side thereof.

The code reader may further include a communication unit that receives a dimension of a gap (a width of the gap) formed between a plurality of conveyance mechanisms included in the conveyance device and a conveyance speed of the conveyance device. In this case, the control unit can determine the frame rate of the imaging unit based on the dimension of the gap and the conveyance speed. As a result, in a case where the composite image is generated based on the plurality of images output from the imaging unit, the frame rate that can be combined can be determined from the conveyance condition. The gap of the conveyance mechanism and the conveyance speed may be directly input by the user or may be received as an instruction signal from another system.

The image sensor may include a plurality of imaging elements arranged in a row direction and a column direction, and the row direction may correspond to a direction from the near side to the far side of a focal plane of the Scheimpflug optical system. In this case, the aspect ratio of the image sensor is made smaller than the aspect ratio of the light receiving window, and the image sensor can partially output a signal from an imaging element in a row corresponding to the light receiving window among the plurality of imaging elements. That is, assuming a case where a line sensor is used as an image sensor, high-speed reading is possible, but there is a risk that the frame rate becomes extremely high in order to read a code, and the calorific value of the illumination section increases. In this regard, an area sensor in which a plurality of imaging elements is arranged in the row direction and the column direction is used as the image sensor, and only a portion (a partial row) corresponding to the light receiving window is partially read, so that it is possible to achieve both heat generation suppression and high-speed reading.

As described above, since the illumination section is arranged adjacent to the lateral direction of the light receiving window through which the reflected light from the code attached to the workpiece passes, the illumination optical axis and the optical axis of the lens of the imaging unit are brought close to each other, and the visual field range of the imaging unit can be brightly illuminated by the illumination section. As a result, even in a case where an image of a workpiece moving at a high speed is captured, an image having brightness necessary for decoding processing can be obtained, and the decoding processing can be speeded up.

DETAILED DESCRIPTION

Hereinafter, embodiments of the invention will be described in detail with reference to the drawings. It is to be noted that the following description of preferred embodiments is merely exemplary in nature and is not intended to limit the invention, its application, or its use.

Figure 1:
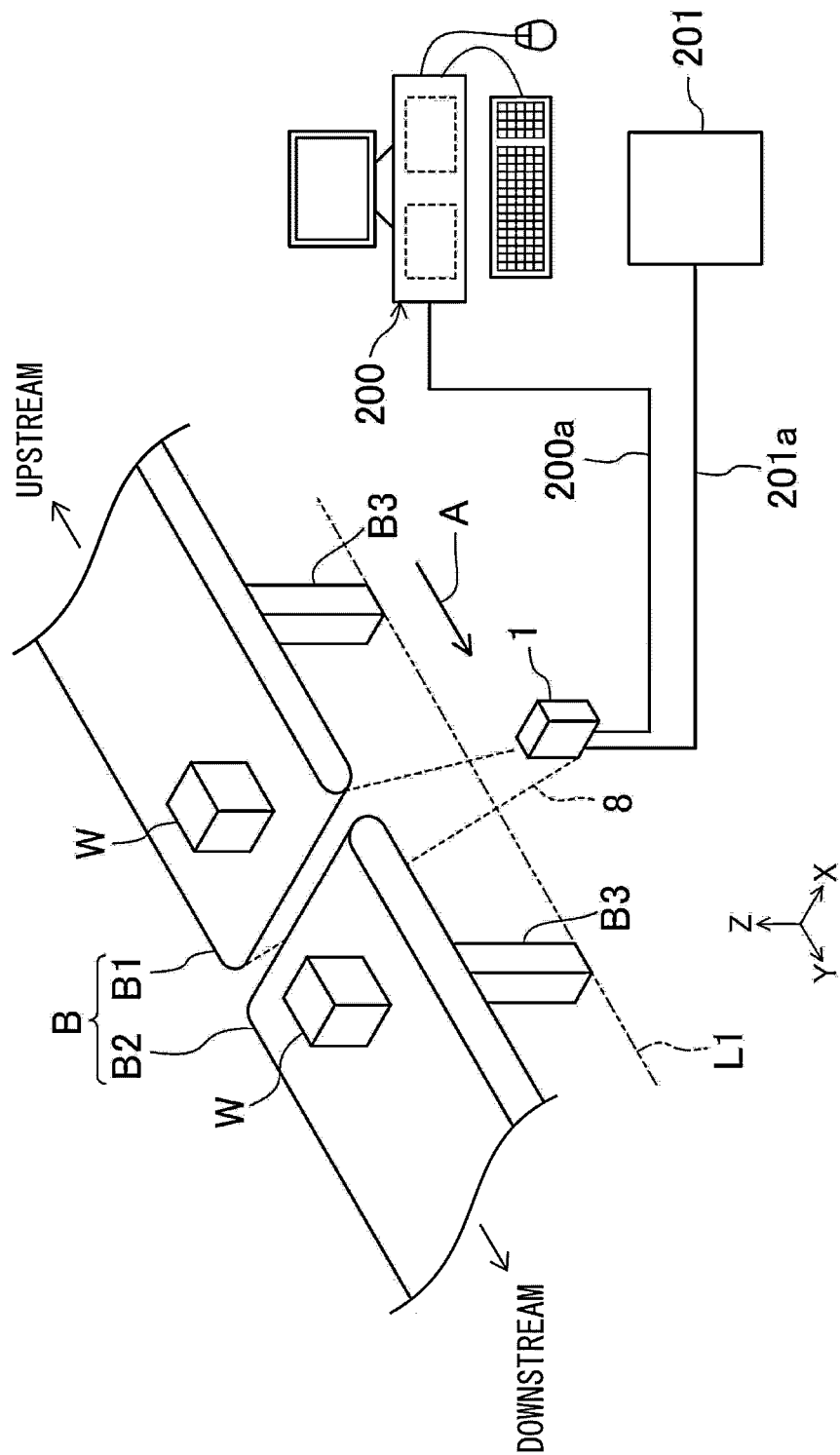
FIG. 1 is a perspective view for explaining an operation of a code reader according to an embodiment of the invention.
Figure 2:
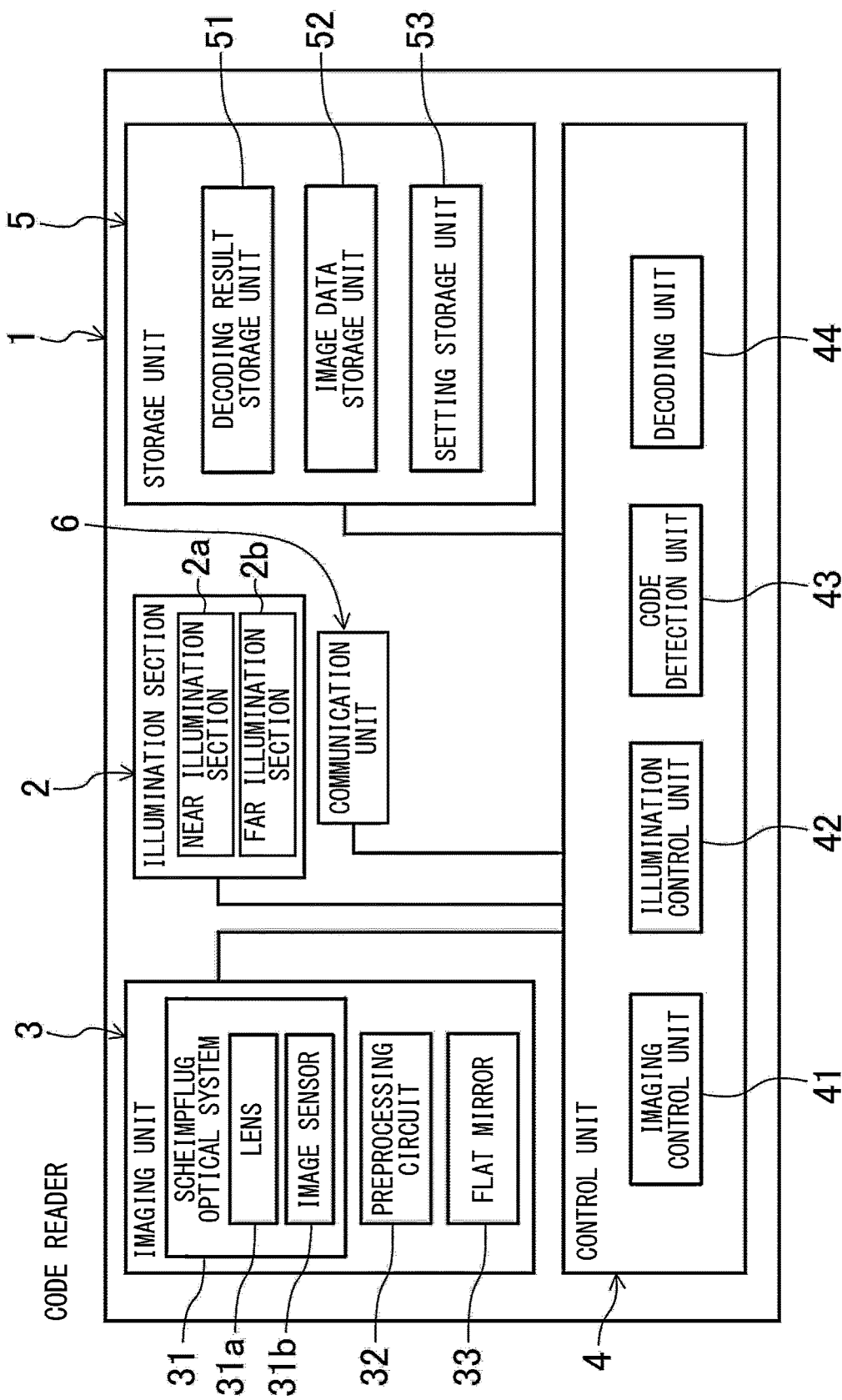
FIG. 2 is a block diagram of the code reader.

FIG. 1 is a view schematically illustrating an operation of a code reader 1 according to an embodiment of the invention. In addition, FIG. 2 is a block diagram of the code reader. In this example, a case where the code reader 1 is used in a distribution site that handles a plurality of workpieces W is illustrated. In the distribution site, a conveyance device B for sequentially conveying the plurality of workpieces W in a predetermined conveyance direction is installed. The conveyance direction of the workpiece W is indicated by an arrow A. Therefore, the right side in FIG. 1 is the upstream side in the conveyance direction, and the left side in FIG. 1 is the downstream side in the conveyance direction.

The conveyance device B includes a plurality of conveyance mechanisms B1 and B2. Each of the conveyance mechanisms B1 and B2 is configured by, for example, a belt conveyor or the like, and includes an upstream conveyance mechanism B1 and a downstream conveyance mechanism B2. The upper surfaces of the upstream conveyance mechanism B1 and the downstream conveyance mechanism B2 are conveyance surfaces. In this embodiment, a conveyance direction of the workpiece W is defined as a Y direction, a direction orthogonal to the Y direction on the conveyance surface is defined as an X direction, and a direction orthogonal to both the X direction and the Y direction is defined as a Z direction. In the distribution site, the X direction and the Y direction are often substantially horizontal, but the Y direction may be inclined with respect to a horizontal plane. The X direction can be referred to as a width direction of the conveyance mechanisms B1 and B2, or can be referred to as a longitudinal direction of the gap of the conveyance device B. In addition, the Z direction can also be referred to as a height direction (up-down direction). Note that the definition of the direction is a definition for convenience of description, and does not limit the direction at the time of use.

The upstream conveyance mechanism B1 and the downstream conveyance mechanism B2 are provided at intervals in the conveyance direction. The size (dimension) of the interval between the upstream conveyance mechanism B1 and the downstream conveyance mechanism B2 is not particularly limited, but is set so that the smallest workpiece W to be conveyed is smoothly transferred from the upstream conveyance mechanism B1 to the downstream conveyance mechanism B2 without falling from the gap. The dimension (dimension in the X direction) of the gap in the longitudinal direction is about the same as the width (dimension in the X direction) of the conveyance mechanisms B1 and B2, but this is also not particularly limited.

The upstream conveyance mechanism B1 and the downstream conveyance mechanism B2 are supported on a floor surface C (illustrated in FIG. 3) by members such as leg portions B3, for example. Therefore, since the conveyance surfaces of the upstream conveyance mechanism B1 and the downstream conveyance mechanism B2 are positioned at positions separated upward from the floor surface C by a predetermined dimension, a space may be formed below the upstream conveyance mechanism B1 and the downstream conveyance mechanism B2.

Figure 3:
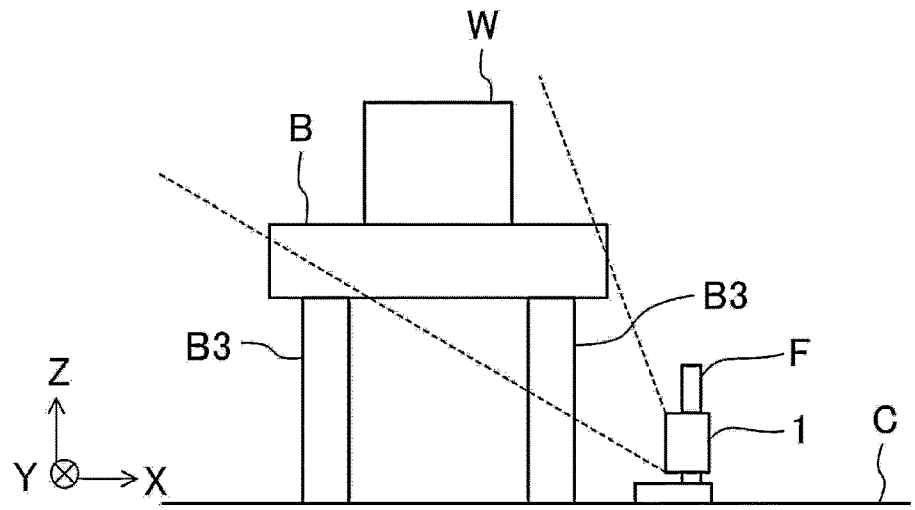
FIG. 3 is a view for explaining an operation of the code reader, and illustrates a case of being viewed from the upstream side in the conveyance direction.
Figure 4:
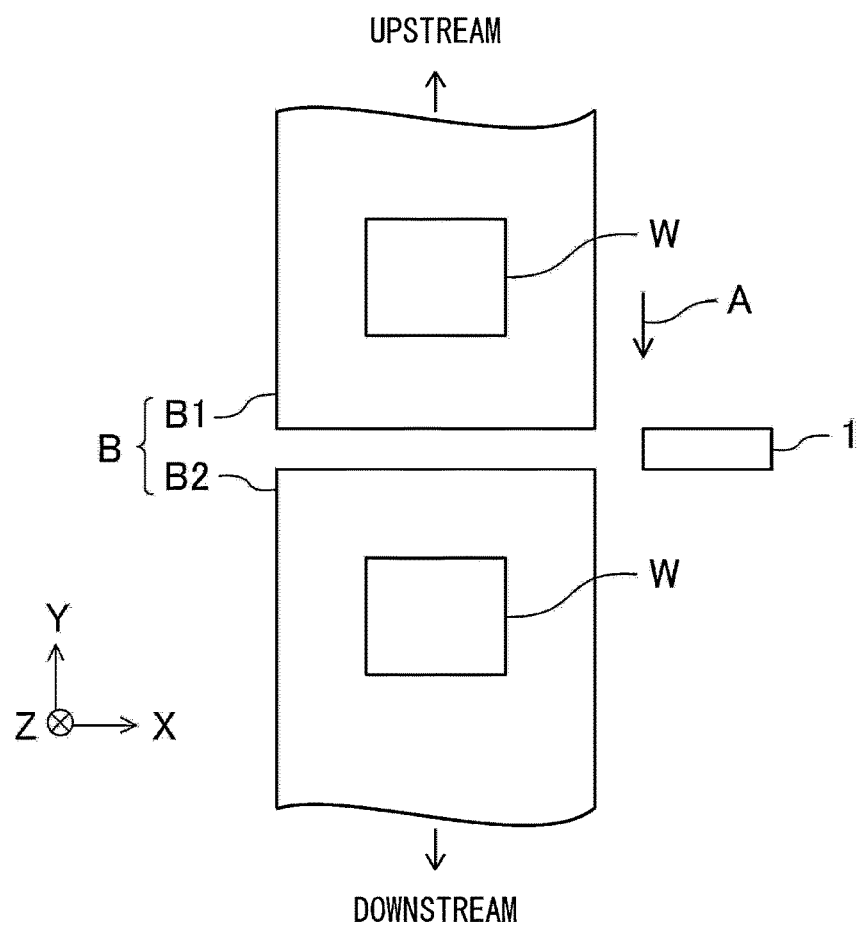
FIG. 4 is a plan view for explaining an operation of the code reader.

The code reader 1 is installed at an installation position set on the side of the conveyance device B and below the conveyance surface of the conveyance device B. That is, as illustrated in FIG. 1, when the edge portion of the conveyance device B in the width direction is projected vertically downward, the edge portion is positioned on a virtual straight line L1. The virtual straight line L1 is a straight line extending in the Y direction. An outer side of the conveyance device B than the virtual straight line L1 in top view can be defined as a side of the conveyance device B. As also illustrated in FIGS. 3 and 4, the installation position of the code reader 1 in the present embodiment is set on the side of the conveyance device B and immediately beside the gap between the conveyance mechanisms B1 and B2.

A broken line denoted by reference numeral 8 in FIGS. 1 and 2 indicates a visual field range of an imaging unit 3 (illustrated in FIG. 2) included in the code reader 1 although details will be described later. The code reader 1 is installed at the installation position such that a gap between the upstream conveyance mechanism B1 and the downstream conveyance mechanism B2 is included in the visual field range of the imaging unit 3. Therefore, the code reader 1 of the present embodiment is a stationary type. The time of operation of the stationary code reader 1 is a time of performing an operation of sequentially reading the code of the workpiece W conveyed by the conveyance device B. The code reader 1 can be fixed to a vertical fixing surface of a frame F fixed to the floor surface C as illustrated in FIG. 3 via an attachment structure 71A to be described later. However, the code reader 1 may be fixed via a table, a bracket, or the like (not illustrated), may be directly placed and fixed on the floor surface C, may be fixed to the conveyance mechanisms B1 and B2, or may be fixed to the leg portions B3, and an installation target thereof is not particularly limited.

Since the gap between the upstream conveyance mechanism B1 and the downstream conveyance mechanism B2 is included in the visual field range of the imaging unit 3, when the bottom surface of the workpiece W being conveyed passes through the gap, the bottom surface can be captured by the imaging unit 3. A code may be attached to the bottom surface of the workpiece W. In a case where the code is attached to the bottom surface of the workpiece W, since the code reader 1 is installed at the installation position below the conveyance surface of the conveyance device B, the code attached to the bottom surface of the workpiece W can be read from below the conveyance surface of the conveyance device B through the gap.

The code attached to the workpiece W includes both a barcode and a two-dimensional code. Examples of the two-dimensional code include a QR code (registered trademark), a micro QR code, and a data matrix (Data code), Veri code, Aztec code, PDF417, Maxi code, and the like. The two-dimensional code includes a stack type and a matrix type, but the invention can be applied to any two-dimensional code. The code may be attached by directly printing or imprinting the code on the workpiece W, or may be attached by attaching the code to the workpiece W after printing the code on a label, and the way and method therefor are not limited.

As illustrated in FIG. 1, the code reader 1 is connected to a computer 200 and a programmable logic controller (PLC) 201 by wire via signal lines 200a and 201a, respectively. However, the invention is not limited thereto, and a wireless communication module may be incorporated in the code reader 1, the computer 200, and the PLC 201, and the code reader 1 may be wirelessly connected to the computer 200 and the PLC 201. The PLC 201 is a control device for sequence controlling the conveyance device B and the code reader 1, and a general-purpose PLC can be used. As the computer 200, a general-purpose or dedicated electronic computer, a portable terminal, or the like can be used.

In addition, at the time of operation, the code reader 1 receives a reading start trigger signal that defines a start timing of code reading from the PLC 201 via the signal line 201a. Then, the code reader 1 captures and decodes the code on the basis of the reading start trigger signal. Thereafter, the decoding result is transmitted to the PLC 201 via the signal line 201a. As described above, at the time of operation of the code reader 1, the input of the reading start trigger signal and the output of the decoding result are repeatedly performed between the code reader 1 and the external control device such as the PLC 201 via the signal line 201a. Note that the input of the reading start trigger signal and the output of the decoding result may be performed via the signal line 201a between the code reader 1 and the PLC 201 as described above, or may be performed via other signal lines (not illustrated). For example, a sensor for detecting the arrival of the workpiece W and the code reader 1 may be directly connected, and the reading start trigger signal may be input from the sensor to the code reader 1.

As illustrated in FIG. 2, the code reader 1 includes an illumination section 2, an imaging unit 3, a control unit 4, a storage unit 5, and a communication unit 6. The control unit 4 includes an imaging control unit 41 that controls the imaging unit 3, an illumination control unit 42 that controls the illumination section 2, a code detection unit 43, and a decoding unit 44. In addition, the storage unit 5 can be configured by a readable/writable storage device such as a solid state drive (SSD). The storage unit 5 can store, for example, various programs, decoding results, image data, setting information, and the like, and includes a decoding result storage unit 51, an image data storage unit 52, and a setting storage unit 53. Although not illustrated, the decoding result storage unit 51, the image data storage unit 52, and the setting storage unit 53 may be provided in separate storage devices.

The communication unit 6 executes communication with the computer 200 and the PLC 201. The setting information by the computer 200 is received by the control unit 4 via the communication unit 6. In addition, the control unit 4 receives the reading start trigger signal from the PLC 201 via the communication unit 6. The decoding result by the code reader 1 is transmitted to the computer 200 or the PLC 201 via the communication unit 6. In addition, the communication unit 6 receives the dimension of the gap formed between the plurality of conveyance mechanisms B1 and B2 of the conveyance device B and the conveyance speed of the conveyance device B. The user can input the dimension of the gap and the conveyance speed to the computer 200 or the like in advance. The dimension of the gap and the conveyance speed input are stored in the computer 200, and the dimension of the gap and the conveyance speed are received and acquired by the communication unit 6 after being transmitted from the computer 200.

The illumination section 2 is a portion that irradiates the workpiece W with illumination light, and the irradiation range of the illumination section 2 includes a gap between the upstream conveyance mechanism B1 and the downstream conveyance mechanism B2. Since the code reader 1 is installed on the side of the conveyance device B and below the conveyance surface of the conveyance device B, the illumination section 2 emits illumination light from below the conveyance surface toward the gap. As a result, when the bottom surface of the workpiece W being conveyed passes through the gap between the upstream conveyance mechanism B1 and the downstream conveyance mechanism B2, the bottom surface can be illuminated by the illumination section 2. In a case where the code is attached to the bottom surface of the workpiece W, the code attached to the bottom surface of the workpiece W can be illuminated by the illumination section 2.

The illumination section 2 includes a near illumination section 2a and a far illumination section 2b. The near illumination section 2a is a portion that irradiates a near side of a focal plane 7 (illustrated in FIG. 6B) of a Scheimpflug optical system 31 to be described later with illumination light. The far illumination section 2b is a portion that irradiates the far side of the focal plane 7 of the Scheimpflug optical system 31 with illumination light. The near illumination section 2a and the far illumination section 2b each include a light emitter including, for example, a light emission diode (LED) or the like.

The illumination section 2 and the imaging unit 3 may be integrated, or the illumination section 2 and the imaging unit 3 may be separated. The illumination section 2 is controlled by the illumination control unit 42 to switch on and off, change brightness at the time of lighting, and the like. When the reading start trigger signal is input from the PLC 201, the illumination control unit 42 turns on the illumination section 2 for a predetermined time and turns off the illumination section 2 after the predetermined time has elapsed.

Figure 5:
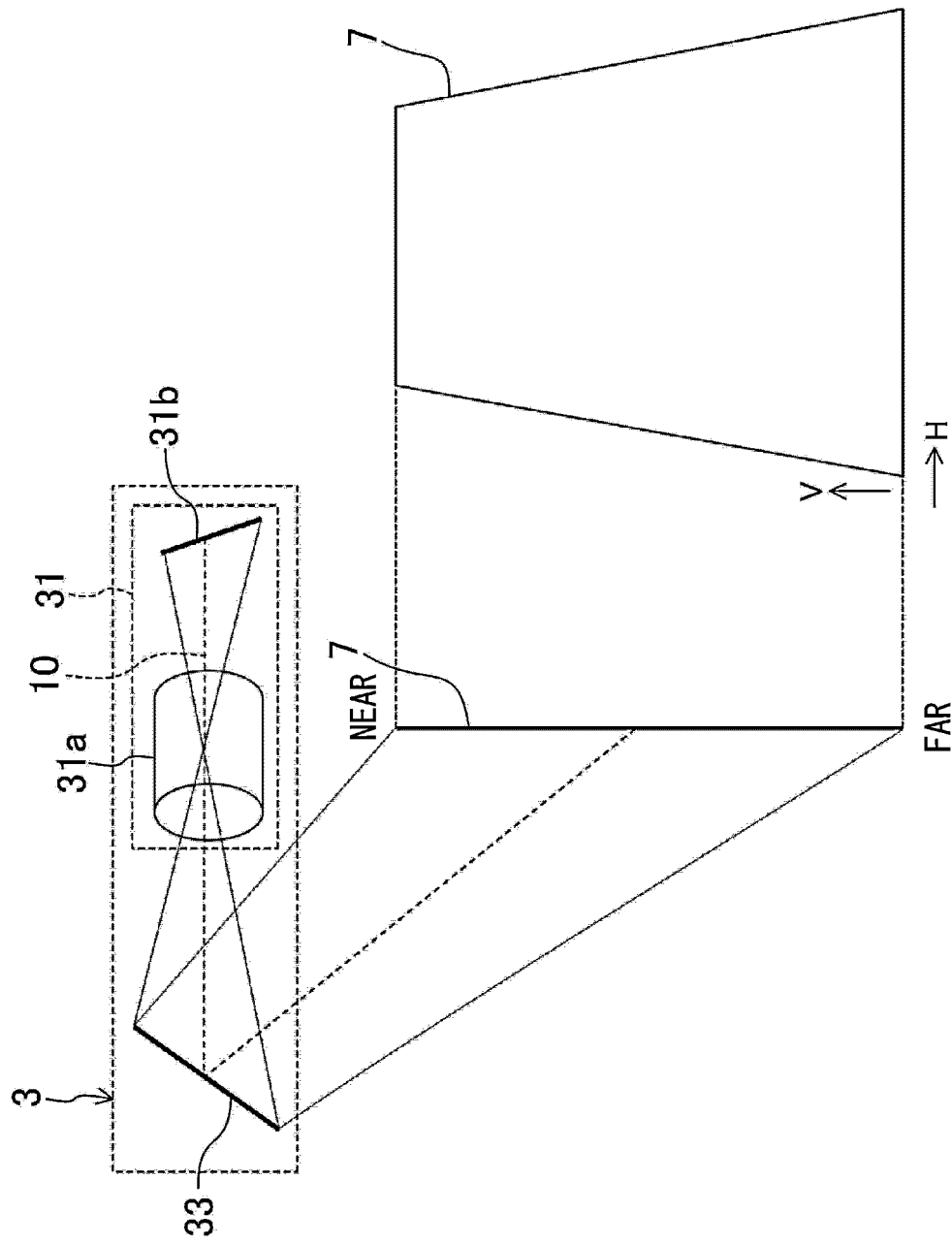
FIG. 5 is a schematic diagram illustrating a relationship between a Scheimpflug optical system and a focal plane.

The imaging unit 3 is a portion that captures an image of the workpiece W through the gap between the upstream conveyance mechanism B1 and the downstream conveyance mechanism B2, generates a code image including a code, and outputs the code image to the control unit 4. The imaging unit 3 includes a Scheimpflug optical system 31, a preprocessing circuit 32, and a flat mirror 33. As also illustrated in FIG. 5, the Scheimpflug optical system 31 includes a lens 31a and an image sensor 31b having a light receiving surface inclined with respect to an optical axis 10 of the lens 31a. The lens 31a is an imaging lens that collects reflected light from the bottom surface of the workpiece W. The light incident on the lens 31a is emitted toward the light receiving surface of the image sensor 31b and forms an image on the light receiving surface.

Figure 6A:
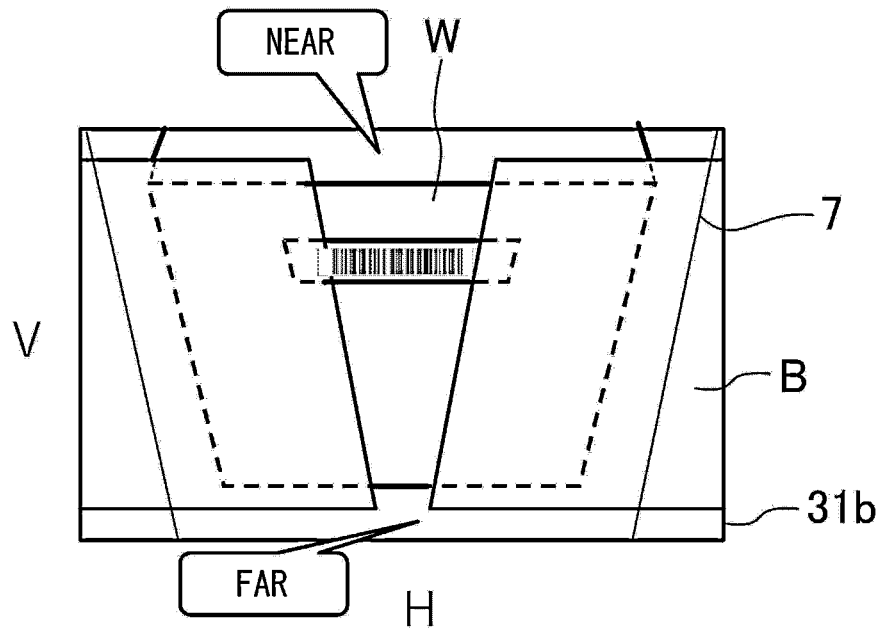
FIG. 6A is a view illustrating a state in which an image of a code attached to a bottom surface of a workpiece is captured from a side of a conveyance device and below a conveyance surface.

The flat mirror 33 is a member for directing light incident on the imaging unit 3 toward the lens 31a. That is, in this example, since the focal plane 7 includes the Scheimpflug optical system 31, the focal plane 7 is formed to extend in the V direction of the image sensor 31b. FIG. 6A illustrates a state in which the code attached to the bottom surface of the workpiece W is captured from the side of the conveyance device B and below the conveyance surface. In addition, FIG. 6A illustrates the shape of the focal plane 7 formed on the light receiving surface of the image sensor 31b, where the near side is relatively close to the code reader 1, and the far side is relatively far from the code reader 1. As illustrated in FIG. 6A, the gap between the workpiece W and the conveyance device B appears larger in the near side than in the far side. That is, in the image sensor 31b, the bottom surface of the workpiece W seen from the gap of the conveyance device B is shown in a trapezoidal shape having one end on the near side relatively close in distance from the imaging unit 3 as a long side and the other end on the far side relatively far in distance from the imaging unit 3 as a short side.

Figure 6B:
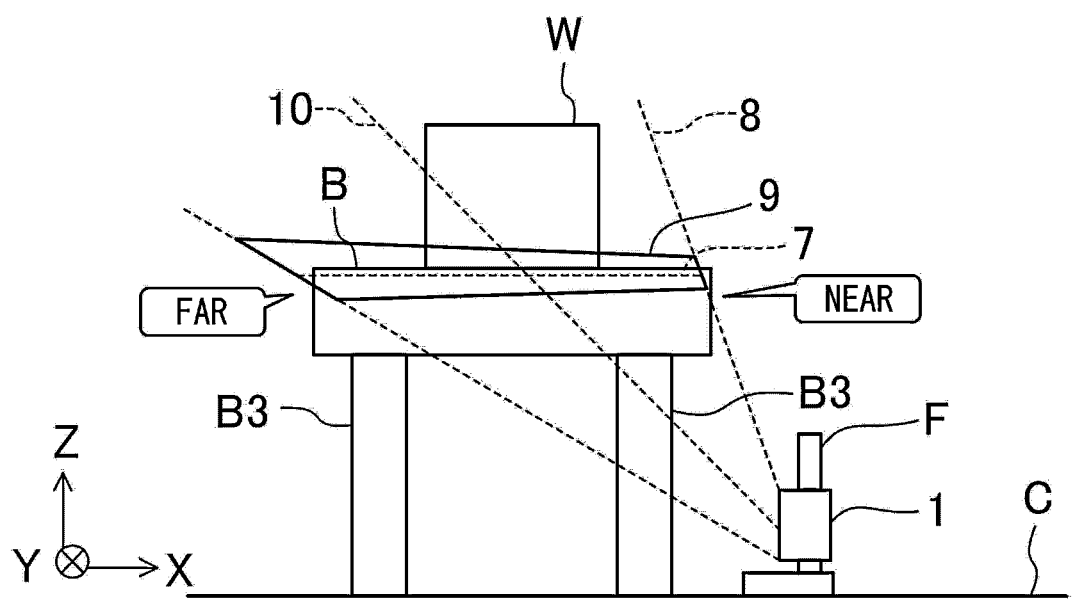
FIG. 6B is a view illustrating a relationship among a visual field range, a focal plane, and a depth of field of the code reader according to the present embodiment.
Figure 25:
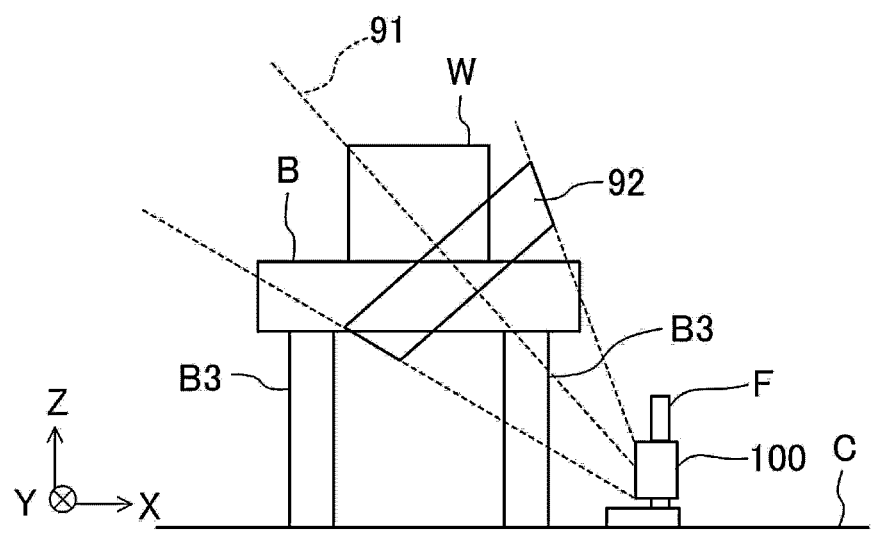
FIG. 25 is a view illustrating a relationship among a visual field range, a focal plane, and a depth of field of a code reader in which a depth of field is formed symmetrically with respect to a lens optical axis.

In FIG. 6B, a visual field range of the imaging unit 3 is indicated by reference numeral 8, and a depth of field is indicated by reference numeral 9. In addition, an optical axis (optical axis of the lens 31a) extending at the center of the visual field range 8 is indicated by reference numeral 10. As described above, the Scheimpflug optical system 31 has the inclination of the focal plane 7 in the V direction of the image sensor 31b. As compared with the code reader in which a depth of field 92 is formed symmetrically with respect to a lens optical axis 91 as illustrated in FIG. 25, according to the code reader 1 of the present embodiment, the longitudinal direction of the gap of the conveyance device B can be sufficiently included in the depth of field 9.

The image sensor 31b includes a light receiving element such as a charge-coupled device (CCD) or a complementary metal oxide semiconductor (CMOS) that converts an image of a code obtained through the lens 31a into an electrical signal. An image including a code is generated on the basis of the amount of light received by the light receiving surface of the image sensor 31b. The image sensor 31b includes a plurality of imaging elements arranged in a row direction and a column direction, and is configured such that the row direction substantially coincides with a direction from the near side to the far side of the focal plane of the Scheimpflug optical system 31. An aspect ratio of the image sensor 31b is set to be smaller than an aspect ratio of a light receiving window 67 to be described later. Then, the image sensor 31b is configured to be able to partially output a signal from an imaging element corresponding to the light receiving window 67 among the plurality of imaging elements.

That is, assuming a case where a line sensor is used as an image sensor, high-speed reading is possible, but there is a risk that the frame rate becomes extremely high in order to read a code, and the calorific value of the illumination section 2 increases. In this regard, in the present embodiment, an area sensor in which a plurality of imaging elements is arranged in the row direction and the column direction is used as the image sensor 31b, and only a portion (a partial row) corresponding to the light receiving window 67 is partially read, so that it is possible to achieve both heat generation suppression and high-speed reading.

The image generated by the image sensor 31b is input to the preprocessing circuit 32. The preprocessing circuit 32 may be provided as necessary, and is not essential.

The preprocessing circuit 32 includes, for example, an integrated circuit such as a field programmable gate array (FPGA), and is a portion that executes various preprocessing on an image output from the image sensor 31b. The preprocessing includes, for example, various kinds of filtering. The imaging unit 3 outputs the image preprocessed by the preprocessing circuit 32 to the control unit 4. The preprocessing by the preprocessing circuit 32 may be executed as necessary, and an image on which the preprocessing is not executed may be output to the control unit 4. The image output to the control unit 4 is stored in the image data storage unit 52 included in the storage unit 5.

The imaging unit 3 is controlled by the imaging control unit 41. When the reading start trigger signal is input from the PLC 201, the imaging control unit 41 generates an image by performing exposure for a preset exposure time. The imaging control unit 41 also executes processing of applying a preset gain to an image generated by the image sensor 31b and amplifying the brightness of the image by digital image processing by controlling the imaging unit 3. In addition, the imaging control unit 41 determines the frame rate (the number of times of imaging per second) of the imaging unit 3 on the basis of the dimension (width of the gap) of the gap between the conveyance mechanisms B1 and B2 received by the communication unit 6 and the conveyance speed. For example, the imaging control unit 41 increases the frame rate of the imaging unit 3 as the conveyance speed increases. The frame rate can be set in a range of 500 fps to 5000 fps, for example. As the frame rate increases, stronger light is required to obtain sufficient brightness in a short exposure time, so that the calorific value of the illumination section 2 also increases proportionally.

As illustrated in FIGS. 7 to 10, the code reader 1 includes a housing 60 that stores the illumination section 2, the imaging unit 3, and the control unit 4. The housing 60 may store the imaging unit 3 and the control unit 4 and may not store the illumination section 2. In this case, the illumination section 2 is an illumination section configured separately from the housing 60 that stores the imaging unit 3 and the control unit 4, but is controlled in synchronization by the control unit 4 when capturing an image of the workpiece W.

The housing 60 has a first side surface 61, a second side surface 62, a third side surface 63, and a fourth side surface 64, and also has an upper surface 65 and a lower surface 66. In this embodiment, the depth direction (front-rear direction), the left-right direction, and the up-down direction of the housing 60 are defined as illustrated in FIGS. 7 to 10, but this definition is for convenience of description and does not limit the actual use posture of the code reader 1. In addition, the number of side surfaces is not limited to six, and may be a shape having six or more side surfaces.

According to the above definition, the first side surface 61 is a surface (front surface) located on the front side of the housing 60, and has a shape elongated in the up-down direction. The second side surface 62 is a surface (left side surface) that is adjacent to the left edge portion of the first side surface 61, extends toward the back side of the housing 60, and is located on the left side of the housing 60. The third side surface 63 is a surface (right side surface) that is adjacent to the right edge portion of the first side surface 61, extends toward the back side of the housing 60, and is located on the right side of the housing 60. The fourth side surface 64 is a surface (rear surface) located on the rear side of the housing 60, and has a shape elongated in the up-down direction similarly to the first side surface 61. The first side surface 61 and the fourth side surface 64 are substantially parallel to each other. In addition, the second side surface 62 and the third side surface 63 are substantially parallel to each other.

The upper edge portion of the fourth side surface 64 is located below the upper edge portion of the first side surface 61, and the first side surface 61 is longer when the dimension in the up-down direction of the first side surface 64 is compared with the dimension in the up-down direction of the fourth side surface 61. The upper surface 65 is inclined so as to be positioned downward toward the back side of the housing 60 so as to correspond to a dimensional difference in the up-down direction between the first side surface 61 and the fourth side surface 64. On the other hand, the lower surface 66 extends substantially horizontally.

The first side surface 61, the third side surface 63, the fourth side surface 64, the upper surface 65, and the lower surface 66 of the housing 60 are integrally molded, and are formed of one component, for example. Therefore, the first side surface 61, the third side surface 63, the fourth side surface 64, the upper surface 65, and the lower surface 66 constitute a member whose entire left side surface is opened. A member constituting the second side surface 62 is fastened from the left side to a member constituted by the first side surface 61, the third side surface 63, the fourth side surface 64, the upper surface 65, and the lower surface 66. As a result, the sealed housing 60 is configured.

Figure 7:
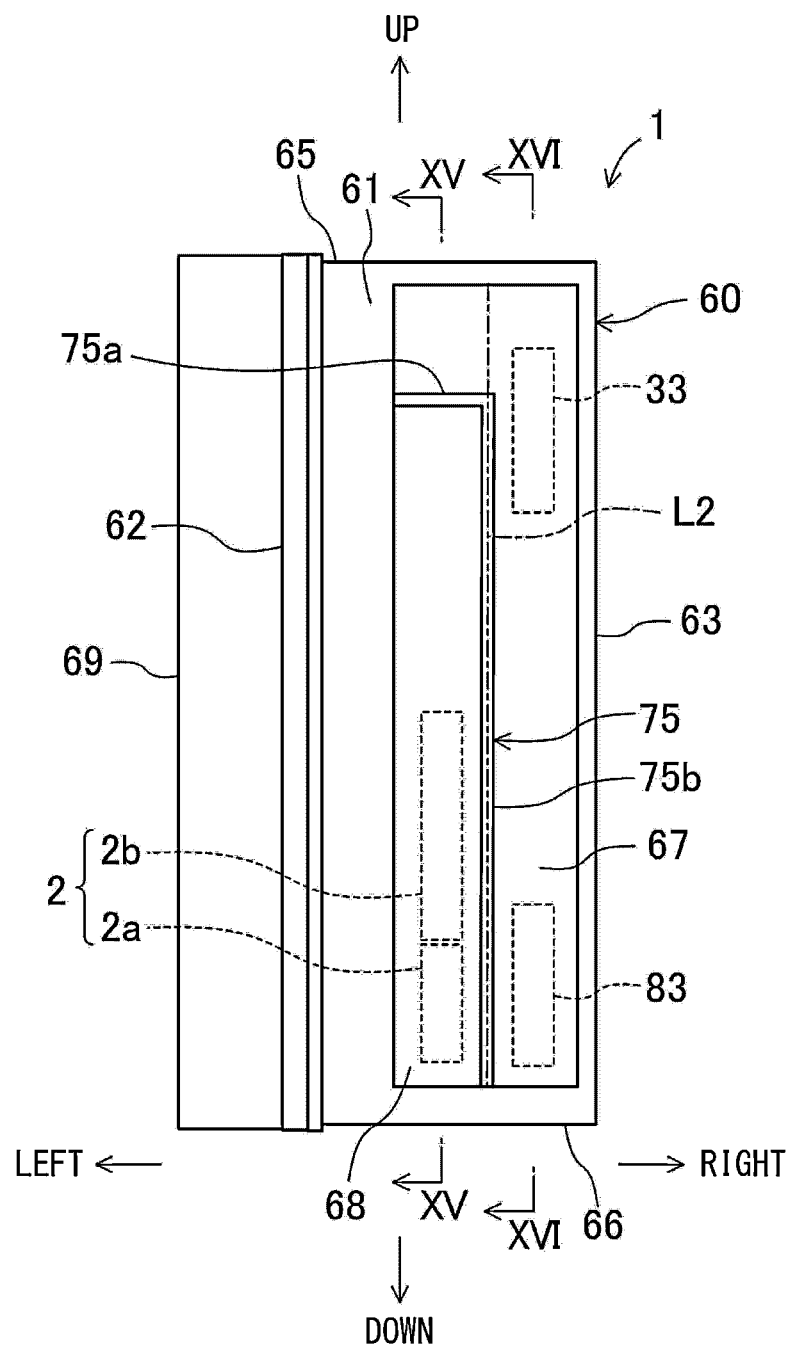
FIG. 7 is a front view of the code reader.

As illustrated in FIG. 7, the first side surface 61 is provided with the light receiving window 67 that transmits reflected light from the bottom surface of the workpiece W to the inside of the housing 60. The light receiving window 67 is made of a transparent member having a short side extending in a lateral direction and a long side, longer than the short side, extending in a longitudinal direction. As a member constituting the light receiving window 67, for example, a resin material such as glass or polycarbonate can be exemplified. The longitudinal direction of the light receiving window 67 coincides with the longitudinal direction of the first side surface 61, that is, the up-down direction of the housing 60, and the lateral direction of the light receiving window 67 coincides with the left-right direction of the housing 60. In addition, the light receiving window 67 is provided to be displaced rightward from the center of the first side surface 61 in the left-right direction.

The light receiving window 67 forms a plane extending along the up-down direction and the left-right direction of the housing 60. A plane formed by the light receiving window 67 intersects a plane formed by the focal plane 7 of the Scheimpflug optical system 31. The plane formed by the light receiving window 67 can also be defined as a virtual plane including the front surface (or back surface) of the light receiving window 67. Note that the light receiving window 67 may not be a perfect plane, and may be a surface that is curved so as to be optically flat.

In addition, as illustrated in FIGS. 1 to 3, when the housing 60 is installed below the conveyance surface of the conveyance device B, the installation position, the installation angle, and the like of the housing 60 are adjusted such that the focused range (depth of field) 9 of the Scheimpflug optical system 31 includes the gap of the conveyance device B and the focal plane 7 of the Scheimpflug optical system 31 is substantially parallel to the conveyance plane. In a case where the housing 60 is installed in this manner, the light receiving window 67 is provided such that a plane formed by the light receiving window 67 intersects a horizontal plane.

Figure 11:
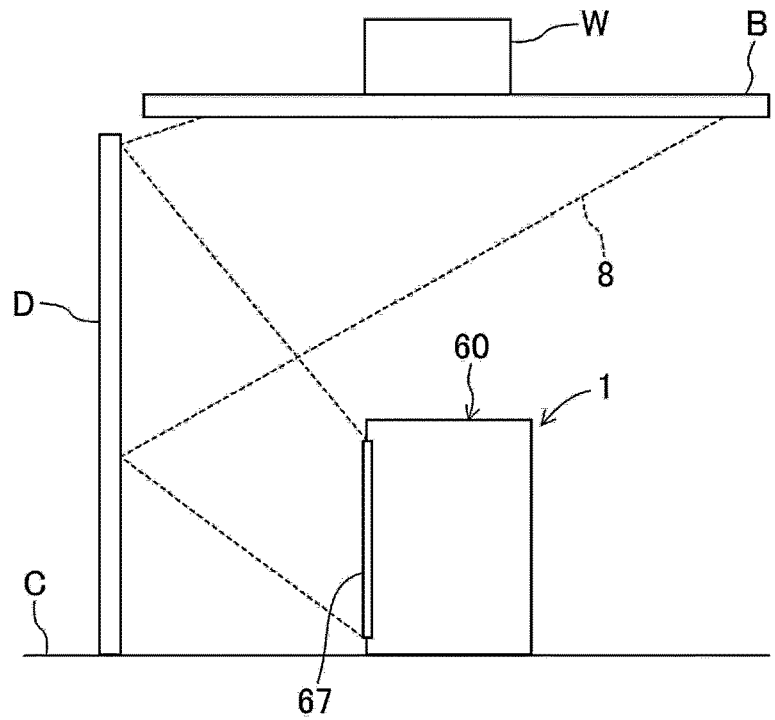
FIG. 11 is a view illustrating an example in which the code reader is installed directly below the conveyance device.

The installation position of the code reader 1 is not limited to the side of the conveyance device B. That is, for example, as illustrated in FIG. 11, the code reader 1 can be installed immediately below the conveyance device B as long as a sufficient space can be secured immediately below the conveyance device B. For example, in a case where the housing 60 is installed such that the optical axis of the lens 31a is substantially parallel to the conveyance direction A in top view, the imaging unit 3 can be configured to be able to image the bottom surface of the workpiece W from the installation position via a mirror D as an external reflection member. In this case, the mirror D extending in a substantially up-down direction is installed on the side of the conveyance device B, and reflected light from the bottom surface of the workpiece W is made incident on the mirror D, turned downward, and made incident on the light receiving window 67. The code reader 1 according to the example illustrated in FIG. 11 includes an external reflection member (mirror D) disposed outside the housing 60.

Figure 12:
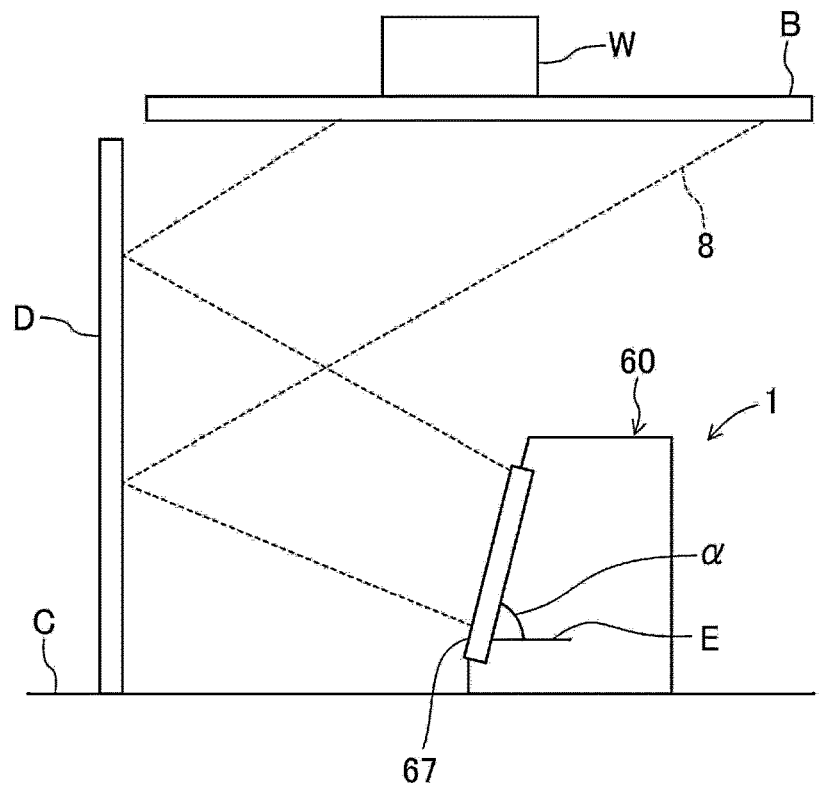
FIG. 12 is a view illustrating an example in which the code reader having a light receiving window of less than 90 degrees with respect to the horizontal plane is installed directly below the conveyance device.

In this example, the angle at which the light receiving window 67 intersects the horizontal plane is set to 90 degrees, but the invention is not limited thereto. As illustrated in FIG. 12, in a case where the code reader 1 is installed directly below the conveyance device B, an inclination angle α of the light receiving window 67 with respect to a horizontal plane E may be set to less than 90 degrees. The inclination angle α may be, for example, 20 degrees or more, or 45 degrees or more.

Figure 13:
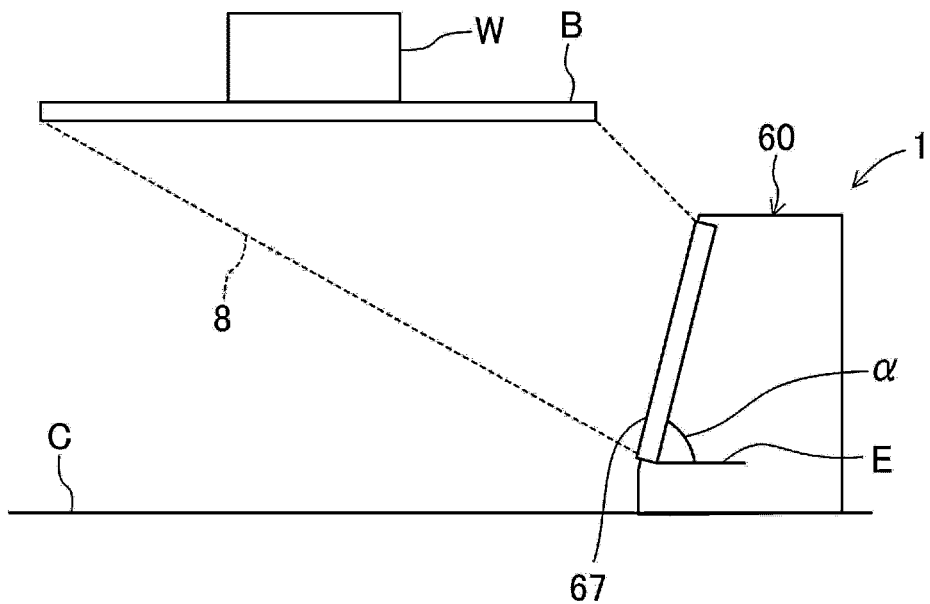
FIG. 13 is a view illustrating an example in which a code reader having a light receiving window of less than 90 degrees with respect to a horizontal plane is installed on a side of the conveyance device.
Figure 14:
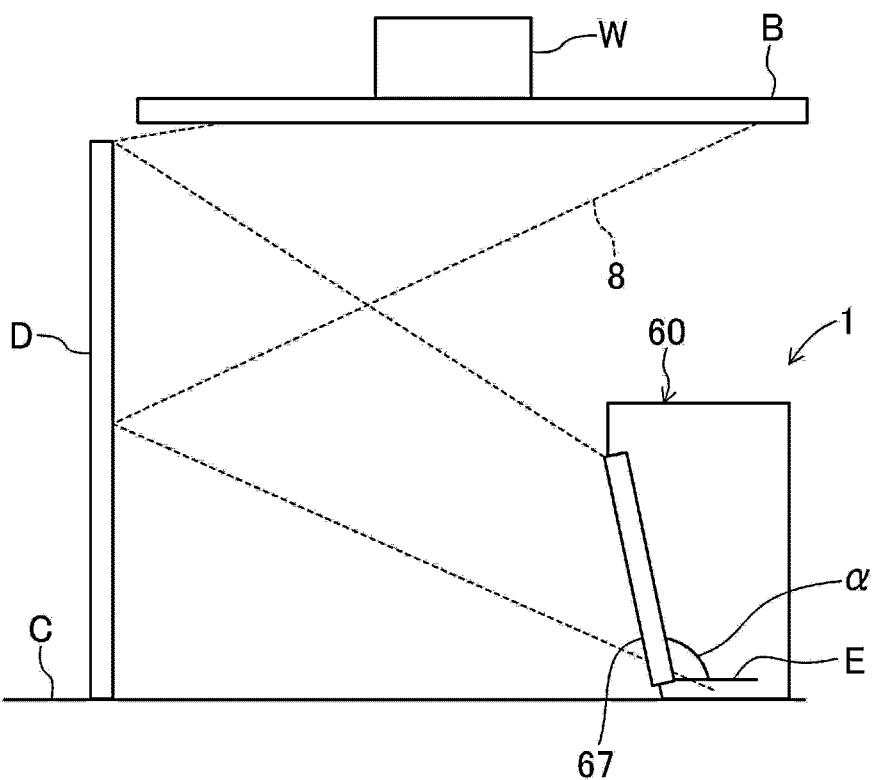
FIG. 14 is a view illustrating an example in which the code reader having a light receiving window exceeding 90 degrees with respect to the horizontal plane is installed directly below the conveyance device.

In addition, as illustrated in FIG. 13, the code reader 1 in which the angle of the light receiving window 67 is less than 90 degrees with respect to the horizontal plane E may be installed on the side of the conveyance device B. In addition, as illustrated in FIG. 14, the code reader 1 in which the angle of the light receiving window 67 exceeds 90 degrees with respect to the horizontal plane E can be installed directly below the conveyance device B. In this case, similarly to the example illustrated in FIG. 11, the reflected light from the bottom surface of the workpiece W is incident on the mirror D, turned back downward, and incident on the light receiving window 67.

Dust and dirt easily fall on the housing 60 installed below the conveyance surface of the conveyance device B. However, since the light receiving window 67 is disposed so as to be inclined with respect to the horizontal plane E, dust and dirt are less likely to accumulate on the light receiving window 67 as compared with the light receiving window facing directly above.

In the present embodiment, since a light projecting window 68 is also directed in the same direction as the light receiving window 67, dust and dirt are less likely to be accumulated in the light projecting window 68. In particular, as illustrated in FIG. 14, since the angle of the light receiving window 67 exceeds 90 degrees with respect to the horizontal plane E, dust and dirt hardly adhere to the light receiving window 67.

In the case of FIG. 12, the angle of the light receiving window 67 is less than 90 degrees with respect to the horizontal plane E, but when this angle is set to 45 degrees or more, the foreign matter on the surface of the light receiving window easily slides down.

That is, $$\mu \leq \tan(\theta)$$

when $\theta \geq \arctan(\mu)$ is satisfied, the foreign matter on the surface of the light receiving window 67 is likely to slip off. Therefore, for example, assuming that a friction coefficient is usually 1 or less between glass, polycarbonate, or the like and other materials, in a case where the light receiving window 67 is made of glass, polycarbonate, or the like, it is preferable to set the angle formed with the horizontal plane E to 45 degrees or more from the viewpoint of suppressing deposition of foreign matter.

In any of the installation forms of FIGS. 1 to 3 and FIGS. 11 to 14, when the housing 60 is installed, the distance between the light receiving window 67 and the gap of the conveyance device B, the direction of the light receiving window 67 with respect to the gap, and the like are determined. In a case where the housing 60 is installed in a state in which the light receiving window 67 is aligned so as to face the longitudinal direction of the gap of the conveyance device B in this manner, the imaging unit 3 is configured such that the focused range (depth of field) of the Scheimpflug optical system 31 includes the gap of the conveyance device B. At this time, the gap is included in an intermediate portion of the depth of field of the Scheimpflug optical system 31.

As illustrated in FIG. 7, the first side surface 61 is provided with a light projecting window 68 for transmitting the illumination light emitted from the illumination section 2 to the outside of the housing 60. In this embodiment, the light receiving window 67 and the light projecting window 68 are formed of a common transparent member, and a region on the right side of the alternate long and short dash line L2 in FIG. 7 is the light receiving window 67, and a region on the left side of the alternate long and short dash line L2 is the light projecting window 68. In this manner, the light receiving window 67 and the light projecting window 68 are provided adjacent to each other in the left-right direction. Similarly to the light receiving window 67, the light projecting window 68 also has a lateral direction and a longitudinal direction, and the longitudinal direction coincides with the longitudinal direction of the first side surface 61. Note that the light receiving window 67 and the light projecting window 68 may be configured as separate members.

Figure 10A:
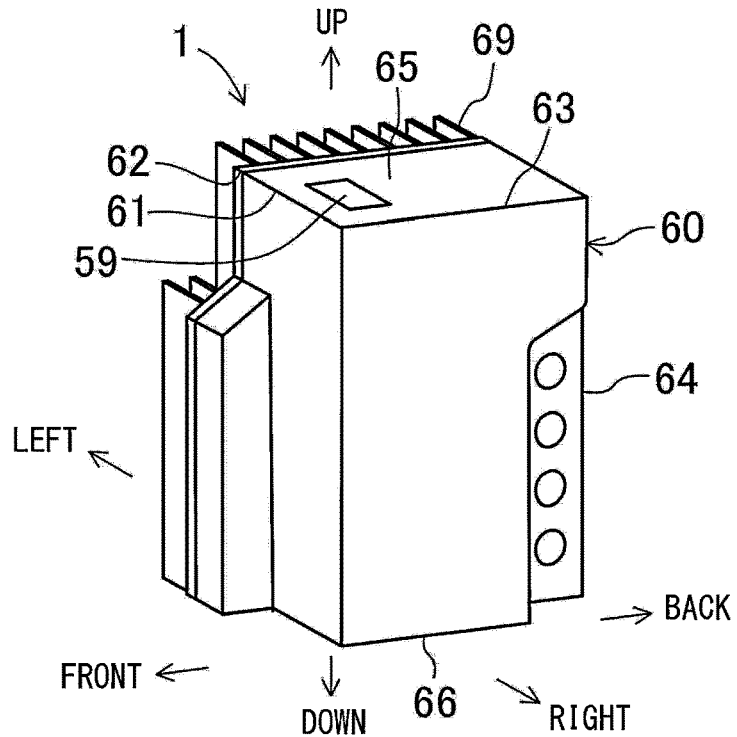
FIG. 10A is a perspective view of the code reader as viewed from the front side.
Figure 10B:
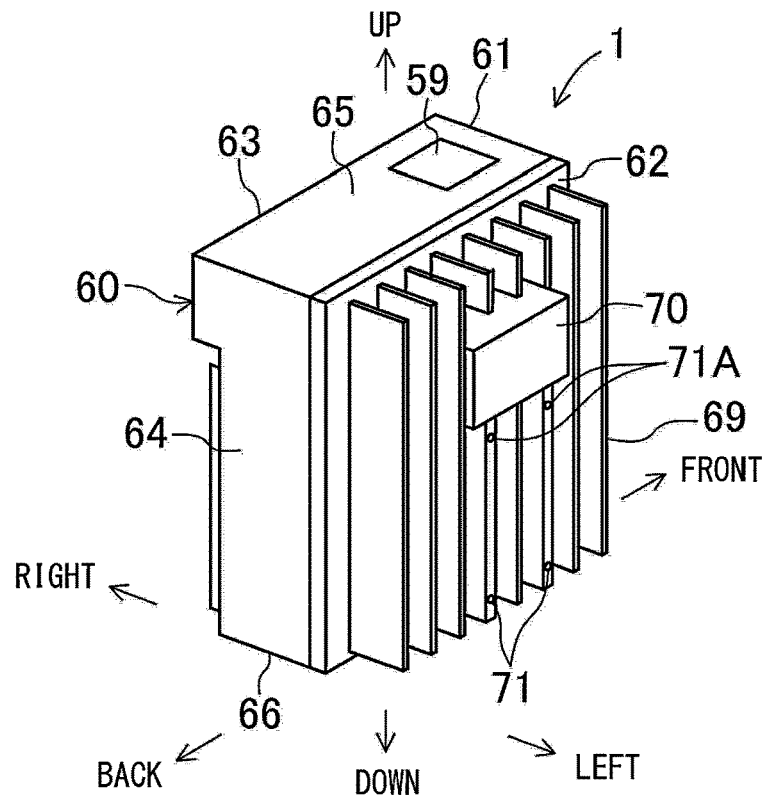
FIG. 10B is a perspective view of the code reader as viewed from the back side.

As illustrated in FIG. 10B, the code reader 1 includes a heat dissipation fin (heat dissipation portion) 69 for making heat generated in the illumination section 2 flee to the outside of the housing 60. The heat dissipation fin 69 is disposed on the second side surface 62 of the housing 60. Specifically, the second side surface 62 located on the left side of the housing 60 is made of a material having high thermal conductivity such as aluminum alloy, for example, and the heat dissipation fin 69 is integrally molded with a member constituting the second side surface 62. Accordingly, the heat dissipation fin 69 is also made of a material having high thermal conductivity. The heat dissipation fin 69 may be separate from the second side surface 62.

The heat dissipation fin 69 protrudes leftward from the second side surface 62 and extends in the up-down direction. A plurality of heat dissipation fins 69 having such a shape are provided at intervals in the depth direction. The heat dissipation fin 69 is adjacent to the illumination section 2 of the housing 60 in the left-right direction, thereby improving heat dissipation efficiency of the illumination section 2.

A cooling fan 70 is provided in an intermediate portion of the heat dissipation fin 69 in the up-down direction. The fan 70 is controlled by the control unit 4, for example, and is configured to operate when the temperature of the housing 60 becomes equal to or higher than a predetermined temperature. The fan 70 allows the outside air to be sent to the heat dissipation fin 69 to be forcibly cooled. Note that the fan 70 and the heat dissipation fin 69 may be provided as necessary.

As illustrated in FIG. 10B, the housing 60 has a second side surface 62 which is a surface different from the first side surface 61 provided with the light receiving window 67 and serves as an attachment surface provided with the attachment structure 71A. As illustrated in FIG. 6B, when the code reader 1 (housing 60) is located on the side of the conveyance device B and below the conveyance surface, and is installed by being fixed to the vertical fixing surface of the frame F arranged on the floor surface C via the attachment surface, the Scheimpflug optical system of the imaging unit 3 forms a depth of field extending in the longitudinal direction of the gap of the conveyance device B. By fixing the housing to a general horizontal or vertical surface as an external fixing surface via an attachment surface of the housing, it is possible to realize a posture of the housing 60 in which a depth of field in the longitudinal direction of the gap of the conveyance device B is formed. The focal plane may be parallel to the conveyance surface.

The attachment structure 71A is, for example, a plurality of screw holes, and the housing 60 can be fixed to the frame F using screws for the respective screw holes. The invention is not limited to this, and the attachment structure 71A may be a plurality of bolts, and the housing 60 may be fixed to the frame F using nuts for the bolts, or may be a structure that can be fixed by clamp fittings. The attachment structure 71A may be provided on the heat dissipation fin 69 or the fan 70 disposed on the second side surface 62. The attachment surface is not limited to the second side surface 62, and the attachment structure 71A may be provided on a surface different from the first side surface on which the light receiving window 67 and the light projecting window 68 are provided, that is, at least any one of the second side surface, the third side surface 63, the fourth side surface 64, the upper surface 65, and the lower surface 66 so as not to hinder irradiation of illumination light by the illumination section 2 and reception of light by the imaging unit 3. For example, if the upper surface 65 or the lower surface 66 is used as the attachment surface, the upper surface or the lower surface may be placed and fixed on a plate or the like provided protruding from the frame F via the attachment surface as an external horizontal fixing surface. In addition, the attachment surface may be directly installed on the fixing surface, or the attachment surface may be indirectly installed on the fixing surface using a component for mediating such as a bracket. That is, even in a case where the attachment surface is the second side surface 62, it may be installed on a horizontal fixing surface via the attachment structure 71A and a component for mediating.

At least a part of the upper surface 65 may be provided with a surface substantially parallel to the focal plane 7 of the Scheimpflug optical system. Since the conveyance surface of the conveyance device B is generally horizontal, the installation state of the housing 60 in which the focal plane 7 is parallel to the conveyance plane can be realized with higher accuracy by placing a horizontal device on the upper surface 65.

As illustrated in FIG. 7, when viewed in the front of the housing 60, that is, when viewed from the direction facing the light receiving window 67, the illumination section 2 is disposed adjacent to the light receiving window 67 in the lateral direction (left-right direction) of the light receiving window 67. The fact that the illumination section 2 is adjacent in the lateral direction of the light receiving window 67 means that the optical axis (illumination optical axis) of the illumination section 2 is close to the optical axis of the lens 31a of the imaging unit 3, and the visual field range of the imaging unit 3 is brightly illuminated by the illumination section 2.

The illumination section 2 prevents lack of illuminance on the far side of the imaging unit 3 of the focal plane 7 of the Scheimpflug optical system 31 with respect to the near side, or makes a position of each optical axis of the plurality of illumination sections 2a and 2b intersecting the focal plane 7 different from a direction in which the focal plane extends so that the illuminance on the far side is equal to or greater than the illuminance on the near side. As a result, it is possible to suppress insufficiency of the amount of reflected light received from the far side with respect to the amount of reflected light received from the near side of the imaging unit 3, and an image with more uniform luminance is generated on the near side and the far side of the imaging unit 3, so that it is possible to read a code close to the imaging unit and a code far from the imaging unit in a short time. Note that the image in which the luminance is made more uniform on the near side and the far side of the imaging unit 3 is, for example, an image in which the average of the luminance values of the dark code on the far side is 50% or more of the average of the luminance values of the bright code on the near side, and more preferably, an image in which the average of the luminance values of the dark code on the far side is 60% or more of the average of the luminance values of the bright code on the near side.

A configuration in which the illumination section 2 includes the near illumination section 2a and the far illumination section 2b is adopted as a configuration in which the amount of light to be emitted is different between the far side and the near side. The far illumination section 2b is different from the near illumination section 2a in at least one of an optical axis angle or a light flux with respect to the focal plane 7 of the Scheimpflug optical system 31.

Figure 15A:
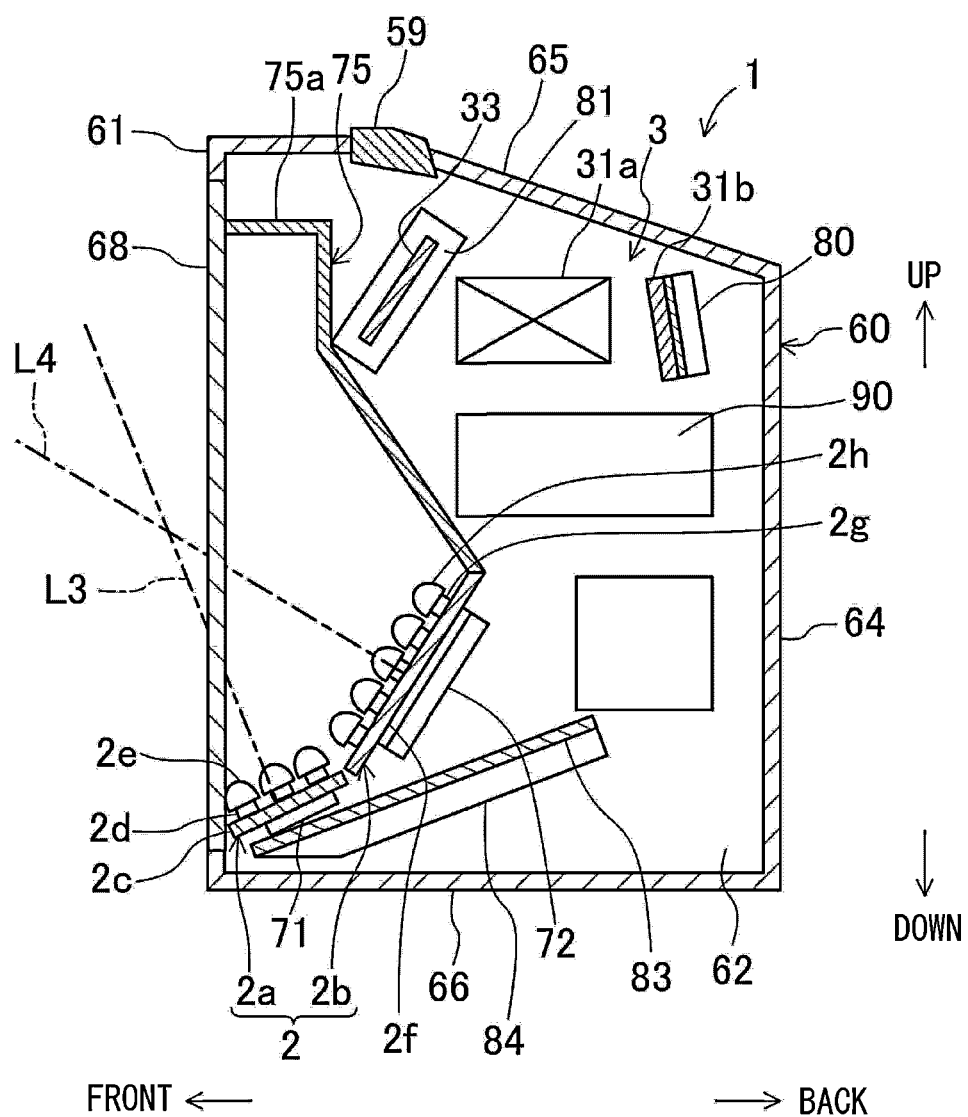
FIG. 15A is a cross-sectional view taken along line XV-XV in FIG. 7.
Figure 15B:
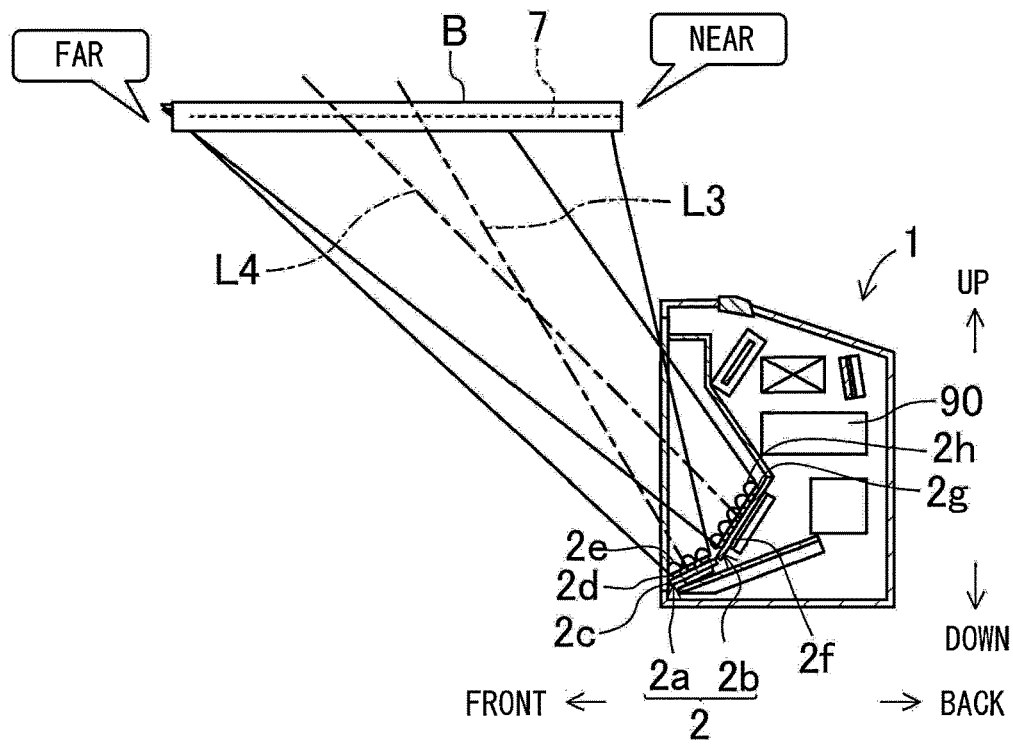
FIG. 15B is a view for explaining a first example of a near illumination section and a far illumination section in FIG. 15A.
Figure 15C:
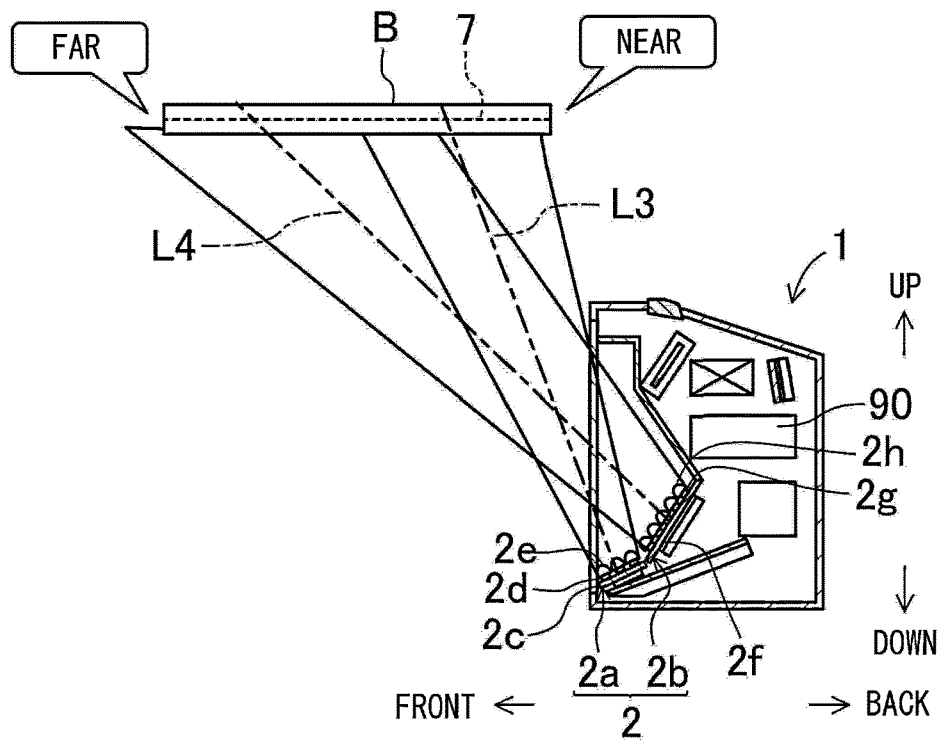
FIG. 15C is a view for explaining a second example of the near illumination section and the far illumination section in FIG. 15A.

As illustrated in FIGS. 15A, 15B, and 15C, the near illumination section 2a having an optical axis L3 intersecting the focal plane 7 on the nearer side than the far side of the focal plane 7 included in the illumination section 2 according to the present embodiment and the far illumination section 2b having an optical axis L4 intersecting the focal plane 7 on the farther side than the near side of the focal plane 7 have different optical axis angles with respect to the focal plane 7 of the Scheimpflug optical system 31, and the optical axis L3 and the optical axis L4 intersect in a region before reaching the focal plane 7. That is, the angle of the optical axis L3 with respect to the focal plane 7 of the near illumination section 2a is configured to be larger than the angle of the optical axis L4 with respect to the focal plane 7 of the far illumination section 2b.

In the first example illustrated in FIG. 15B, the region where the illumination light of the near illumination section 2a and the illumination light of the far illumination section 2b overlap on the focal plane 7 is unevenly distributed on the far side. The second example illustrated in FIG. 15C is different from the first example in FIG. 15B in that while the overlapping region is reduced by narrowing the light distribution angle of each illumination section, the light flux of the far illumination section 2b is made larger than the light flux of the near illumination section 2a. In either case of FIGS. 15B and 15C, the illuminance insufficiency on the far side with respect to the near side of the focal plane 7 can be suppressed, or the illuminance on the far side can be made equal to or higher than the illuminance on the near side. Therefore, the lack of the luminance on the far side with respect to the luminance on the near side of the image output by imaging unit 3 is suppressed, so that the image in which the luminance is made more uniform can be generated on the near side and the far side of imaging unit 3, and the reading efficiency can be improved.

As illustrated in FIG. 15A, the near illumination section 2a and the far illumination section 2b are arranged adjacent to each other in the inner direction of the housing 60 from the first side surface 61 of the housing 60, that is, from the light projecting window 68. The near illumination section 2a is arranged on the first side surface 61 side, and the far illumination section 2b is arranged on the back side of the near illumination section 2a.

The near illumination section 2a includes a near light emitting substrate 2c, one or more near light emitting elements 2d, and a near illumination lens 2e. The near light emitting substrate 2c is disposed near the lower end in the housing 60, and is inclined with respect to the horizontal plane so as to be positioned higher toward the back side of the housing 60. The code reader 1 includes a near-side support member 71 that supports the near light emitting substrate 2c on the second side surface 62. The near-side support member 71 is fixed to the second side surface 62, is formed so as to protrude from the second side surface 62 toward the inside of the housing 60, and extends in a direction intersecting the second side surface 62. A surface facing downward of the near light emitting substrate 2c is fixed to a portion of the near-side support member 71 protruding into the housing 60.

The near illumination section 2a and the heat dissipation fin 69 are thermally connected via the near-side support member 71. That is, the near-side support member 71 is made of, for example, an aluminum alloy or a resin material as a material having thermal conductivity.

Grease or the like for improving thermal conductivity is interposed between the near-side support member 71 and the second side surface 62 and between the near-side support member 71 and the near light emitting substrate 2c. As a result, heat emitted by the near light emitting element 2d is easily transmitted to the heat dissipation fin 69 via the near light emitting substrate 2c and the near-side support member 71. "Thermally connected" means that the components are connected in a state where heat easily moves and in a state where a heat insulating material is not interposed.

The plurality of near light emitting elements 2d are arranged (mounted) on the surface facing the near light emitting substrate 2c in the depth direction of the housing 60. The near illumination lens 2e is provided so as to cover the light emitting surface of each near light emitting element 2d. The optical axis of the near illumination section 2a is indicated by an alternate long and short dash line L3. The optical axis L3 of the near illumination section 2a is directed to the near side of the focal plane 7 of the Scheimpflug optical system 31, and the orientation of the near light emitting substrate 2c, that is, the orientation of the near light emitting element 2d is set and the near illumination lens 2e is designed so as to form such an optical axis L3.

The far illumination section 2b includes a far light emitting substrate 2f, one or more far light emitting elements 2g, and a far illumination lens 2h. The far light emitting substrate 2f is disposed so as to be adjacent to the vicinity of the end portion on the back side of the near light emitting substrate 2c, and is inclined with respect to the horizontal plane so as to be positioned higher toward the back side of the housing 60. The inclination angle of the far light emitting substrate 2f with respect to the horizontal plane is larger than the inclination angle of the near light emitting substrate 2c with respect to the horizontal plane. Therefore, the inclination of the far light emitting substrate 2f is steeper than that of the near light emitting substrate 2c.

The code reader 1 includes a far-side support member 72 that supports the far light emitting substrate 2f on the second side surface 62. The far-side support member 72 is fixed to the second side surface 62, and is formed so as to protrude from the second side surface 62 toward the inside of the housing 60. A surface facing downward of the far light emitting substrate 2f is fixed to a portion of the far-side support member 72 protruding into the housing 60. Like the far illumination section 2b, the far illumination section 2b and the heat dissipation fin 69 are thermally connected via the far-side support member 72.

The plurality of far light emitting elements 2g are arranged (mounted) on the surface facing the far light emitting substrate 2f in the depth direction of the housing 60. The number of the far light emitting elements 2g is set to be larger than the number of the near light emitting elements 2d. As a result, the amount of light emission of the far illumination section 2b becomes larger than the amount of light emission of the near illumination section 2a.

The far illumination lens 2h is provided so as to cover the light emitting surface of each far light emitting element 2g. The optical axis of the far illumination section 2b is indicated by an alternate long and short dash line L4. The optical axis L4 of the far illumination section 2b is directed to the far side of the focal plane 7 of the Scheimpflug optical system 31, and the orientation of the far light emitting substrate 2f, that is, the orientation of the far light emitting element 2g is set and the far illumination lens 2h is designed so as to form such an optical axis L4.

The inclination angle of the far light emitting substrate 2f included in the far illumination section 2b with respect to the lower surface 66 adjacent to the first side surface 61 is larger than the inclination angle of the near light emitting substrate 2c included in the near illumination section 2a with respect to the lower surface 66, and the far light emitting substrate 2f is disposed above the near light emitting substrate 2c with respect to the lower surface 66. As a result, since the range where the illumination light can be emitted by the illumination section 2 (particularly, the near illumination section 2a) can be brought close to the first side surface 61 of the housing 60, the housing 60 can be installed at a position closer to the conveyance device B, and the height of the housing 60 can be reduced, so that the code reader 1 can be easily installed even at a distribution site or the like where the installation place is easily restricted.

As an example of the configuration of the housing 60, in the present embodiment, the second side surface 62 is formed of a sheet metal, and members such as a near-side support member 71, a far-side support member 72, a sensor attachment bracket 80, an upper attachment bracket 81, a lower attachment bracket 84, and a control board 90 are arranged and fixed on the sheet metal. Each member is covered with a cover member having a surface (that is, the first side surface 61, the third side surface 63, the fourth side surface 64, the upper surface 65, and the lower surface 66) other than the second side surface 62, and the inside of the housing 60 is sealed together with the sheet metal. The cover member is made of a metal material or a resin material. If the cover member is made of a metal material, it is possible to make the housing 60 robust, and if the cover member is made of a resin material, it is possible to reduce the weight of the housing 60. The heat dissipation fins 69 are disposed so as to extend from a surface of the sheet metal (second side surface 62) opposite to a surface on which the members are disposed.

Figure 16:
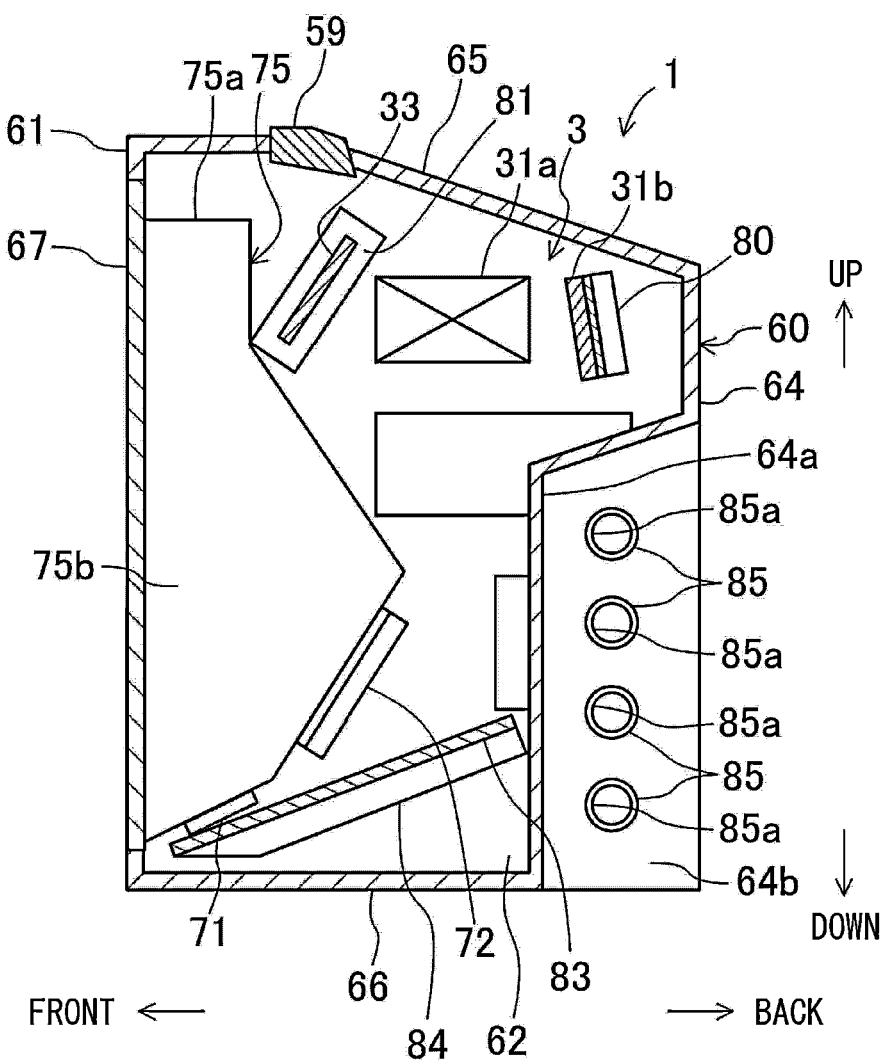
FIG. 16 is a cross-sectional view taken along line XVI-XVI in FIG. 7.

As illustrated in FIG. 16, the housing 60 includes a partition member 75 disposed between the illumination section 2 and the imaging unit 3 and optically separating the illumination section 2 and the imaging unit 3. The partition member 75 is made of a resin material, a metal material, or the like having a light shielding property, and includes a side plate portion 75a (also illustrated in FIG. 15) formed so as to protrude from the second side surface 62 toward the inside of the housing 60, and a vertical plate portion 75b continuous with the end portion of the side plate portion 75a on the inner side of the housing 60. As a result, the illumination light emitted from the illumination section 2 is emitted to the outside of the housing 60 only from the light projecting window 68, so that stray light is less likely to enter the imaging unit 3.

The imaging unit 3 is disposed near an upper end in the housing 60. The upper end in the housing 60 corresponds to one end of the light receiving window 67 in the longitudinal direction with respect to the light receiving window 67. Therefore, the imaging unit 3 is disposed near one end of the light receiving window 67 in the longitudinal direction in the housing 60. On the other hand, the lower end in the housing 60 corresponds to the other end of the light receiving window 67 in the longitudinal direction with respect to the light receiving window 67. Therefore, the illumination section 2 is disposed near the other end of the light receiving window 67 in the longitudinal direction in the housing 60.

The image sensor 31b of the imaging unit 3 is disposed on the back side in the housing 60, and is fixed to the second side surface 62 by the sensor attachment bracket 80. The light receiving surface of the image sensor 31b faces the front side. The lens 31a of the imaging unit 3 is disposed on the front side of the image sensor 31b in the housing 60, and is fixed to the second side surface 62. The optical axis of the lens 31a extends in the depth direction of the housing 60. The flat mirror 33 of the imaging unit 3 is disposed on the front side of the lens 31a in the housing 60, and is fixed to the second side surface 62 by the upper attachment bracket 81. The reflecting surface of the flat mirror 33 faces obliquely downward.

The code reader 1 includes an internal reflection member 83 that is stored in the housing 60 and turns back light incident on the imaging unit 3. The internal reflection member 83 is disposed near the lower end in the housing 60, and is fixed to the second side surface 62 by the lower attachment bracket 84. The front end of the internal reflection member 83 is positioned near the lower end of the light receiving window 67. On the other hand, the end portion of the internal reflection member 83 on the back side is located nearer than the end portion of the housing 60 on the back side. The reflecting surface of the internal reflection member 83 faces upward, and specifically, is inclined so as to be positioned upward as going to the back side. The internal reflection member 83 is disposed on the lower side, the imaging unit 3 is disposed on the upper side, and the light incident through the light receiving window 67 from above is turned back upward by the internal reflection member 83 to be incident on the image sensor 31b, so that the dimension of the housing 60 in the height direction can be shortened to make the code reader 1 compact.

Figure 8:
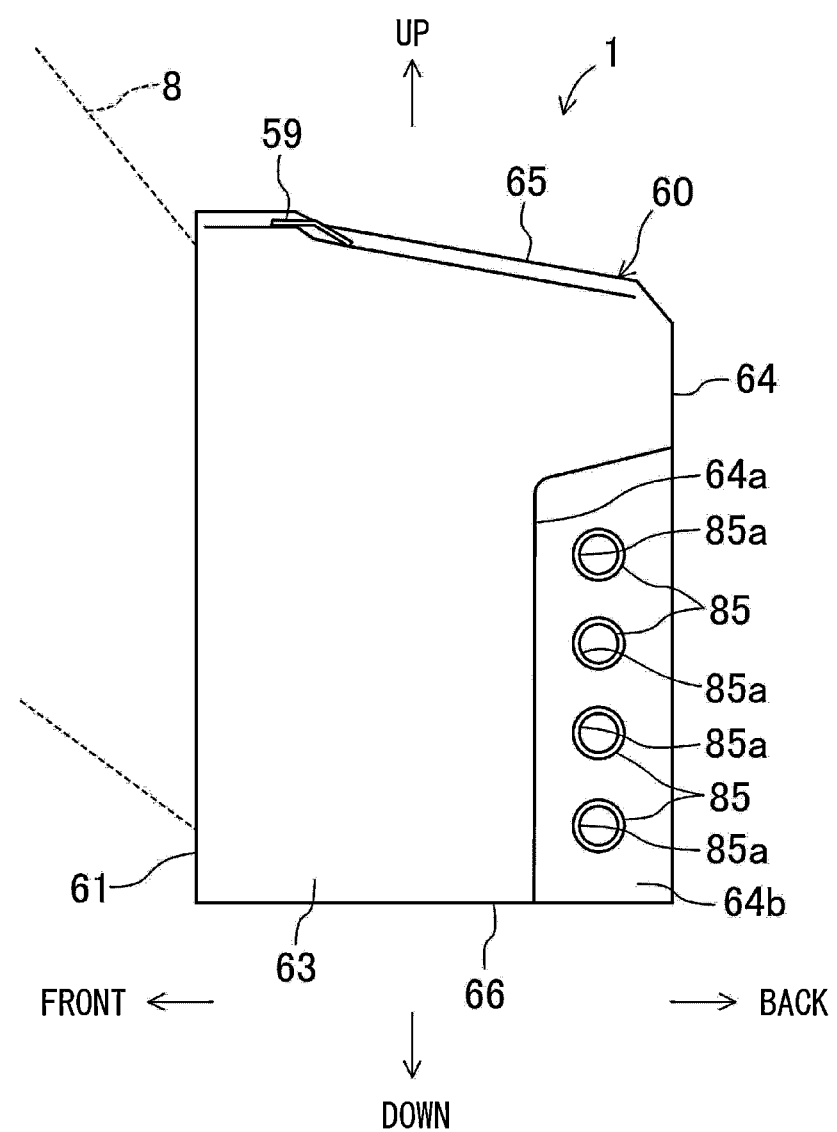
FIG. 8 is a side view of the code reader.
Figure 9:
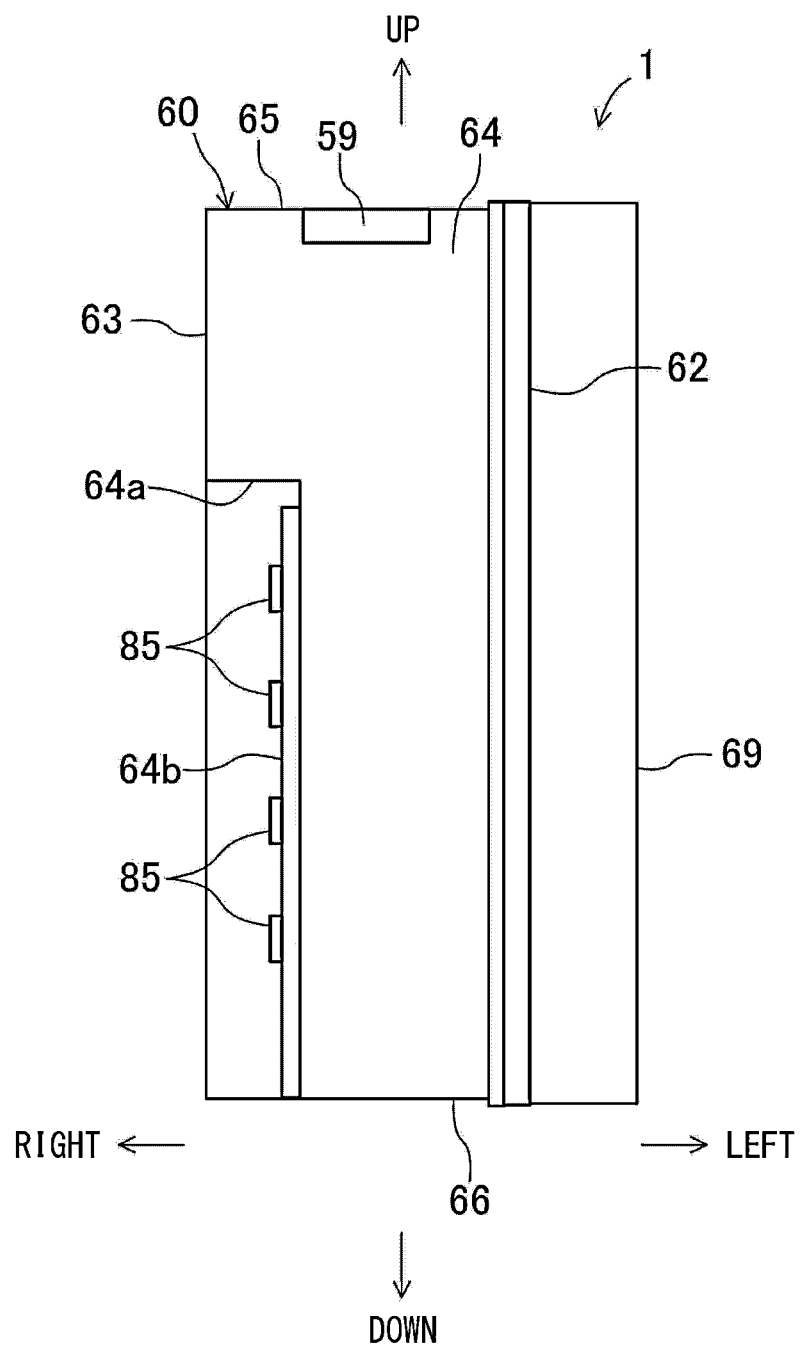
FIG. 9 is a rear view of the code reader.

As illustrated in FIGS. 8 to 10 and the like, the code reader 1 includes a marker 59. The marker 59 is provided on the upper surface 65 of the housing 60, is controlled by the control unit 4, and is switched between a light-on state and a light-off state. The marker 59 is a member for indicating success and failure in reading the code to the user by color, and shines green at the time of success and red at the time of failure or abnormality, for example. The control unit 4 controls the marker 59 so as to turn off the marker 59 at the time of capturing an image by the imaging unit 3.

The code reader 1 includes a connector portion 85 connected to the outside. A computer 200, a PLC 201, a power supply, and the like are connected to the connector portion 85. The connector portion 85 is provided on the back side of the housing 60 so as to face the outside of the housing 60. Specifically, the fourth side surface 64 of the housing 60 is provided with a recess 64a, and the connector portion 85 is attached to an inner side surface 64b of the recess 64a. In this embodiment, an example is shown in which the plurality of connector portions 85 are provided at intervals in the up-down direction, but the number of connector portions 85 can be arbitrarily set. The connector portion 85 has an insertion port 85a into which a terminal (not illustrated) of a wiring or the like is inserted. Since the insertion port 85a is opened to the right, the terminal of the wiring can be inserted into each insertion port 85a from the right side of the housing 60.

The image sensor 31b is disposed directly above the connector portion 85. In addition, the illumination section 2 and the internal reflection member 83 are disposed between the light receiving window 67 and the connector portion 85. That is, since the lens 31a, the image sensor 31b, and the flat mirror 33 constituting the imaging unit 3 need to be arranged at intervals in the depth direction of the housing 60, it is difficult to secure a space for arranging the connector portion 85 in the upper portion of the housing 60. However, since the illumination section 2 and the internal reflection member 83 have a shorter dimension in the depth direction of the housing 60 than the imaging unit 3, in the present embodiment, a space for arranging the connector portion 85 can be secured on the back side of the illumination section 2 and the internal reflection member 83 without increasing the size of the housing 60.

When the code reader 1 is installed as illustrated in FIGS. 1 to 3, the bottom surface of the workpiece W conveyed by the conveyance device B is exposed downward from the gap between the upstream conveyance mechanism B1 and the downstream conveyance mechanism B2. The depth of field of the imaging unit 3 of the code reader 1 installed as illustrated in FIGS. 1 to 3 includes the bottom surface of the workpiece W exposed from the gap of the conveyance device B. As a result, the imaging unit 3 can directly capturing the bottom surface of the workpiece W through the gap between the upstream conveyance mechanism B1 and the downstream conveyance mechanism B2. The term "directly" means that the imaging unit 3 captures the bottom surface of the workpiece W without interposing a reflecting member such as a mirror.

In the case of being installed as illustrated in FIGS. 1 to 3, the light receiving window 67 and the gap of the conveyance device B are aligned. In this state, the row direction of the image sensor 31b corresponds to the direction in which the gap of the conveyance device B extends, and the column direction of the image sensor 31b corresponds to the conveyance direction of the conveyance device B (the direction indicated by the arrow A in FIG. 1).

Figure 17:
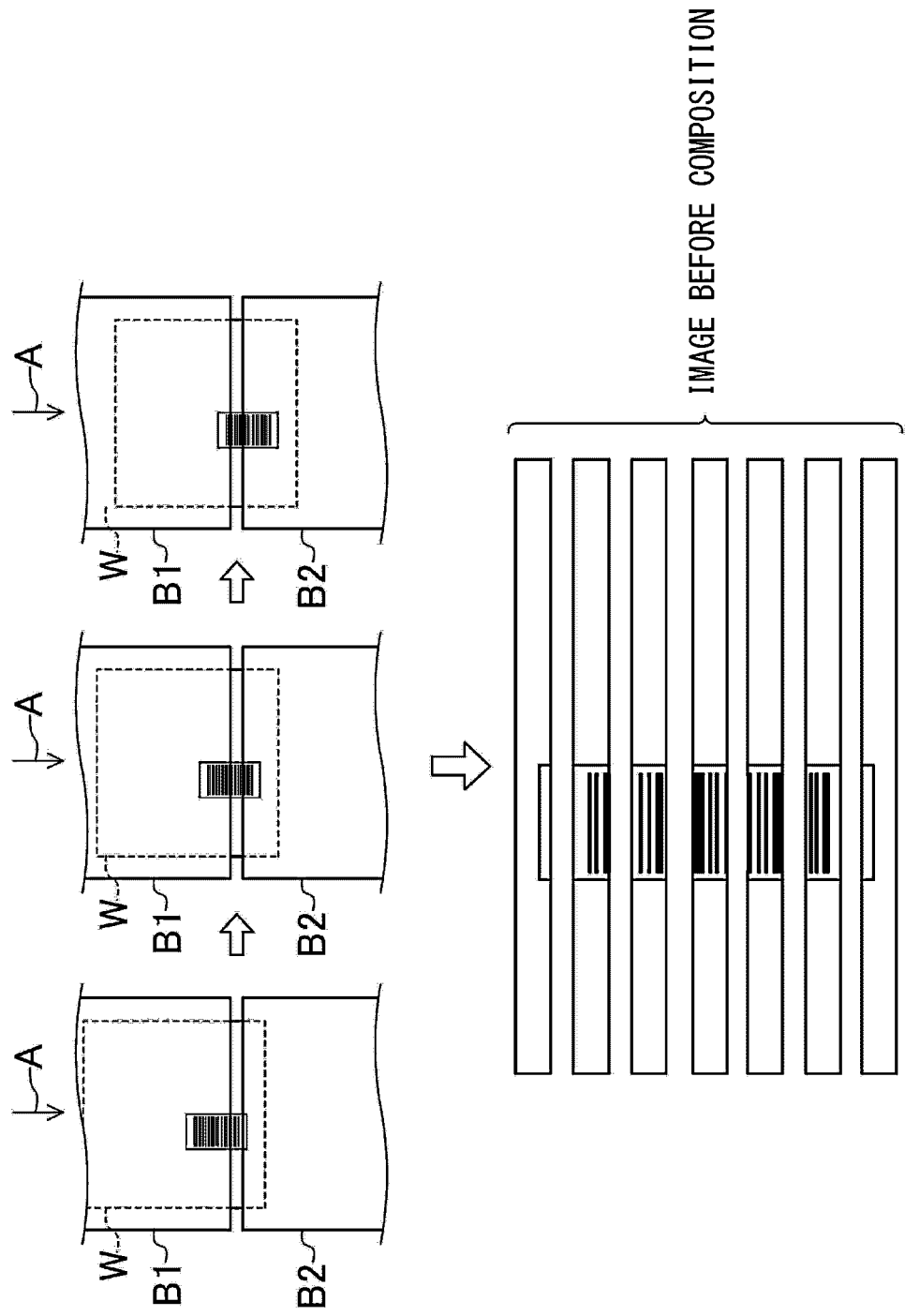
FIG. 17 is a view for explaining a state of capturing an image of a bottom surface of a workpiece being conveyed.

Therefore, as illustrated in FIG. 17, the imaging unit 3 outputs a plurality of images in which a part of the code attached to the bottom surface of the workpiece W is captured by continuously capturing the bottom surface of the workpiece W exposed from the gap of the conveyance device B and included in the depth of field of the imaging unit 3. The upper side of FIG. 17 illustrates a case where the upstream conveyance mechanism B1 and the downstream conveyance mechanism B2 that convey the workpiece W are viewed from below, and the workpiece W is conveyed as illustrated from the left to the right. Since the dimension of the code in the conveyance direction is longer than the gap between the upstream conveyance mechanism B1 and the downstream conveyance mechanism B2, only a part of the code in the conveyance direction is exposed downward from the gap between the upstream conveyance mechanism B1 and the downstream conveyance mechanism B2. As illustrated in the lower part of FIG. 17, a plurality of images in which a part of the code in the conveyance direction is captured are sequentially output from the imaging unit 3. The plurality of images output from the imaging unit 3 are input to the control unit 4. The image output from the imaging unit 3 becomes an elongated image in the longitudinal direction of the gap between the upstream conveyance mechanism B1 and the downstream conveyance mechanism B2 by geometric correction to be described later.

(Details of Control Unit 4)

The control unit 4 is a unit that generates a composite image on the basis of the plurality of images output from the imaging unit 3 and executes decoding processing on the code attached to the bottom surface of the workpiece W on the basis of the composite image. As illustrated in FIG. 2, as a specific configuration example of the control unit 4, for example, a configuration example including a microcomputer including a central processing unit, a ROM, a RAM, and the like can be exemplified. The imaging control unit 41, the illumination control unit 42, the code detection unit 43, and the decoding unit 44 are configured by hardware included in the control unit 4, software executed by the control unit 4, and the like.

The code detection unit 43 of the control unit 4 is a unit that specifies a code region on the basis of the code image output from the imaging unit 3 and detects a code from the specified code region. The decoding unit 44 of the control unit 4 is a unit that decodes the code detected by the code detection unit 43, and specifically, since the code is represented by the black-and-white binarized data, the decoding unit decodes the black-and-white binarized data. For decoding, a table indicating a contrast relationship of encoded data can be used. Further, the decoding unit 44 checks whether the decoding result is correct according to a predetermined check method. In a case where an error is found in the data, correct data is calculated using an error correction function. The error correction function varies depending on the type of code. Hereinafter, details of the code detection unit 43 and the decoding unit 44 will be specifically described.

Hereinafter, details of processing by the control unit 4 will be described with reference to the flowchart illustrated in FIG. 18. This flowchart starts when the operation of the code reader 1 is started. In step SA1 after the start, the reading start trigger signal is input from the PLC 201 to the code reader 1. When the reading start trigger signal is input, the illumination control unit 42 turns on the illumination section 2, and the imaging control unit 41 causes the imaging unit 3 to capture an image to generate an image.

Figure 19:
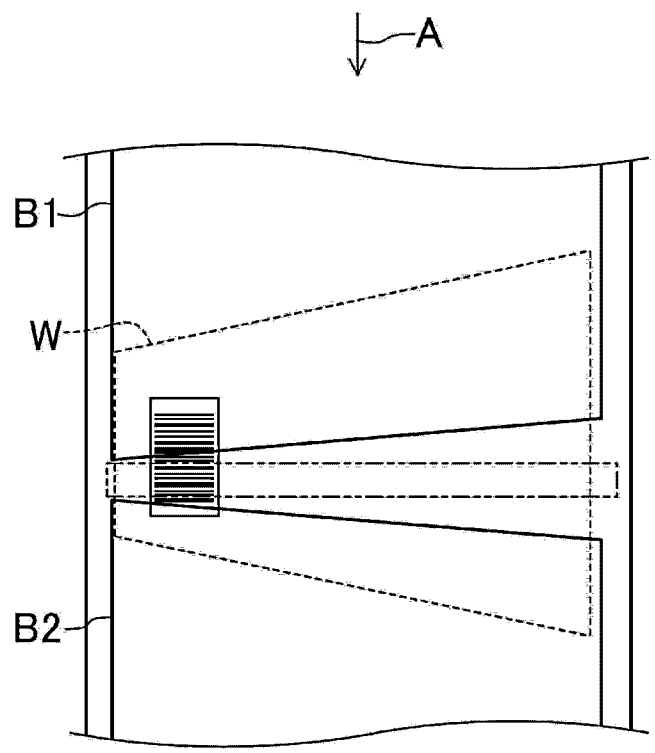
FIG. 19 is a view for explaining a case where an image of a bottom surface of a workpiece being conveyed is captured from a side of the conveyance device.

A region surrounded by a two-dot chain line in FIG. 19 is an image output from the imaging unit 3. In the present embodiment, since the code reader 1 is installed on the side of the conveyance device B, the bottom surface of the workpiece W is captured from obliquely below. Therefore, unlike the case of capturing an image from directly below, a geometric change occurs according to the installation angle of the code reader 1 as illustrated in FIG. 19. Specifically, in the plurality of images output from the imaging unit 3, the bottom surface of the workpiece W exposed from the gap between the upstream conveyance mechanism B1 and the downstream conveyance mechanism B2 is shown in a trapezoidal shape having one end on the near side of the focal plane of the Scheimpflug optical system 31 as a long side and the other end on the far side of the focal plane of the Scheimpflug optical system 31 as a short side.

Figure 18:
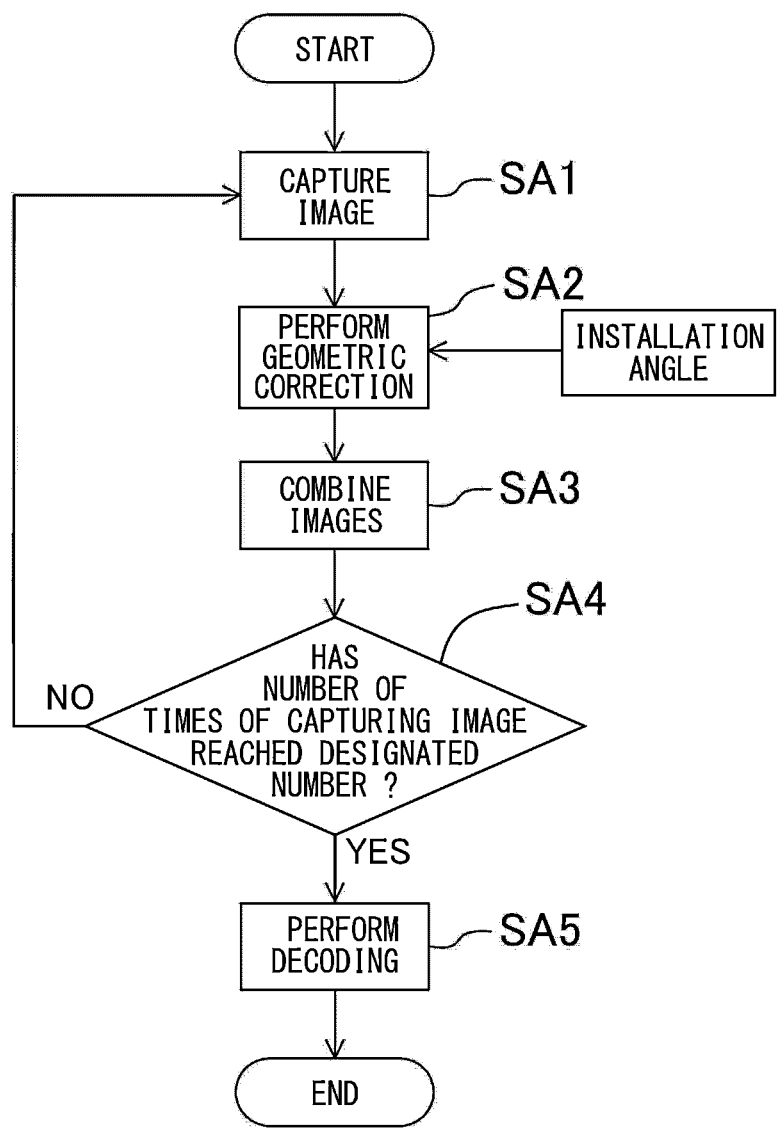
FIG. 18 is a flowchart illustrating an example of a series of processing from capturing an image to reading result output.

Therefore, in step SA2 of the flowchart illustrated in FIG. 18, the code detection unit 43 performs the trapezoid correction on the trapezoid shapes of the plurality of images as the geometric correction. Specifically, the code detection unit 43 acquires information on the installation angle of the code reader 1. The information on the installation angle of the code reader 1 may be information input by the user at the time of setting the code reader 1, or may be information automatically detected by the code reader 1. The code detection unit 43 performs geometric correction on each of the plurality of images output from the imaging unit 3 on the basis of the information regarding the installation angle of the code reader 1. As a result, an image similar to that in the case of capturing from directly below the workpiece W can be obtained.

In step SA3, the code detection unit 43 combines the plurality of processed images subjected to the geometric correction in step SA2 to generate a combined image including the code. In step SA4, it is determined whether the number of times of capturing an image of the imaging unit 3 has reached a designated number. The number of times is set to the number of times the entire code can be imaged. In a case where it is determined as NO in step SA4, the process proceeds to step SA1, and capturing an image, geometric correction, and image synthesis are repeated until the entire code is captured. In a case where it is determined as YES in step SA4, the process proceeds to step SA5.

In step SA5, the code detection unit 43 generates a plurality of edge images by applying a plurality of edge extraction filters for extracting edges of different frequencies to the image combined in step SA3, and then executes integration processing of the plurality of edge images. The code detection unit 43 determines a code candidate position on the basis of the result of the edge integration processing. That is, in the edge-processed image, a region where many pixels having large luminance values gather can be estimated as the code region.

For example, in order to search for the position of the code in the code image, the code detection unit 43 can generate a heat map image indicating code likeness. That is, the code detection unit 43 quantifies the characteristic amount of the code, generates a heat map in which the magnitude of the characteristic amount is assigned to each pixel value, and extracts a code candidate region in which the code is likely to exist on the heat map. As a specific example, there is a method of acquiring a feature portion of a code in a region that is relatively hot (has a large characteristic amount) in a heat map. In a case where a plurality of feature portions is acquired, the feature portions can be preferentially extracted and stored in a RAM or the like. By using the heat map image, the code region can be detected at high speed. The decoding unit 44 decodes the code searched by the code detection unit 43.

Operation and Effect of Embodiment

The code reader 1 according to the present embodiment is fixed to a general horizontal or vertical surface as an external fixing surface located on the side of the conveyance device B and below the conveyance surface via the attachment surface of the housing, so that it is possible to realize the posture of the housing in which a depth of field in the longitudinal direction of the gap of the conveyance device B is formed. For adjustment of the position in the height direction, for example, it is only required to move while maintaining the posture using an image actually captured or the height from the upper surface of the housing to the focal plane obtained on the basis of the Scheimpflug optical system and the housing design, so that installation is facilitated. In addition, since the plane formed by the light receiving window 67 in the installation state intersects the horizontal plane, dust and dirt hardly accumulate in the light receiving window 67. In addition, since the code reader 1 is installed on the side of the conveyance device B, the light receiving window 67 is arranged at a position deviated from the gap between the upstream conveyance mechanism B1 and the downstream conveyance mechanism B2. This makes it difficult for dust and dirt falling from the gap between the upstream conveyance mechanism B1 and the downstream conveyance mechanism B2 to adhere to the light receiving window 67. The same applies to the light projecting window 68. As a result, the frequency of maintenance such as cleaning can be reduced, and the burden on the user can be reduced.

In addition, when the housing 60 is installed such that the depth of field of the Scheimpflug optical system 31 includes the gap of the conveyance device B, the longitudinal direction of the light receiving window 67 can correspond to the longitudinal direction of the gap of the conveyance device B. As a result, it is possible to capture the code attached to the workpiece W through the gap of the conveyance device B. At this time, since the illumination section 2 is adjacent in the lateral direction of the light receiving window 67, the illumination optical axis and the optical axis of the lens 31a of the imaging unit 3 are close to each other, and the visual field range of the imaging unit 3 is brightly illuminated by the illumination section 2.

As a result, an image with brightness necessary for decoding processing is obtained.

Other Embodiments

The above-described embodiments are merely examples in all respects, and should not be construed in a limiting manner. Further, all modifications and changes falling within the equivalent scope of the claims are within the scope of the invention.

Figure 20:
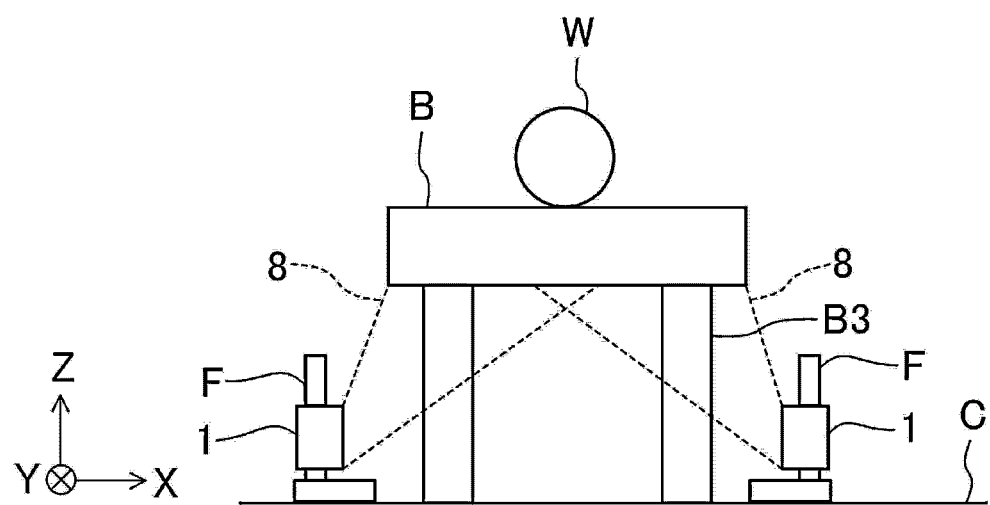
FIG. 20 is a view for explaining an example of a case where a plurality of code readers is installed.

FIG. 20 is a view illustrating a case where the code readers 1 are installed on both sides of the conveyance device B. As illustrated in this drawing, by installing a plurality of code readers 1 so as to captures the workpiece W from directions opposite to each other, it is possible to cope with the conveyance device B having a wide width in the X direction and to reduce a blind spot. The shape of the workpiece W is not particularly limited, and may be a cylindrical workpiece W as illustrated in FIG. 20. Since the code reader 1 of the disclosure captures an image from obliquely below the workpiece W, it is possible to widen a range in which a code attached to a portion not in contact with the conveyance surface of the workpiece W can be read even in the case of a cylindrical workpiece W.

In the above-described embodiment, as illustrated in FIGS. 15B and 15C, the inclination angles of the respective optical axes of the near illumination section 2a and the far illumination section 2b with respect to the focal plane 7 are different in side view. As a result, the dimension of the housing 60 in the height direction can be shortened by making the near illumination section 2a and the far illumination section 2b compact, but the invention is not limited thereto. For example, as schematically illustrated in FIGS. 21A and 21B, the optical axes of the near illumination section 2a and the far illumination section 2b may be provided so as to be substantially parallel, that is, the inclination angles of the optical axes with respect to the focal plane 7 may be substantially the same.

Figure 21A:
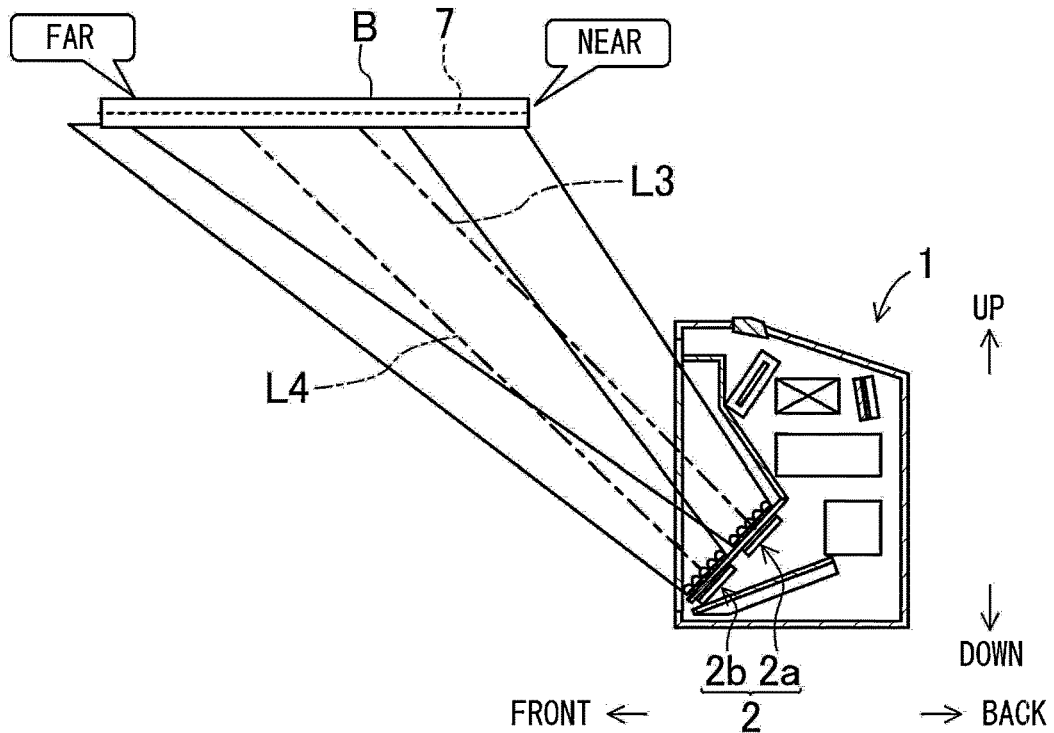
FIG. 21A is a view for explaining a first example in a case where optical axes of a near illumination section and a far illumination section are provided substantially in parallel.
Figure 21B:
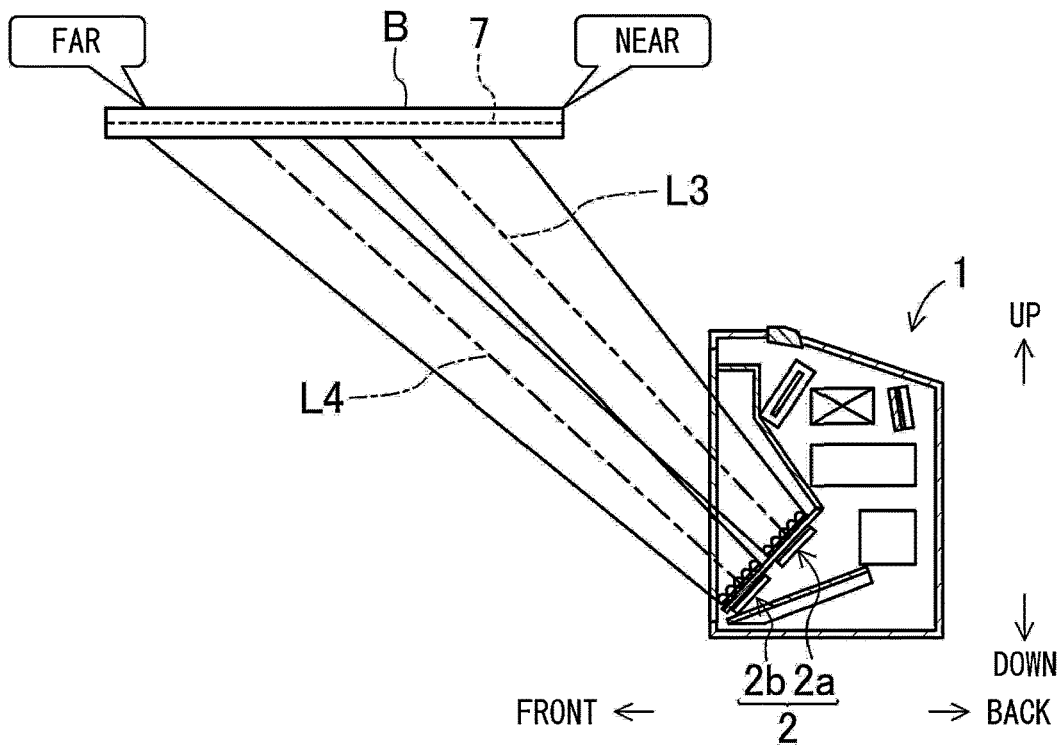
FIG. 21B is a view for explaining a second example in a case where optical axes of the near illumination section and the far illumination section are provided substantially in parallel.

In the case of FIG. 21A, the region where the illumination light by the near illumination section 2a and the illumination light by the far illumination section 2b overlap on the focal plane 7 is unevenly distributed on the far side of the focal plane 7 rather than the near side. In the case of FIG. 21B, as compared with FIG. 21A, the light distribution angle of the illumination light by the near illumination section 2a and the illumination light by the far illumination section 2b is narrowed to reduce the overlapping region on the focal plane 7, while the light flux of the far illumination section 2b is made larger than the light flux of the near illumination section 2a. In either case, the lack of illuminance on the far side with respect to the near side of the focal plane 7 is suppressed, or the illuminance on the far side is made equal to or greater than the illuminance on the near side, whereby the lack of luminance on the far side with respect to the luminance on the near side of the image output by the imaging unit 3 is suppressed, and thus an image with more uniform luminance can be generated on the near side and the far side of the imaging unit 3, so that the reading efficiency can be improved.

Figure 22:
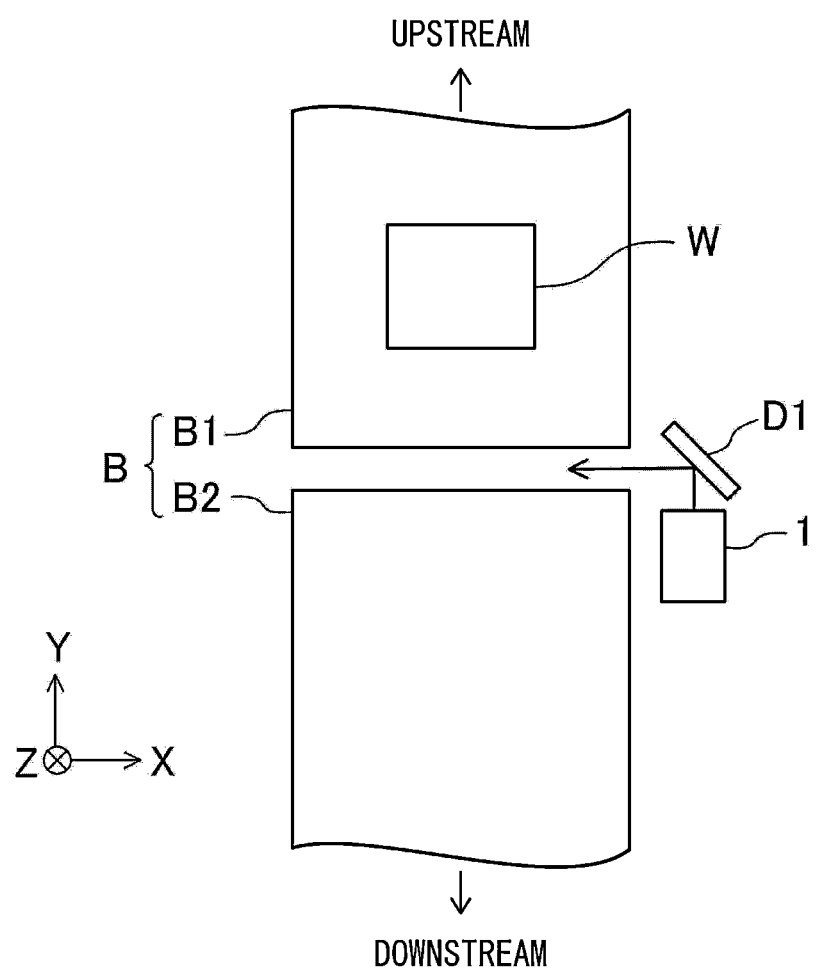
FIG. 22 is a view corresponding to FIG. 4 showing a first example using an external reflection member.

As illustrated in FIG. 22, in a case where the code reader 1 is installed on the side of the conveyance device B, light may be turned back using a mirror (external reflection member) D1.

The mirror D1 may be attached to housing 60 or may be attached to a member different from housing 60. This is an effective installation method in a case where a sufficient installation space for aligning the light receiving window 67 so as to face the longitudinal direction of the gap of the conveyance device B cannot be secured on the side of the conveyance device B.

Figure 23:
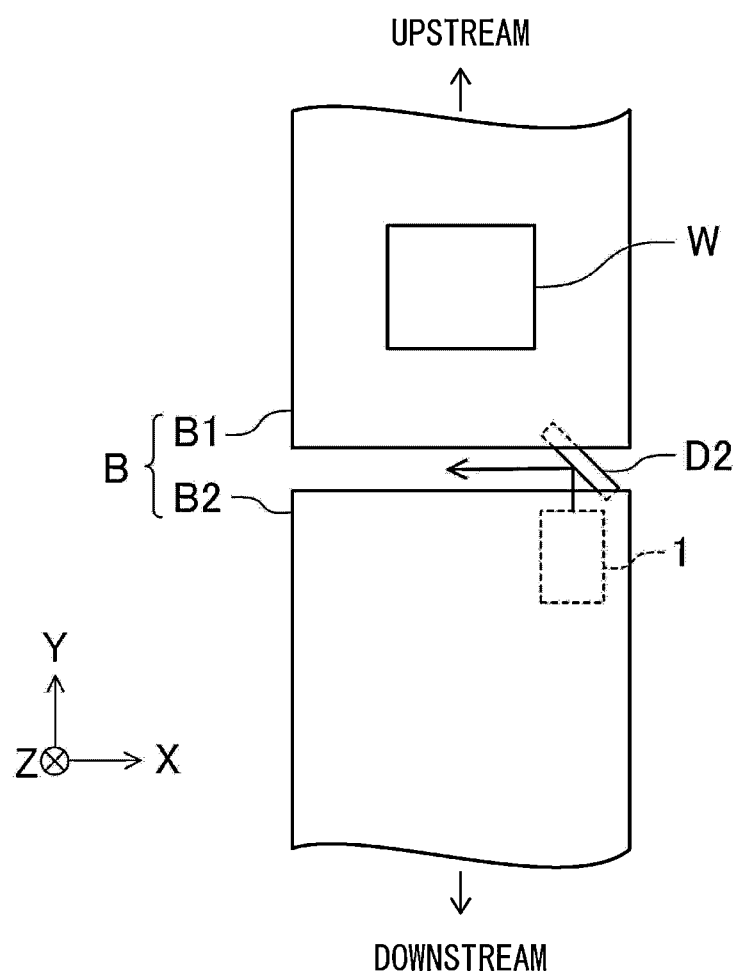
FIG. 23 is a view corresponding to FIG. 4 showing a second example using an external reflection member.

As illustrated in FIG. 23, in a case where the code reader 1 is installed directly below the conveyance device B, light may be turned back using a mirror (external reflection member) D2. The mirror D2 may be attached to housing 60 or may be attached to a member different from housing 60. In a case where almost no installation space can be secured on the side of the conveyance device B, the code reader 1 can be installed directly below the conveyance device B.

In either case of FIGS. 22 and 23, when the housing 60 is installed such that the optical axis 10 of the lens in the housing 60 is substantially parallel to the conveyance direction (Y direction) in top view, the optical axis 10 of the lens outside the housing 60 is turned back in a direction (X direction) substantially parallel to the longitudinal direction of the gap between the conveyance devices B by the mirror (external reflection member) D2 in top view, so that the imaging unit 3 can capture the bottom surface of the workpiece W via the external reflection member D2.

Figure 24:
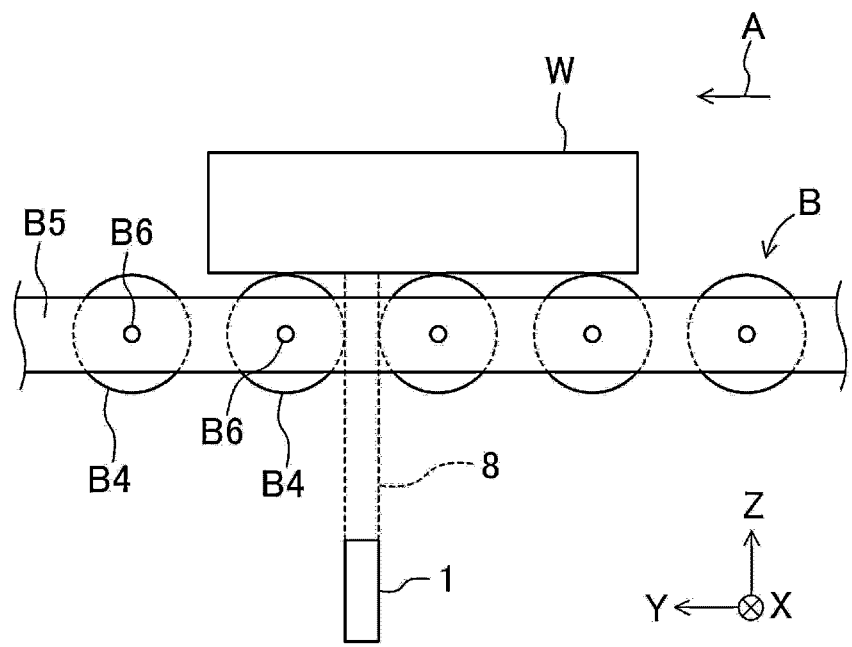
FIG. 24 is a side view illustrating a case where a workpiece is conveyed by a roller conveyor.

As illustrated in FIG. 24, the conveyance device B may be configured by a roller conveyor. That is, the conveyance device B includes a plurality of rollers B4 that rotate about a horizontal axis and a frame B5 that supports the rollers B4. Each roller B4 and a shaft B6 that rotates each roller B4 constitute a conveyance mechanism. A gap is provided between the rollers B4 and B4 adjacent to each other in the conveyance direction. The code reader 1 is configured to be able to read the code attached to the bottom surface of the workpiece W through the gap between the rollers B4 and B4 adjacent in the conveyance direction.

In addition, the code reader 1 according to the present embodiment is not limited to the installation position described above, and can be installed at the same height as the conveyance surface or at a position higher than the conveyance surface. Therefore, the code reader 1 can also be used when a code attached to the side surface or the upper surface of the workpiece W is read in addition to the code attached to the bottom surface of the workpiece W.

Other Embodiments

The embodiment of the invention is not limited to the above embodiment, and may be, for example, other embodiments as described below. In the following description of another embodiment, the same members as those in the above embodiment will be denoted by the same reference numerals, description thereof will be omitted, and different portions will be described in detail. In addition, by combining the above embodiment and the following other embodiments, it is also possible to make still other embodiments. When combining the above embodiment with the following other embodiments, the position of the above embodiment and a part of the following other embodiments can be combined.

Figure 26:
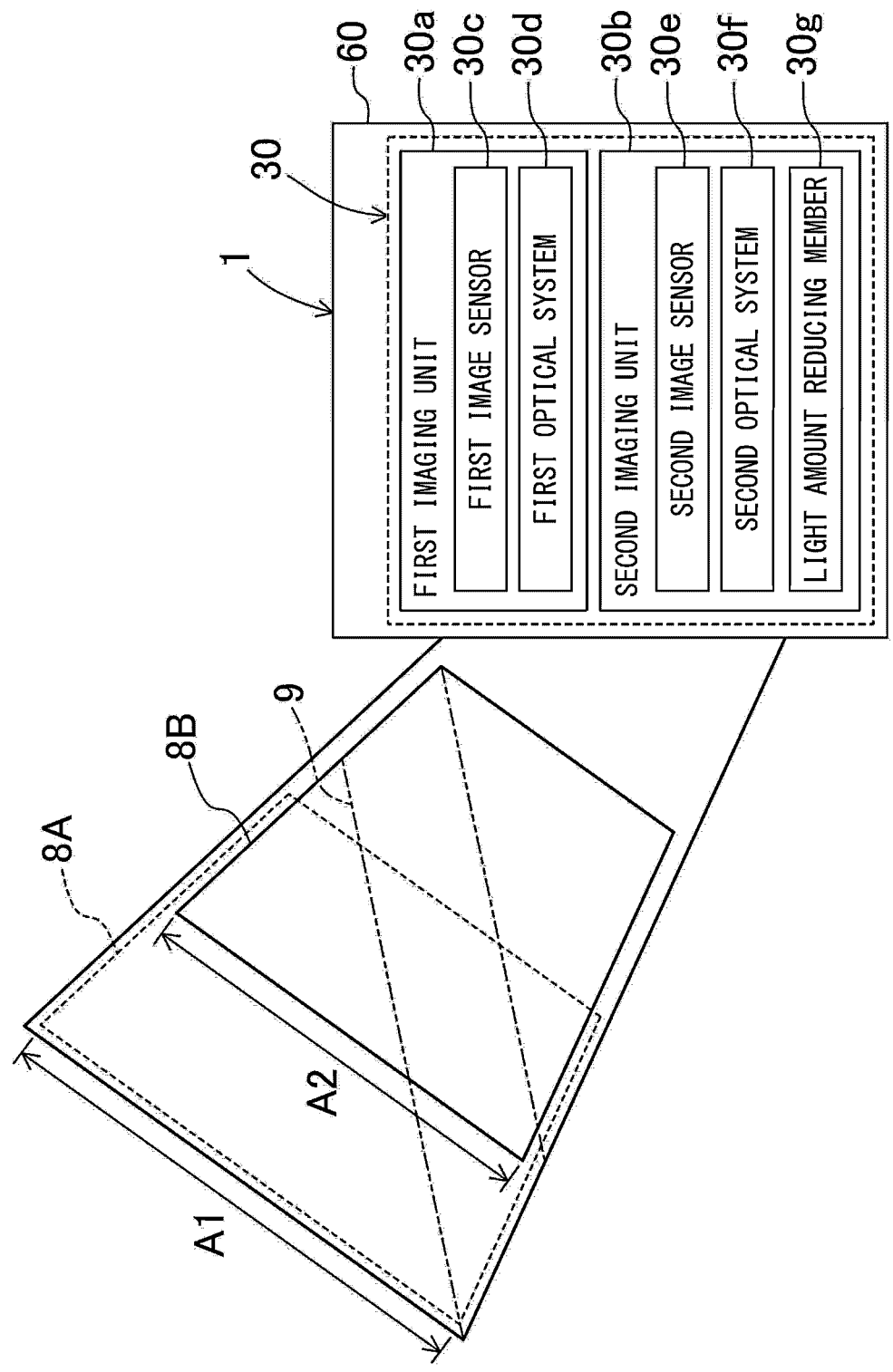
FIG. 26 is a schematic view illustrating a visual field range and a depth of a code reader according to a first example of another embodiment of the invention.

The first example illustrated in FIG. 26 is an example in which an imaging unit 30 of the code reader 1 includes a first imaging unit 30a and a second imaging unit 30b. The first imaging unit 30a includes a first image sensor 30c and a first optical system 30d. The first image sensor 30c has a two-dimensional light receiving surface for forming a predetermined visual field, and is a member that generates an image corresponding to an image projected on the light receiving surface via a light receiving window (also referred to as a transmission window) 67. The light receiving window 67 is made of a transparent member having a short side extending in the lateral direction and a long side extending in the longitudinal direction. The first optical system 30d is a member that is interposed between the light receiving window 67 and the light receiving surface of the first image sensor 30c and projects an image corresponding to the code attached to the workpiece W in the housing 60 onto the light receiving surface of the first image sensor 30c. The first optical system 30d forms an optical path in which an optical axis passing through the center of the visual field is inclined with respect to the direction of the long side and which is longer in the direction of the long side than in the direction of the short side. The visual field and the depth of the first imaging unit 30a can be set by various parameters of the first optical system 30d.

The second imaging unit 30b includes a second image sensor 30e and a second optical system 30f. The second image sensor 30e has a two-dimensional light receiving surface for forming a predetermined visual field, and is a member that generates an image corresponding to an image projected on the light receiving surface via a light receiving window 67. The second optical system 30f is a member that is interposed between the light receiving window 67 and the light receiving surface of the second image sensor 30e and projects an image corresponding to the code attached to the workpiece W in the housing 60 onto the light receiving surface of the second image sensor 30e. The second optical system 30f is long along the longitudinal direction of the light receiving window 67, and forms an optical path in which an optical axis passing through the center of the visual field is inclined with respect to the longitudinal direction. The visual field and the depth of the second imaging unit 30b can be set by various parameters of the second optical system 30f. The optical axis of the first imaging unit 30a and the optical axis of the second imaging unit 30b have a close relationship.

The visual field and the depth of the first imaging unit 30a are different from the visual field and the depth of the second imaging unit 30b. Specifically, the visual field and the depth of the first imaging unit 30a are a range (referred to as a first range) surrounded by a broken-line frame indicated by reference numeral 8A in FIG. 26. Various parameters of the first optical system 30d are set so as to be in the first range 8A. On the other hand, the visual field and the depth of the second imaging unit 30b are in a range (referred to as a second range) surrounded by a solid frame indicated by reference numeral 8B in FIG. 26. Various parameters of the second optical system 30f are set so as to be in the second range 8B.

The first range 8A is set to include a region farther than the second range 8B, and the farthest visual field range A1 of the first range 8A is extended from the farthest visual field range A2 of the second range 8B. The second range 8B is set to include a region closer than the first range 8A. By providing the first image sensor 30c and the second image sensor 30e, the visual field and the depth of the imaging unit 30 are expanded. In short, the imaging unit 30 includes a first image sensor 30c and a second image sensor 30e for expanding the visual field and the depth in the depth direction orthogonal to the plane forming the light receiving window 67 in the imaging visual field. By extending the visual field and the depth, a depth of field (reading region) is set as indicated by reference numeral 9. Note that a third imaging unit may be provided in addition to the first imaging unit 30a and the second imaging unit 30b. In this case, the visual fields and the depths of the first imaging unit 30a, the second imaging unit 30b, and the third imaging unit can be configured to be different from each other.

Since the first imaging unit 30a is an imaging unit capable of capturing a farther side than the second imaging unit 30b, it can also be referred to as a far imaging unit. On the other hand, since the second imaging unit 30b is an imaging unit capable of capturing the near side of the first imaging unit 30a, it can also be referred to as a near imaging unit. As described above, the imaging unit 30 includes a near imaging unit that captures the near side and a far imaging unit that captures the far side. In a case where the third imaging unit is provided, the third imaging unit can be, for example, a short-range imaging unit.

The code reader 1 further includes a light amount reducing member 30g that reduces the light amount difference from the light amount incident on the first image sensor 30c of the first imaging unit 30a that is the far-side imaging unit by reducing the light amount incident on the second image sensor 30e of the second imaging unit 30b that is the near-side imaging unit. The light amount reducing member 30g includes a light reducing filter (for example, an ND filter) provided in the second optical system 30f of the second imaging unit 30b. The light reduction amount by the light reducing filter can be arbitrarily set. The light amount reducing member 30g may be provided as necessary, and may be omitted.

Figure 27:
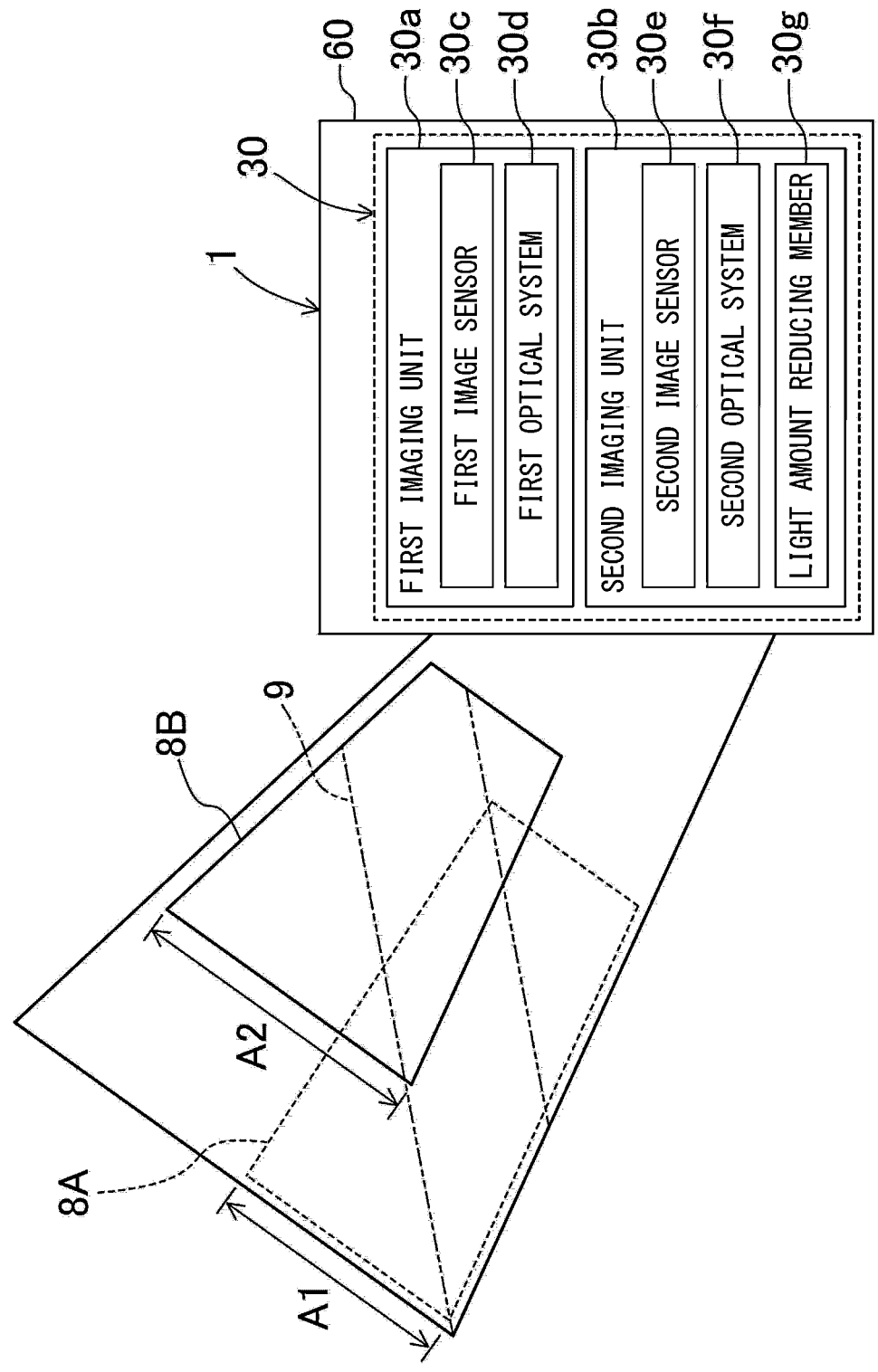
FIG. 27 is a schematic view illustrating a visual field range and a depth of a code reader according to a second example of the embodiment of the invention.

FIG. 27 illustrates a second example, which is the same as the first example in that the imaging unit 30 includes a first imaging unit 30a and a second imaging unit 30b, but is different from the first example in the visual field and the depth of the first image sensor 30c and the second image sensor 30e. In addition, the optical axis of the first imaging unit 30a and the optical axis of the second imaging unit 30b are separated from each other as compared with the first example. That is, in the second example, the first range 8A is set to be located below the second range 8B and to include a region farther than the second range 8B. The visual field and the depth of the imaging unit 30 are extended by the farthest visual field range A1 of the first range 8A and the farthest visual field range A2 of the second range 8B. In the second example, since the optical path of the first imaging unit 30a and the optical path of the second imaging unit 30b do not match, a partial region of the light receiving window 67 is a portion corresponding to the optical path of the first imaging unit 30a, and the other region is a portion corresponding to the optical path of the second imaging unit 30b. In this case, the light amount reducing member 30g can include a light reducing filter provided in a portion of the light receiving window 67 corresponding to the optical path of the second imaging unit 30b. As a result, it is possible to reduce the light amount difference between the light amount incident on the second image sensor 30e of the second imaging unit 30b and the light amount incident on the first image sensor 30c of the first imaging unit 30a. Also in the second example, similarly to the first example, a light reducing filter may be provided in the second optical system 30f.

Figure 28:
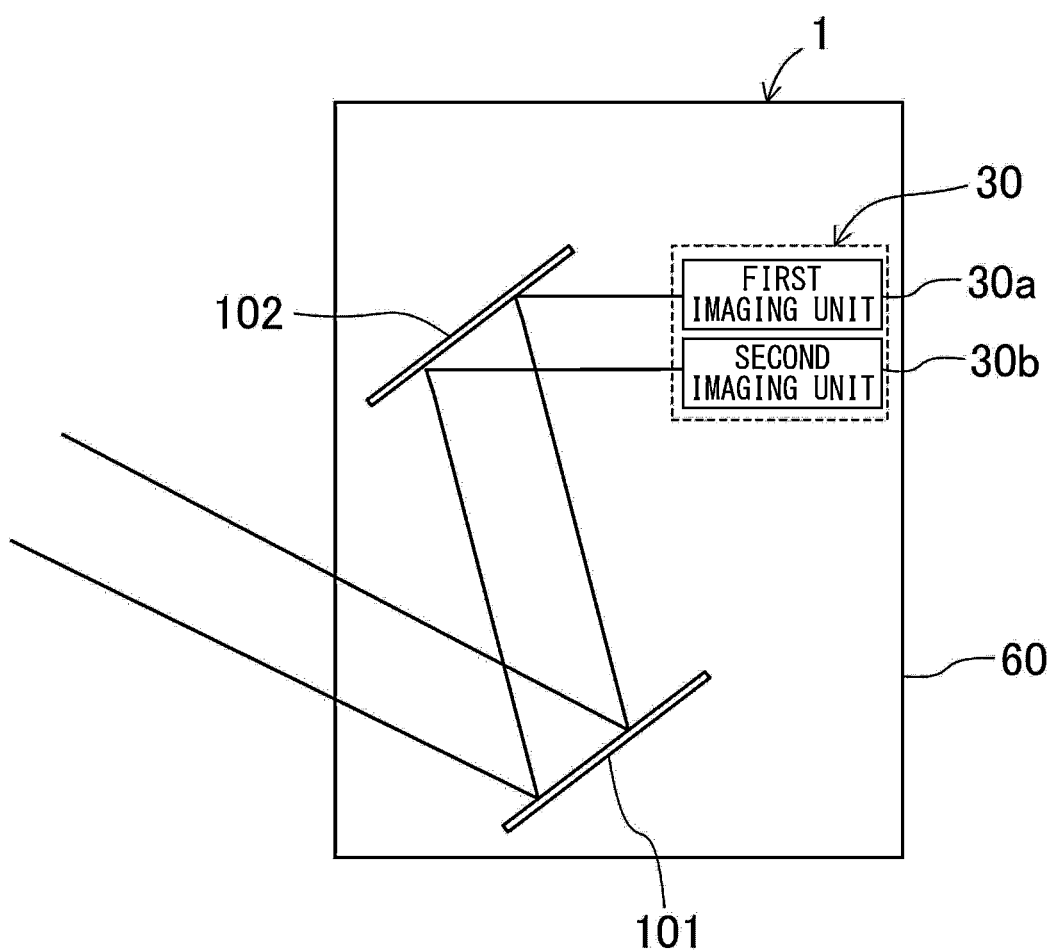
FIG. 28 is a schematic diagram of a code reader according to a third example of the embodiment of the invention.

FIG. 28 is a schematic diagram of a code reader 1 according to a third example of another embodiment. The third example also includes a first imaging unit 30*a* and a second imaging unit 30*b*. In the third example, the first imaging unit 30*a* and the second imaging unit 30*b* are arranged in parallel, and light from the outside of the housing 60 enters the first imaging unit 30*a* and second imaging unit 30*b* via a first mirror 101 and a second mirror 102. With such a configuration, the optical axes of the first imaging unit 30*a* and the second imaging unit 30*b* can be separated from each other.

Figure 29:
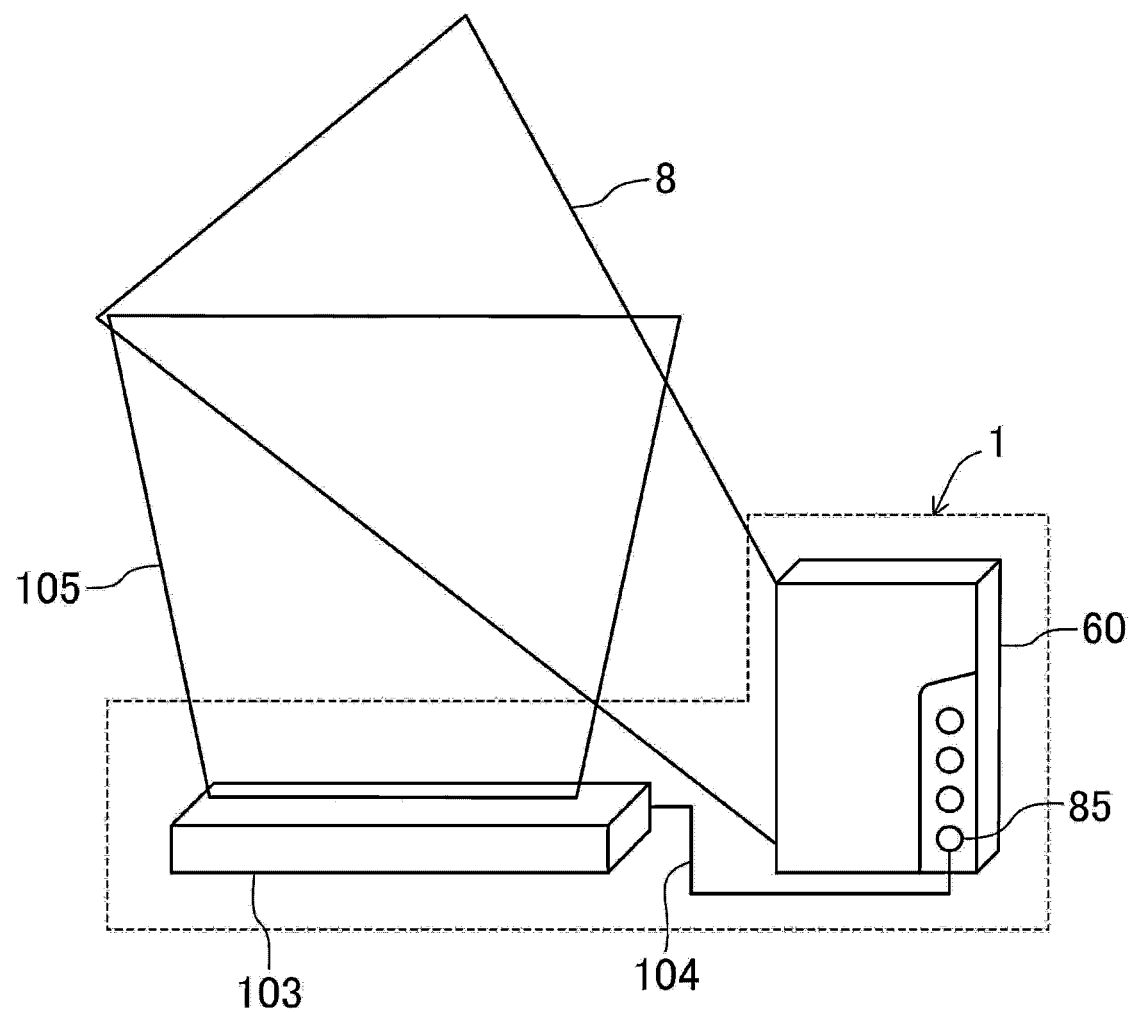
FIG. 29 is a schematic diagram of a code reader according to a fourth example of the embodiment of the invention.

FIG. 29 is a schematic diagram of a code reader 1 according to a fourth example of another embodiment. The code reader 1 includes an external illumination unit 103 separate from the housing 60 in which the imaging unit 3 is stored. The external illumination unit 103 includes a light emitter including a light emitting diode or the like, and is connected to the illumination control unit 42 stored in the housing 60 via a connection line 104. The connection line 104 can be connected to one connector portion 85 among the plurality of connector portions 85 provided outside the housing 60. That is, one connector portion 85 of the plurality of connector portions 85 is a connector portion for connecting the external illumination unit 103.

The external illumination unit 103 is controlled by the illumination control unit 42 to illuminate the workpiece W in synchronization with the imaging unit 3 stored in the housing 60. An irradiation region 105 by the external illumination unit 103 is set to include the visual field range 8 of the imaging unit 3.

Figure 30:
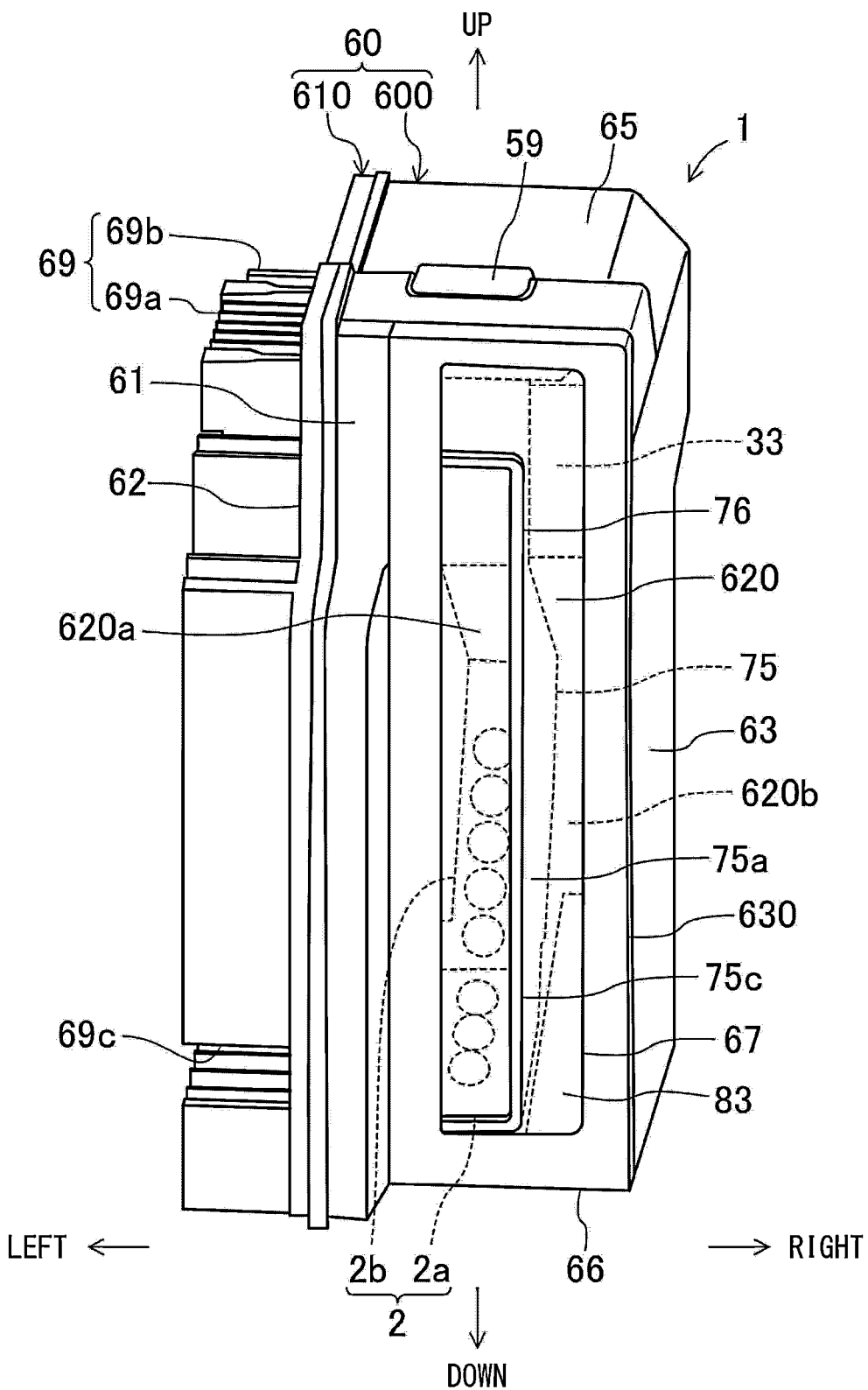
FIG. 30 is a perspective view of a code reader according to a fifth example of the embodiment of the invention as viewed from the front side.
Figure 31:
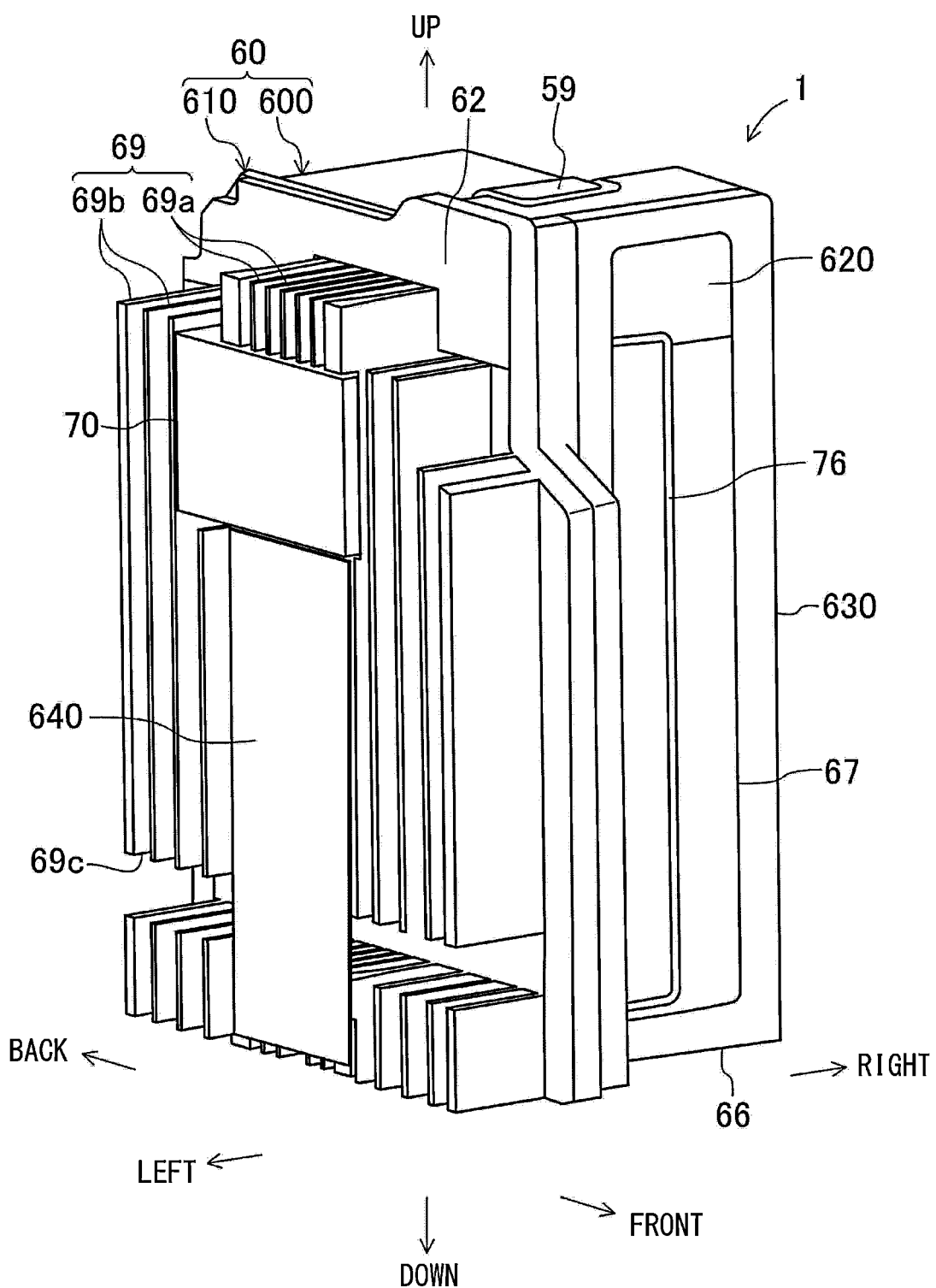
FIG. 31 is a perspective view of a code reader according to the fifth example of the embodiment of the invention as viewed from diagonally front left side.
Figure 32:
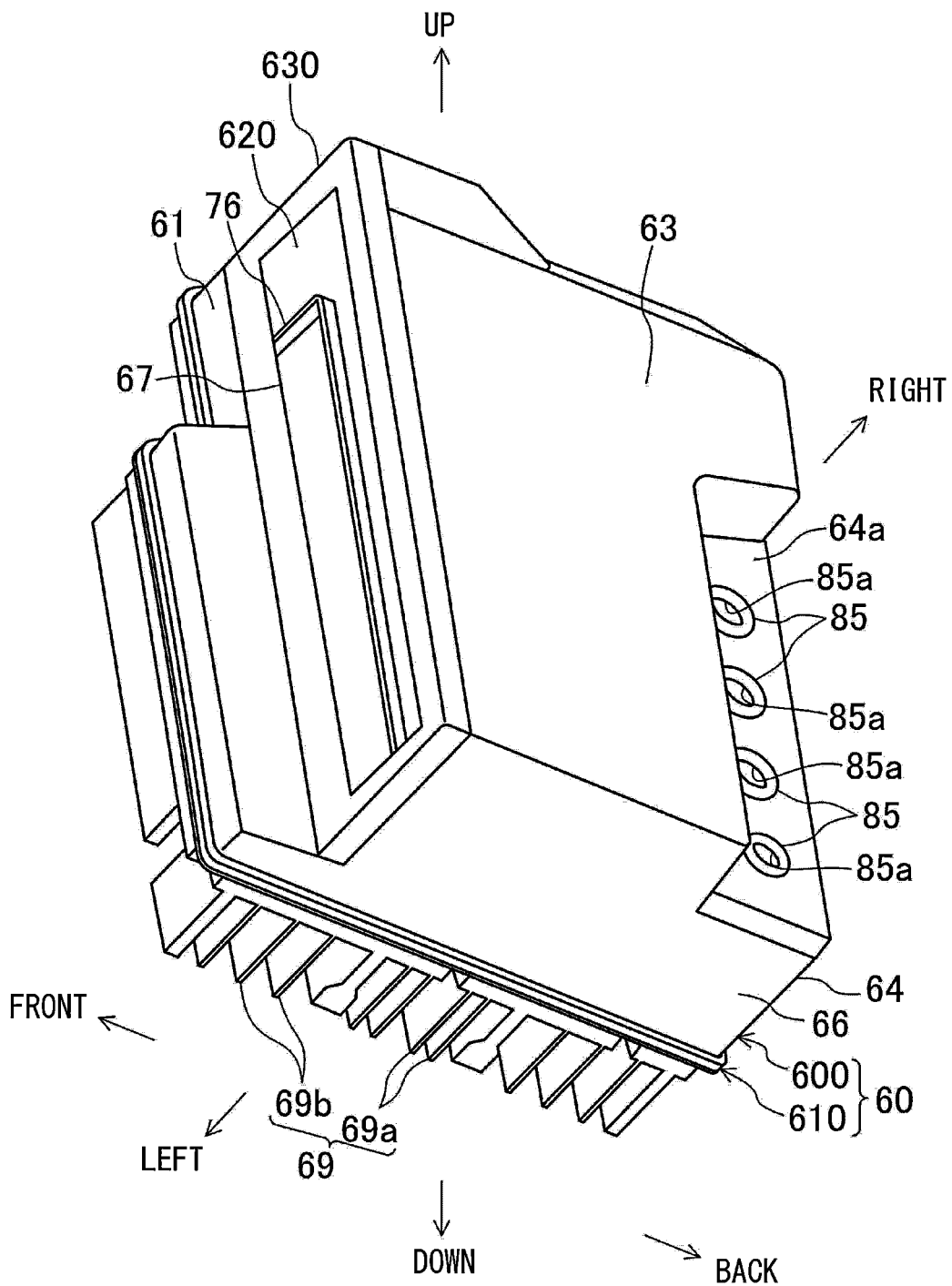
FIG. 32 is a perspective view of a code reader according to the fifth example of the embodiment of the invention as viewed from below.

In addition, FIGS. 30 to 32 are views illustrating an appearance of the code reader 1 according to the embodiment of the fifth example. In the following description according to the fifth example, the same members as those in the above embodiment will be denoted by the same reference numerals, description thereof will be omitted, and different portions will be described in detail.

The housing 60 according to the fifth example includes a box-shaped case 600 constituting a part of the housing 60 and a lid-shaped case 610 constituting another part of the housing 60, and the box-shaped case 600 and the lid-shaped case 610 are integrated to form the housing 60. The lid-shaped case 610 is a first housing constituent member, and the box-shaped case 600 is a second housing constituent member.

The box-shaped case 600 is a member constituting the first side surface 61, the third side surface 63, the fourth side surface 64, the upper surface 65, and the lower surface 66, and is made of resin formed by molding a resin material. The box-shaped case 600 is a member constituting a portion other than the second side surface 62, and thus has a shape in which the second side surface 62 side is opened. The lid-shaped case 610 is a member constituting the second side surface 62 and is made of metal. Examples of the metal material constituting the lid-shaped case 610 include a metal material having a high heat transfer coefficient such as an aluminum alloy. Therefore, the lid-shaped case 610 is more excellent in heat dissipation than the box-shaped case 600. On the other hand, the resin material constituting the box-shaped case 600 is inferior in heat dissipation to the metal material constituting the lid-shaped case 610, but has a low specific gravity. Therefore, it is possible to reduce the weight of the box-shaped case 600.

Figure 33:
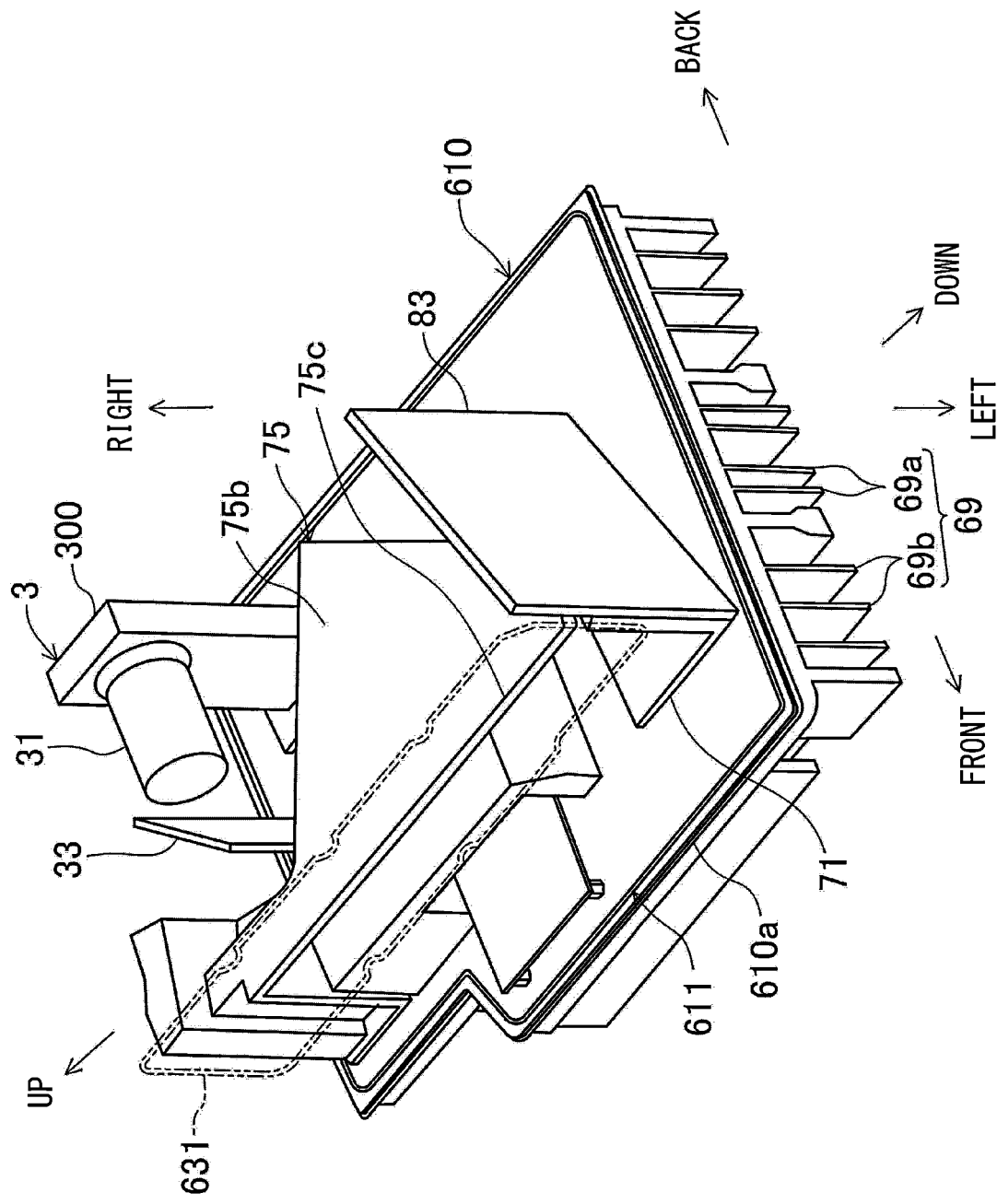
FIG. 33 is a perspective view of a state in which a box-shaped case according to the fifth example is removed as viewed from the lower right.
Figure 34:
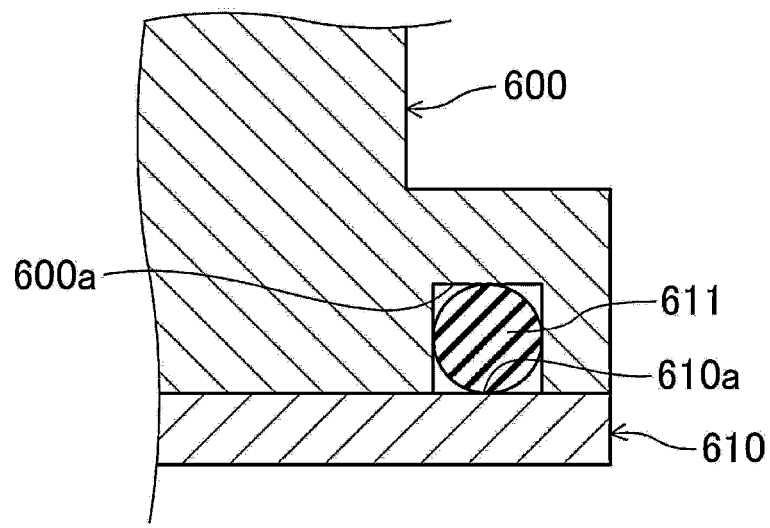
FIG. 34 is an enlarged cross-sectional view of a mating portion between a box-shaped case and a lid-shaped case according to the fifth example.

The lid-shaped case 610 is attached to the box-shaped case 600 so as to cover the opened portion of the box-shaped case 600. FIG. 33 illustrates a state in which the box-shaped case 600 is removed, and as illustrated in this drawing, a main packing 611 made of an elastic material made of, for example, rubber, thermoplastic elastomer, or the like is disposed on a joint surface 610*a* with the box-shaped case 600 in the lid-shaped case 610. The main packing 611 is formed in an annular shape along the peripheral edge portion of the lid-shaped case 610, and is held in a state of being stored in a groove 600*a* formed in the box-shaped case 600 as illustrated in FIG. 34. Since the groove 600*a* of the box-shaped case 600 is a portion for storing the annular main packing 611, the groove has an annular shape similarly to the main packing 611 and is opened to the lid-shaped case 610 side. Further, although not illustrated, the groove for storing the main packing 611 may be formed in the lid-shaped case 610.

The main packing 611 stored in the groove 600*a* is in close contact with the joint surface 610*a* of the lid-shaped case 610 in a state where the lid-shaped case 610 is integrated with the box-shaped case 600. As a result, a space between the box-shaped case 600 and the lid-shaped case 610 is sealed by the main packing 611, and external water or the like does not enter the inside of the housing 60.

As illustrated in FIGS. 30 to 32, a transmission window 620 that transmits light such as reflected light from the workpiece W and illumination light from the illumination section 2 is provided on the first side surface 61 of the box-shaped case 600. A longitudinal direction of the first side surface 61 is an up-down direction of the housing 60, and a longitudinal direction of the first side surface 61 is a first direction. The transmission window 620 has a long shape along the first direction. The transmission window 620 is not particularly limited, but is made of, for example, acrylic, glass, polycarbonate, or the like.

A window frame 630 for fixing the transmission window 620 to the first side surface 61 of the box-shaped case 600 is provided on the first side surface 61 of the box-shaped case 600. The window frame 630 has a rectangular shape that is long in the up-down direction so as to correspond to the outer shape of the transmission window 620.

Figure 35:
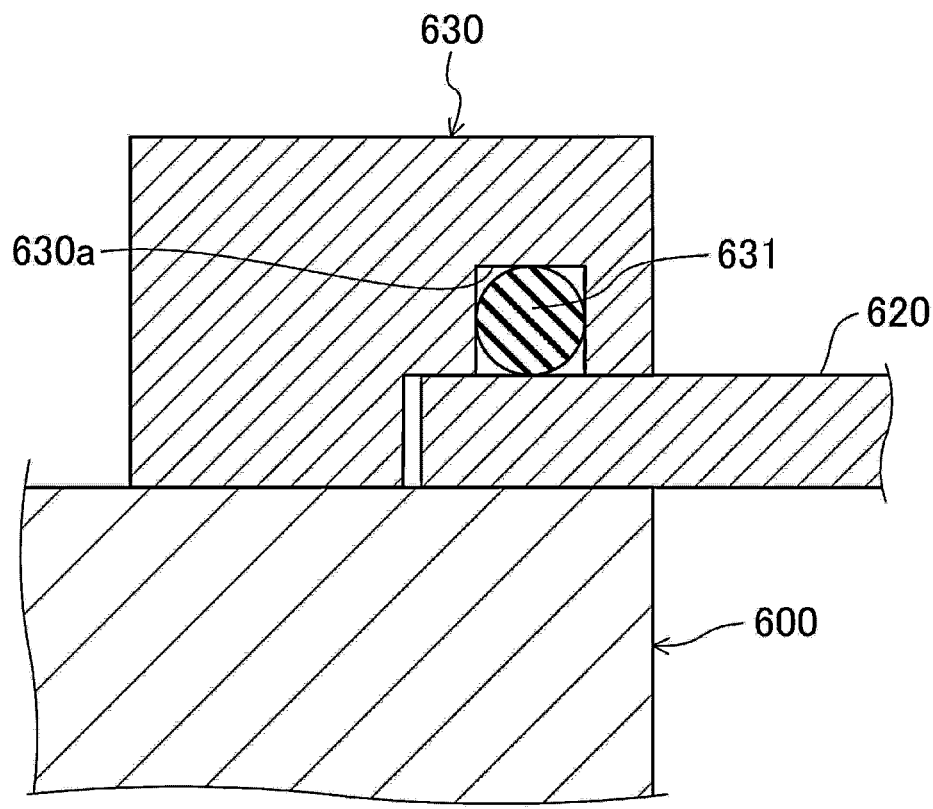
FIG. 35 is an enlarged cross-sectional view of the mating portion between the box-shaped case and the window frame according to the fifth example.

A window frame packing 631 (illustrated by a virtual line in FIG. 33) made of the same material as the main packing 611 is disposed on a joint surface (not illustrated) of the window frame 630 with the box-shaped case 600. The window frame packing 631 is annularly formed along a peripheral edge portion of the window frame 630, and is held in a state of being stored in a groove 630*a* formed in the window frame 630 as illustrated in FIG. 35. Since the groove 630*a* of the window frame 630 is a portion that stores the annular window frame packing 631, the groove has an annular shape similarly to the window frame packing 631 and is opened toward the box-shaped case 600 side. Further, although not illustrated, the groove for storing the window frame packing 631 may be formed in the box-shaped case 600.

The window frame packing 631 stored in the groove 630*a* is in close contact with the outer surface of the transmission window 620 in a state where the window frame 630 is integrated with the box-shaped case 600. As a result, a space between the transmission window 620 and the window frame 630 is sealed by the window frame packing 631, and external water or the like does not enter the inside of the housing 60 from the window frame 630.

The first image sensor 30*c* and the second image sensor 30*e* of the imaging unit 3 generate an image corresponding to the image projected on the light receiving surface via the transmission window 620. The first optical system 30*d* and the second optical system 30*f* of the imaging unit 3 are configured to form an optical path that is long along the longitudinal direction of the transmission window 620 and has an optical axis passing through the center of the visual field inclined with respect to the longitudinal direction of the transmission window 620, and project an image corresponding to the code attached to the workpiece W in the housing 60 on each of the light receiving surfaces of the first image sensor 30c and the second image sensor 30e.

In addition, the illumination section 2 is configured to form an illumination light path that is long along the longitudinal direction of the transmission window 620 and in which the optical axis of the illumination light is inclined with respect to the longitudinal direction of the transmission window 620. As a result, the optical path of the illumination light emitted from the illumination section 2 and the optical path of the imaging unit 3 can be made to correspond to each other.

As illustrated in FIG. 30, the transmission window 620 includes a first region 620a that transmits the illumination light emitted from the illumination section 2 to the outside of the housing 60, and a second region 620b that transmits the reflected light from the code attached to the workpiece W to the inside of the housing 60. That is, since the illumination section 2 is disposed so as to correspond to the left region of the transmission window 620 when the left-right direction of the transmission window 620 is set as a reference, the illumination light emitted from the illumination section 2 is transmitted through the left region of the transmission window 620. A left region of the transmission window 620 is the first region 620a so as to correspond to the arrangement position of the illumination section 2. On the other hand, the reflected light from the code is transmitted through the right region on the opposite side of the illumination light with respect to the left-right direction of the transmission window 620. The right region of the transmission window 620 is the second region 620b so as to correspond to the transmission region of the reflected light from the code. Since the first region 620a and the second region 620b are provided in one transmission window 620 as described above, the number of components is reduced as compared with a case where separate window members are provided on the light projecting side and the light receiving side.

Figure 36:
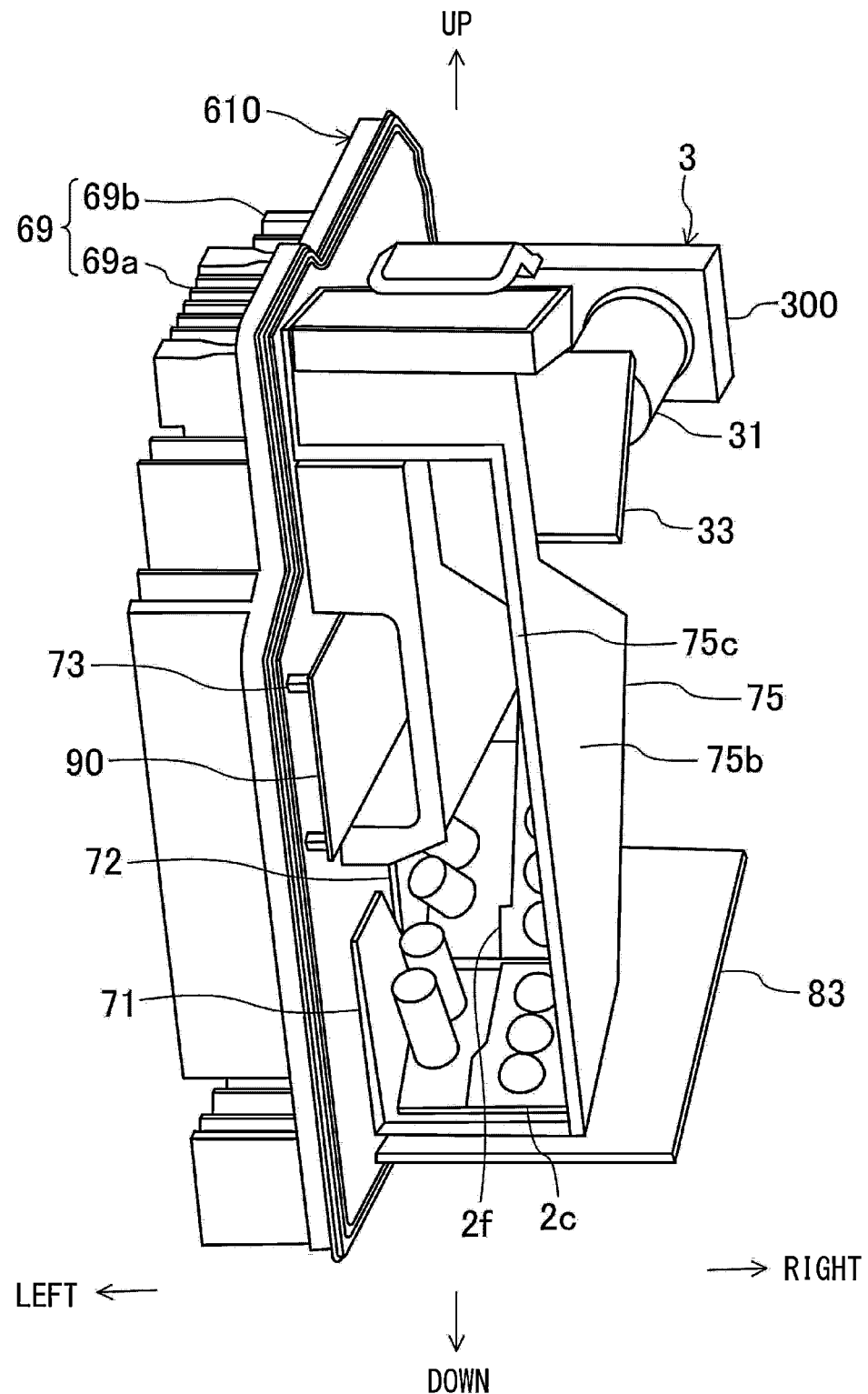
FIG. 36 is a perspective view of a state in which the box-shaped case according to the fifth example is removed as viewed from the front upper side.

As illustrated in FIGS. 33 and 36, a partition member (light shielding member) 75 is provided inside the housing 60. The partition member 75 is a member for suppressing the illumination light emitted from the illumination section 2 from entering the optical system 31 of the imaging unit 3, and is formed so as to surround the illumination section 2. A front portion 75c of the partition member 75 is formed so as to approach the inner surface of the transmission window 620. An elastic material 76 (illustrated in FIG. 30) having a light shielding property is interposed between the front portion 75c of the partition member 75 and the inner surface of the transmission window 620. The elastic material 76 is made of, for example, a sponge material, and extends along the front portion 75c of the partition member 75. By attaching the elastic material 76 in close contact with the inner surface of the transmission window 620, it is possible to suppress the illumination light emitted from the illumination section 2 from entering the optical system 31 of the imaging unit 3 through the vicinity of the inner surface of the transmission window 620.

As illustrated in FIG. 31, a plurality of heat dissipation fins 69 extending in the up-down direction (predetermined direction) is provided on the second side surface 62 side of the lid-shaped case 610. Since the longitudinal direction of the transmission window 620 is the up-down direction, the longitudinal direction of the heat dissipation fin 69 coincides with the longitudinal direction of the transmission window 620. The plurality of heat dissipation fins 69 are formed at intervals in the depth direction (width direction) of the housing 60. The heat dissipation fin 69 is made of the same material as the portion constituting the second side surface 62, and thus has a high heat transfer coefficient.

Figure 37:
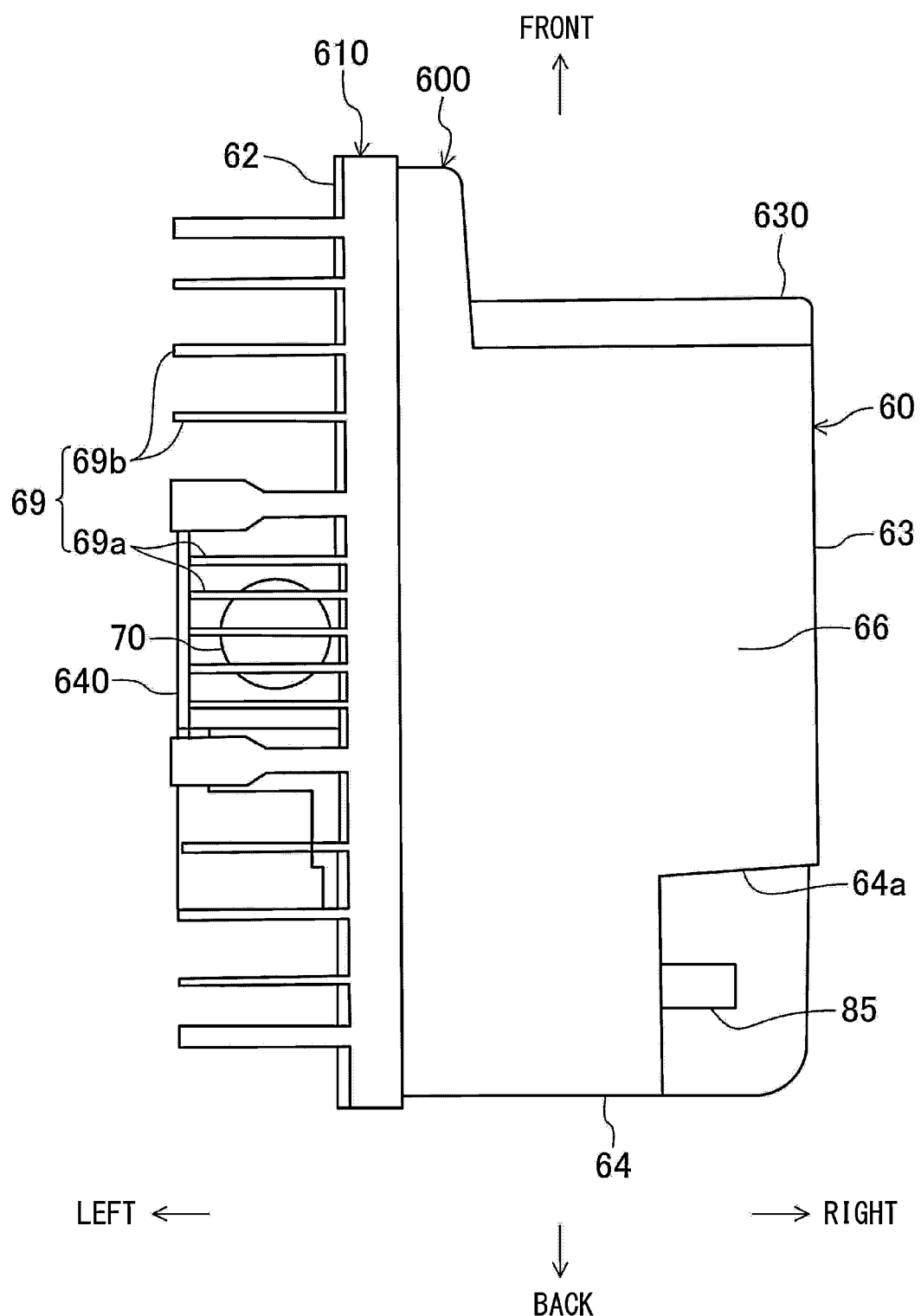
FIG. 37 is a bottom view of the code reader according to the fifth example.

As illustrated in FIGS. 31 and 37, the housing 60 is provided with a cover portion 640 that covers the tip portions of the plurality of heat dissipation fins 69. Since the cover portion 640 covers the tip portions of the plurality of heat dissipation fins 69, an air passage extending along the longitudinal direction of the transmission window 620 is formed by the second side surface 62 of the housing 60, a space between the plurality of heat dissipation fins 69, and the cover portion 640.

The code reader 1 includes a fan 70 for blowing air in the longitudinal direction of the heat dissipation fin 69. The heat dissipation fin 69 includes a plurality of first heat dissipation fins 69a provided so as to correspond to the air passage through which the air blown by the fan 70 flows, and a plurality of second heat dissipation fins 69b provided so as to be positioned outside the air passage through which the air blown by the fan 70 flows. Specifically, among the plurality of heat dissipation fins 69 arranged in the depth direction of the housing 60, the plurality of heat dissipation fins located at the center in the arrangement direction are the first heat dissipation fins 69a. An air passage extending in the up-down direction is formed between the first heat dissipation fins 69a, and the fan 70 is disposed in the air passage between the first heat dissipation fins 69a. In addition, among the plurality of heat dissipation fins 69 arranged in the depth direction of the housing 60, the plurality of heat dissipation fins on the front side and the plurality of heat dissipation fins on the back side are the second heat dissipation fins 69b. In this embodiment, the interval between the plurality of first heat dissipation fins 69a is set to be narrower than the interval between the plurality of second heat dissipation fins 69b. That is, since the interval between the heat dissipation fins 69a located in the portion forcibly blown by the fan 70 is relatively narrow, the heat dissipation efficiency to the air can be enhanced. Since the tip portion of the second heat dissipation fin 69b is not covered by the cover portion 640 and is open, heat dissipation from the second heat dissipation fin 69b can be promoted using natural convection of air. Further, the interval between the first heat dissipation fins 69a and the interval between the plurality of second heat dissipation fins 69b may be the same. The interval between the heat dissipation fins can also be referred to as a fin pitch.

The heat dissipation fins 69 are discontinuous in the longitudinal direction of the heat dissipation fins 69. Specifically, a cutout portion 69c is formed by cutting out a middle portion of the heat dissipation fin 69 in the longitudinal direction. As a result, since the heat dissipation fins 69 are provided intermittently in the up-down direction, for example, even if the air passage is closed by the lower end portion of the heat dissipation fin 69 being in close contact with some member, the air blown into the air passage can flee to the outside from the cutout portion 69c, and a decrease in cooling efficiency can be suppressed.

Figure 38:
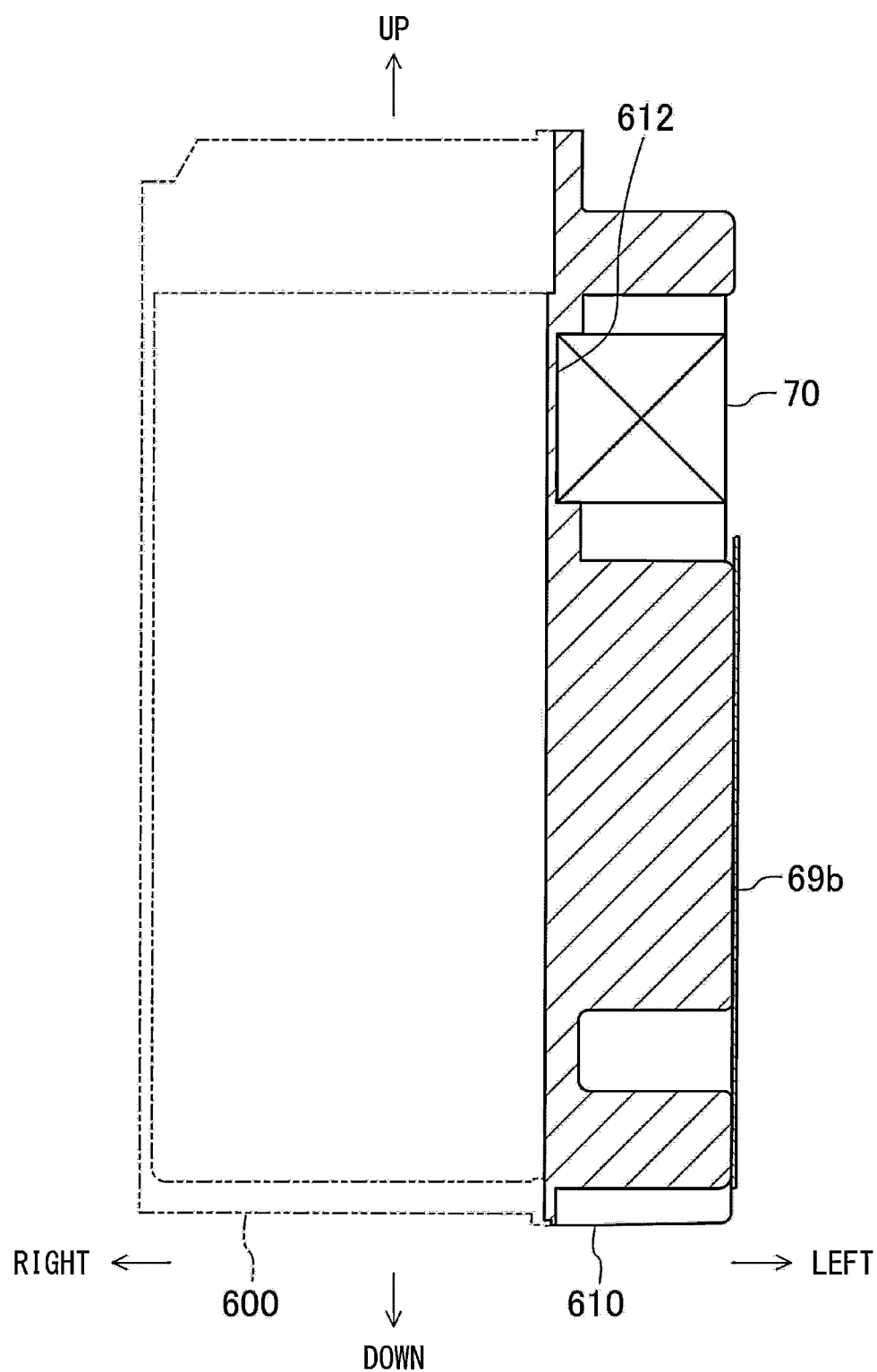
FIG. 38 is a longitudinal cross-sectional view of the lid-shaped case according to the fifth example.
Figure 39:
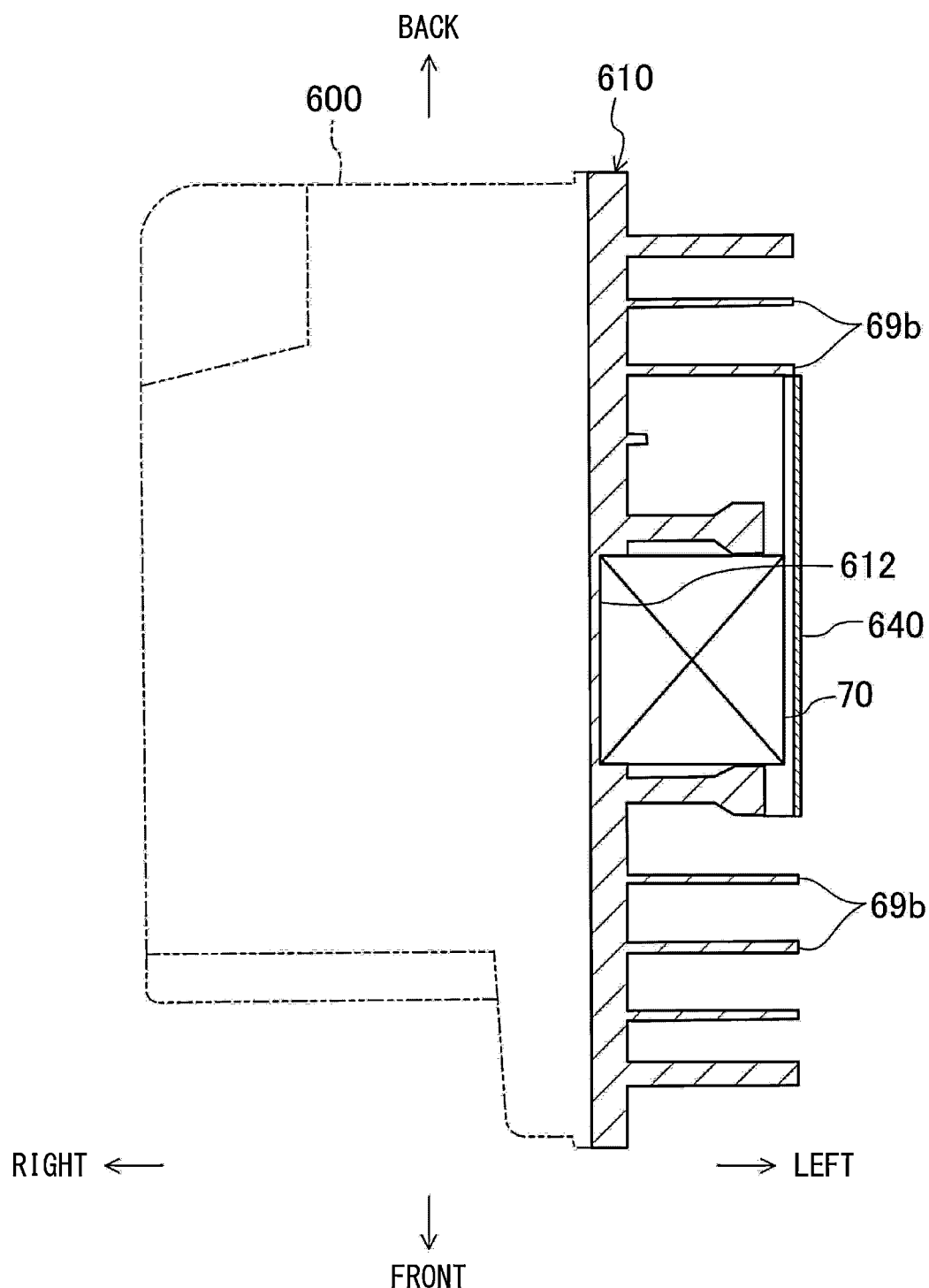
FIG. 39 is a transverse cross-sectional view of the lid-shaped case according to the fifth example.

As illustrated in FIGS. 38 and 39, a fan storing recess 612 is provided in a portion of the lid-shaped case 610 where the fan 70 is disposed. The fan storing recess 612 is formed in a portion constituting the second side surface 62 in the lid-shaped case 610, and is opened to the left side. A part of the fan 70 attached to the lid-shaped case 610 is stored in the fan storing recess 612. As a result, since a part of the fan 70 can be stored in the lid-shaped case 610, it is possible to reduce the protrusion amount of the fan 70 to the left side while adopting the large-diameter fan 70, and as a result, it is possible to shorten the dimension of the code reader 1 in the left-right direction.

As illustrated in FIG. 36, the near light emitting substrate 2c constituting a part of the illumination section 2 is attached to the lid-shaped case 610 via the near-side support member 71 having thermal conductivity. Further, the far light emitting substrate 2f is attached to the lid-shaped case 610 via the far-side support member 72 having thermal conductivity. As a result, the heat of the near light emitting substrate 2c and the far light emitting substrate 2f can flee to the lid-shaped case 610 and be released by the heat dissipation fins 69.

The control board 90 is provided with the control unit 4 (illustrated in FIG. 2). Since the control unit 4 is a portion that executes decoding processing of the code attached to the workpiece W on the basis of the image generated by the image sensor 31b, the temperature rises during operation. The control board 90 provided with the control unit 4 is attached to the lid-shaped case 610 via a board support member 73 having thermal conductivity. As a result, the heat of the control board 90 can also flee to the lid-shaped case 610 and be released by the heat dissipation fins 69.

Figure 40:
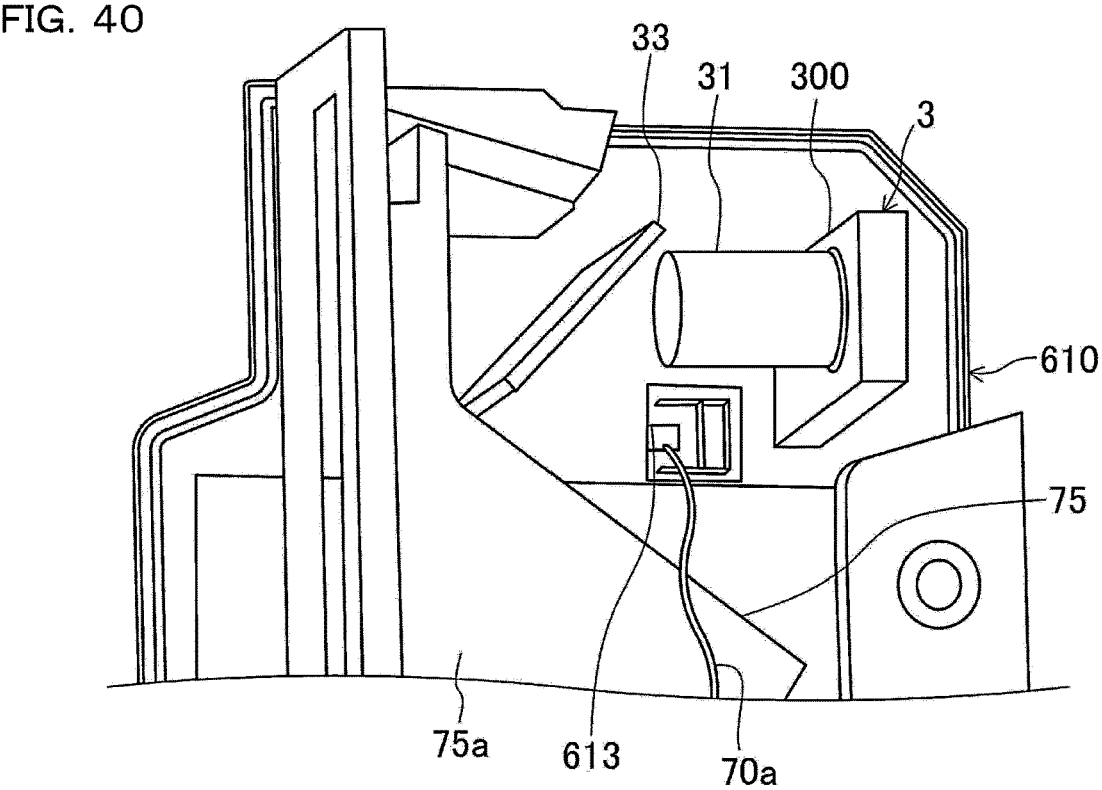
FIG. 40 is a view illustrating an insertion portion of a fan cable according to the fifth example.

FIG. 40 illustrates an insertion portion of a fan cable 70a for supplying electric power to the fan 70. Since the fan cable 70a is connected to a motor (not illustrated) of the fan 70 after extending from the inside to the outside of the housing 60, a hole 613 is formed in the lid-shaped case 610 as an insertion portion for inserting the fan cable 70a. The hole 613 is closed with an adhesive or the like in a state where the fan cable 70a is inserted into the hole 613. As a result, it is possible to suppress the infiltration of water from the hole 613.

Figure 41:
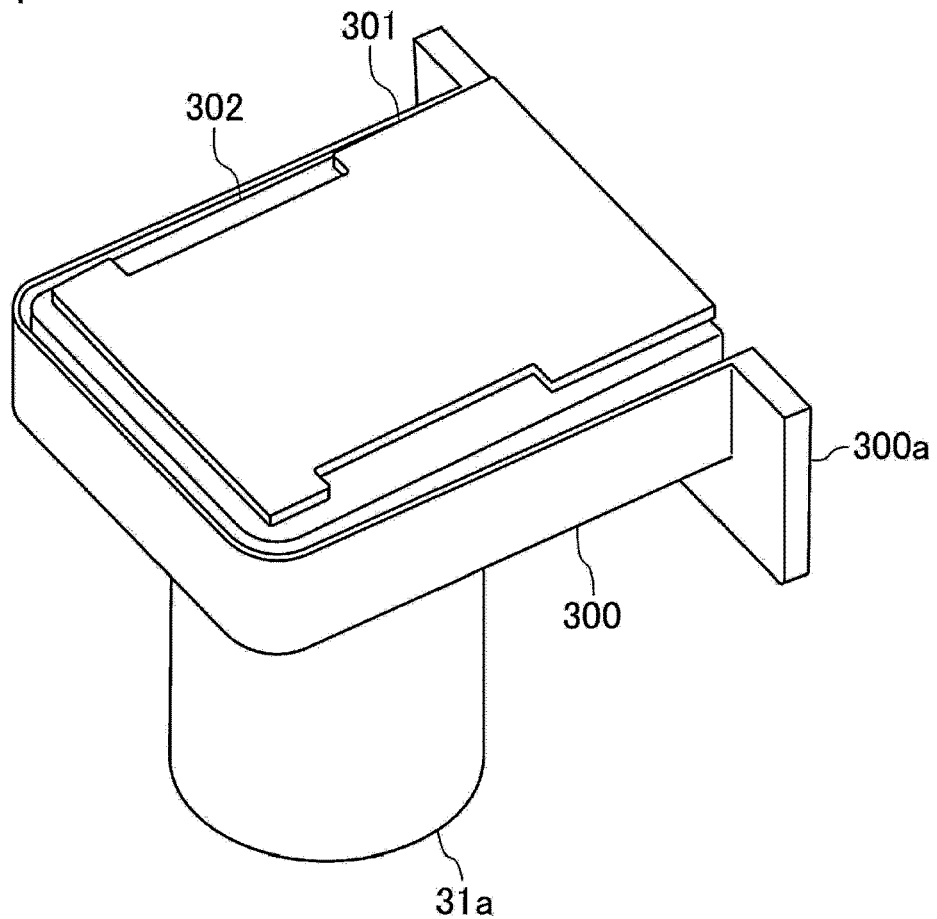
FIG. 41 is a perspective view of a lens holder according to the fifth example.
Figure 42:
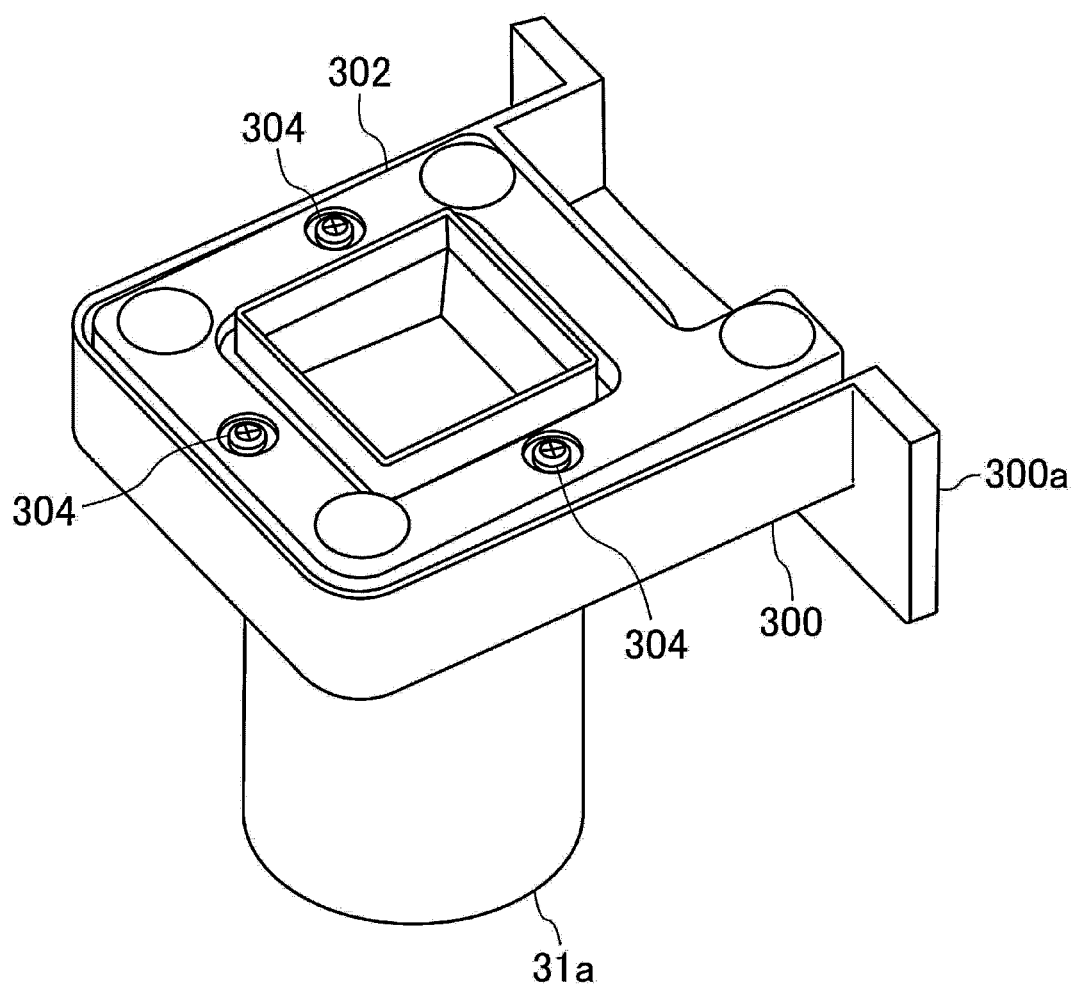
FIG. 42 is a view corresponding to FIG. 41 in a state in which a sensor substrate according to the fifth example is removed.
Figure 43:
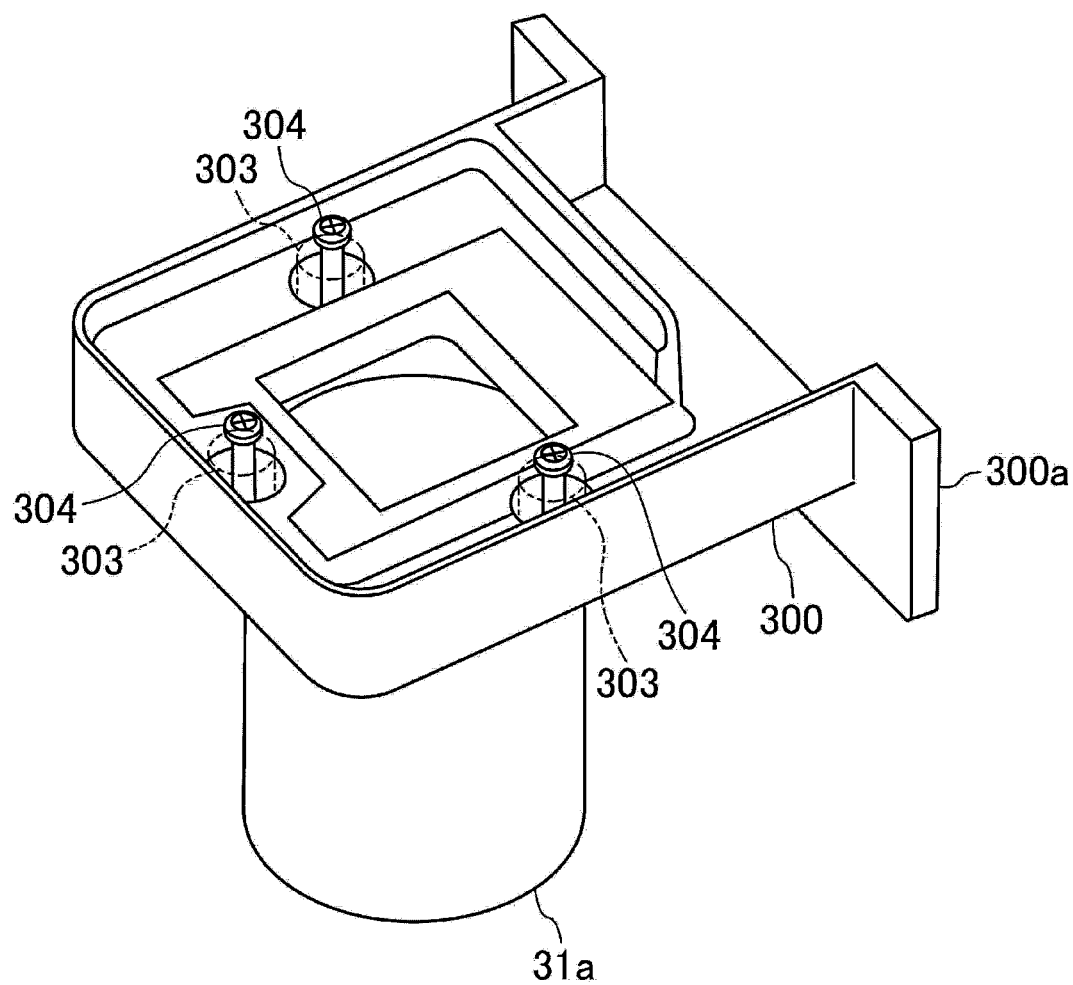
FIG. 43 is a view corresponding to FIG. 41 in a state in which a sensor holder according to the fifth example is removed.

FIGS. 41 to 43 illustrate a lens holder 300 that holds the lens 31a of the imaging unit 3, and the lens holder 300 has a fixing portion 300a fixed to the lid-shaped case 610 and has a tilt adjustment mechanism of the image sensor 31b. Specifically, a sensor substrate 301 as illustrated in FIG. 41 and a sensor holder 302 as illustrated in FIG. 42 are attached to the lens holder 300. The sensor substrate 301 is a member to which the image sensor 31b is fixed. The sensor substrate 301 is fixed to the sensor holder 302.

The plurality of other embodiments described above may be independent from each other, but any plurality of other embodiments among the plurality of other embodiments may be combined with each other.

The invention is not limited to the code reader. For example, a part of the invention can also be applied to a case where a control unit configured not to execute code decoding processing is provided. In this case, the image processing device is an image processing device that processes an image acquired by capturing an image of the workpiece W conveyed by the conveyance device B, and the control unit is a part that executes various types of image processing. Examples of the various types of image processing include OCR processing and image inspection processing.

A problem different from the above problem will be described. That is, the code reader of US 2013/0292470 A is installed directly below the gap between the conveyors arranged in the conveyance direction. The code reader of US 2013/0292470 A is incorporated into a housing of a checkout system used in retail stores and supermarkets, so that sufficient space is easily provided immediately below the gap of the conveyor. On the other hand, since the installation situation of the conveyor at the distribution site or the like varies depending on the situation of each site, there may be a case where it is difficult to secure a space for installing the code reader immediately below the gap of the conveyor as in US 2013/0292470 A, and it is difficult to install the code reader.

It is conceivable to install the code reader on the side of the conveyance device and below the conveyance surface, but as illustrated in FIG. 25, since the gap of the conveyance device is captured obliquely upward from the side of the conveyance device B, when the depth of field 92 is formed symmetrically with respect to the lens optical axis 91, it is difficult to sufficiently include the longitudinal direction of the gap of the conveyance device B in the depth of field 92. Therefore, the code reader 100 cannot read the code depending on the position to which the code is attached on the bottom surface of the workpiece W.

Therefore, it is conceivable to use a Scheimpflug optical system in which a depth of field is asymmetrically formed on the lens optical axis. Although a code reader having a Scheimpflug optical system is known as disclosed in U.S. Pat. No. 6,783,068, it is assumed that a code attached to an upper surface or a side surface of a workpiece is read from above a conveyance surface, and it is not assumed that a code attached to a bottom surface of a workpiece is read from a side of a conveyance device and below the conveyance surface.

Even if it is possible to attempt to read the code attached to the bottom surface of the workpiece from the side of the conveyance device and below the conveyance surface using the code reader of U.S. Pat. No. 6,783,068, since the range in which the Scheimpflug optical system is focused is asymmetric with respect to the lens optical axis, it is difficult to understand how much the depth of field is inclined with respect to the code reader as compared with the code reader in which the depth of field is formed symmetrically with respect to the lens optical axis as illustrated in FIG. 25. Therefore, it is not easy to install the code reader having the Scheimpflug optical system by adjusting the attitude and position of the housing so that the longitudinal direction of the gap of the conveyance device is focused.

In view of such, further features of embodiments of the invention are defined in the following numbered clauses. Accordingly, it is possible to facilitate installation of the code reader capable of reading the code attached to the bottom surface of the workpiece from the side of the conveyance device and from below the conveyance surface.

[Clause A1]

A code reader capable of reading a code attached to a bottom surface of a workpiece conveyed by a conveyance device having a plurality of conveyance mechanisms provided with a gap in a conveyance direction from a side of the conveyance device and below a horizontal conveyance surface through the gap, the code reader including:

an imaging unit including a Scheimpflug optical system including a lens that condenses reflected light from a bottom surface of the workpiece and an image sensor including a light receiving surface inclined with respect to an optical axis of the lens, and configured to generate and output an image on the basis of an amount of light received by the light receiving surface; and a control unit configured to execute decoding processing on the code attached to the workpiece on the basis of an image output from the imaging unit; and a housing that stores the imaging unit and the control unit and has a first side surface provided with a light receiving window that transmits the reflected light and an attachment surface different from the first side surface and provided with an attachment structure, in which when the housing is installed on an external horizontal or vertical fixing surface located on a side of the conveyance device and below the conveyance surface via the attachment surface, the Scheimpflug optical system of the imaging unit forms a depth of field extending in a longitudinal direction of the gap.

[Clause A2]

The code reader according to Clause A1, in which a plane formed by the light receiving window intersects a horizontal plane when the housing is installed on the external horizontal or vertical fixing surface located on a side of the conveyance device and below the conveyance surface via the attachment structure.

[Clause A3]

The code reader according to Clause A1, in which the imaging unit outputs a plurality of images in which a part of a code attached to a bottom surface of the workpiece is captured by continuously capturing a bottom surface of the workpiece exposed from the gap of the conveyance device and included in the depth of field, and the control unit generates a composite image on the basis of the plurality of images output from the imaging unit, and executes decoding processing on a code attached to a bottom surface of the workpiece on the basis of the composite image.

[Clause A4]

The code reader according to Clause A3, in which the control unit performs geometric correction on each of the plurality of images output from the imaging unit, and combines a plurality of processed images on which the geometric correction has been performed to generate the combined image.

[Clause A5]

The code reader according to Clause A4, in which in the plurality of images output from the imaging unit, a bottom surface of the workpiece exposed from the gap is shown in a trapezoidal shape having one end on a near side of the imaging unit as a long side and the other end on a far side of the imaging unit as a short side, and the control unit executes trapezoid correction as the geometric correction on the trapezoid shape of the plurality of images.

[Clause A6]

The code reader according to Clause A1, in which in a case where the housing is installed in a state in which the light receiving window is aligned so as to face a longitudinal direction of the gap of the conveyance device, the imaging unit is configured such that the depth of field of the Scheimpflug optical system extends in a longitudinal direction of the gap of the conveyance device.

[Clause A7]

The code reader according to Clause A6, in which the image sensor includes a plurality of imaging elements arranged in a row direction and a column direction, a row direction of the image sensor corresponds to a longitudinal direction of the gap of the conveyance device, and a column direction of the image sensor corresponds to the conveyance direction of the conveyance device in a state in which the light receiving window is aligned so as to face a longitudinal direction of the gap of the conveyance device, and the image sensor is configured to be able to partially read a signal of an imaging element in a row corresponding to the gap of the conveyance device among the plurality of imaging elements.

[Clause A8]

The code reader according to Clause A1, in which when the housing is installed on an external horizontal or vertical fixing surface located on a side of the conveyance device and below the conveyance surface via the attachment surface, the imaging unit is configured to be capable of directly capturing a bottom surface of the workpiece via the gap.

[Clause A9]

The code reader according to Clause A1, in which the code reader further includes an external reflection member disposed outside the housing, and in a case where the housing is installed such that an optical axis of the lens inside the housing is substantially parallel to the conveyance direction in top view, an optical axis of the lens outside the housing is turned back in a direction substantially parallel to a longitudinal direction of the gap of the conveyance device by the external reflection member in top view, whereby the imaging unit is configured to be able to captures a bottom surface of the workpiece via the external reflection member.

[Clause A10]

The code reader according to Clause A2, in which an angle formed by a plane formed by the light receiving window and the horizontal plane is 45 degrees or more.

[Clause A11]

A code reading method for reading a code attached to a bottom surface of a workpiece conveyed by a conveyance device having a plurality of conveyance mechanisms provided with a gap in a conveyance direction through the gap from a side of the conveyance device and below a conveyance surface by using a code reader including an imaging unit having a Scheimpflug optical system, a control unit that decodes an image output from the imaging unit, and a housing that stores the imaging unit and the control unit and has a first side surface provided with a light receiving window and an attachment surface different from the first side surface provided with an attachment structure, the code reading method comprising:

installing the housing on an external horizontal or vertical fixing surface located on a side of the conveyance device and below the conveyance surface via the attachment surface;

capturing, by the Scheimpflug optical system of the imaging unit, an image of a code attached to a bottom surface of the workpiece positioned in a depth of field formed to extend in a longitudinal direction of the gap; and executing, by the control unit, decoding processing on the code on the basis of an image in which the code located in the depth of field is captured.

Furthermore, a problem different from the above problem will be described. That is, the code reader of US 2013/0292470 A is installed directly below the gap between the conveyors arranged in the conveyance direction. The code reader of US 2013/0292470 A is incorporated into a housing of a checkout system used in retail stores and supermarkets, so that sufficient space is easily provided immediately below the gap of the conveyor. On the other hand, since the installation situation of the conveyor at the distribution site or the like varies depending on the situation of each site, there may be a case where it is difficult to secure a space for installing the code reader immediately below the gap of the conveyor as in US 2013/0292470 A, and it is difficult to install the code reader.

It is conceivable to install the code reader on the side of the conveyance device and below the conveyance surface, but as illustrated in FIG. 25, since the gap of the conveyance device is captured obliquely upward from the side of the conveyance device B, when the depth of field 92 is formed symmetrically with respect to the lens optical axis 91, it is difficult to sufficiently include the longitudinal direction of the gap of the conveyance device B in the depth of field 92. Therefore, the code reader 100 cannot read the code depending on the position to which the code is attached on the bottom surface of the workpiece W.

In view of such, further features of embodiments of the invention are defined in the following numbered clauses. Accordingly, the code reader capable of reading the code attached to the bottom surface of the workpiece from the side of the conveyance device and from below the conveyance surface is installed with ease.

[Clause B1]

A code reader that reads a code attached to a workpiece conveyed by a conveyance device, the code reader including:
- a housing that transmits light and is provided with a transmission window having a long side and a short side;
- an imaging unit including an image sensor that has a two-dimensional light receiving surface forming a predetermined visual field and generates an image data corresponding to an image projected on the light receiving surface via the transmission window, and an optical system in which an optical axis passing through a center of the visual field is inclined with respect to a direction of the long side, an optical path that is longer in a direction of the long side than in a direction of the short side is formed, and an image corresponding to a code attached to the workpiece in the housing is projected on the light receiving surface of the image sensor; and
- a control unit that executes decoding processing of a code attached to the workpiece on the basis of an image generated by the image sensor, in which
- the imaging unit includes the optical system or the plurality of image sensors for expanding a visual field or a depth in a depth direction orthogonal to a plane that the transmission window forms in the visual field.

[Clause B2]

The code reader according to Clause B1, further including:
- an illumination section that irradiates a workpiece with illumination light, in which
- the illumination section forms an illumination optical path in which an optical axis of the illumination light is inclined with respect to a direction of the long side and which is longer in a direction of the long side than in a direction of the short side.

[Clause B3]

The code reader according to Clause B2, in which
the transmission window includes a first region that transmits illumination light emitted from the illumination section to an outside of the housing, and a second region that transmits reflected light from a code attached to the workpiece to an inside of the housing.

[Clause B4]

The code reader according to Clause B2, in which
a light shielding member that prevents illumination light emitted from the illumination section from entering the optical system of the imaging unit is provided inside the housing.

[Clause B5]

The code reader according to Clause B4, in which
the light shielding member is formed so as to surround the illumination section.

[Clause B6]

The code reader according to Clause B5, in which
an elastic material having a light shielding property is interposed between an inner surface of the transmission window and the light shielding member.

[Clause B7]

The code reader according to Clause B2, in which
at least a part of the housing is formed of a first housing constituent member made of metal and having a heat dissipation fin extending in a predetermined direction, and
the illumination section is attached to the first housing constituent member via a member having heat transfer property.

[Clause B8]

The code reader according to Clause B2, in which
at least a part of the housing is formed of a first housing constituent member made of metal and having a heat dissipation fin extending in a predetermined direction, and
a control board provided with the control unit is attached to the first housing constituent member via a member having heat transfer property.

[Clause B9]

The code reader according to Clause B7, in which
a part of the housing is formed of the first housing constituent member,
another part of the housing is formed of a second housing constituent member made of resin, and
the first housing constituent member and the second housing constituent member are integrated.

[Clause B10]

The code reader according to Clause B7, in which
on one side surface of the housing, a plurality of the heat dissipation fins are formed to extend along a direction of the long side of the transmission window and to be spaced apart from each other in a width direction of the housing, and
a cover portion that covers tip portions of the plurality of heat dissipation fins is provided, and
an air passage extending along a direction of the long side of the transmission window is formed by one side surface of the housing, a space between the plurality of heat dissipation fins, and the cover portion.

[Clause B11]

The code reader according to Clause B7, in which
the heat dissipation fins are discontinuous in a longitudinal direction of the heat dissipation fins.

[Clause B12]

The code reader of Clause B10, further including:
a fan that blows air in a longitudinal direction of the heat dissipation fin, in which
the heat dissipation fin includes a plurality of first heat dissipation fins provided so as to correspond to an air passage through which air blown by the fan flows, and a plurality of second heat dissipation fins provided so as to be positioned outside the air passage through which air blown by the fan flows, and an interval between the plurality of first heat dissipation fins is set to be narrower than an interval between the plurality of second heat dissipation fins.

[Clause B13]

The code reader according to Clause B1, further including:
a near illumination section having an optical axis that intersects a focal plane on a near side with respect to a far side of the focal plane formed by the optical system to extend from the near side to the far side of the imaging unit; and a far illumination section having an optical axis that intersects the focal plane on the far side with respect to the near side of the focal plane, in which
a region where illumination light of the near illumination section and illumination light of the far illumination section overlap each other in the focal plane is unevenly distributed on the far side rather than the near side.

[Clause B14]

The code reader according to Clause B1, further including:
a near illumination section having an optical axis that intersects a focal plane on the near side with respect to the far side of the focal plane formed by the optical system to extend from the near side to the far side of the imaging unit; and
a far illumination section having an optical axis that intersects the focal plane on the far side with respect to the near side of the focal plane, in which
a light flux of the far illumination section is larger than a light flux of the near illumination section.

[Clause B15]

The code reader according to Clause B1, in which
the imaging unit includes a near imaging unit that captures a near side and a far imaging unit that captures a far side, and
the code reader further includes a light amount reducing member configured to reduce a light amount difference from a light amount incident on the image sensor of the far imaging unit by reducing a light amount incident on the image sensor of the near imaging unit.

[Clause B16]

The code reader of Clause B15, in which
the light amount reducing member includes a light reducing filter provided in the optical system of the near imaging unit.

[Clause B17]

The code reader of Clause B15, in which
the light amount reducing member includes a light reducing filter provided in a portion corresponding to an optical path of the near imaging unit of the transmission window.

[Clause B18]

The code reader according to Clause B1, in which
the imaging unit outputs a plurality of images in which a part of a code attached to a bottom surface of the workpiece is captured by continuously capturing the bottom surface of the workpiece exposed from a gap provided in a conveyance direction of the conveyance device, and
the control unit generates a composite image on the basis of the plurality of images output from the imaging unit, and executes decoding processing on the code attached to the bottom surface of the workpiece on the basis of the composite image.

[Clause B19]

An image processing device that processes an image acquired by capturing an image of a workpiece conveyed by a conveyance device, the image processing device including:
a housing that transmits light and is provided with a transmission window having a long side and a short side;
an imaging unit including: an image sensor that has a two-dimensional light receiving surface forming a predetermined visual field and generates an image data corresponding to an image projected on the light receiving surface via the transmission window; and an optical system in which an optical axis passing through a center of the visual field is inclined with respect to a direction of the long side, an optical path that is longer in a direction of the long side than in a direction of the short side is formed, and an image corresponding to the workpiece is projected on the light receiving surface of the image sensor in the housing; and
a control unit that executes image processing on the basis of the image generated by the image sensor, in which
the imaging unit includes the optical system or the plurality of image sensors for expanding a visual field or a depth in a depth direction orthogonal to a plane that the transmission window forms in the visual field.

As described above, the code reader according to the disclosure can be used, for example, in the case of reading a code attached to a workpiece.

What is claimed is:

1. A code reader that reads a code attached to a workpiece conveyed by a conveyance device, the code reader comprising:
an illumination section that irradiates the workpiece with illumination light;
an imaging unit that includes a Scheimpflug optical system including a lens for condensing reflected light from the code attached to the workpiece and an image sensor having a light receiving surface inclined with respect to an optical axis of the lens, and that generates and outputs an image based on an amount of light received by the light receiving surface;
a control unit that executes decoding processing on the code attached to the workpiece based on an image output from the imaging unit; and
a housing that stores the illumination section, the imaging unit, and the control unit, and has a light receiving window for transmitting the reflected light to an inside, wherein
the light receiving window is provided on a first side surface of the housing and has a short side extending in a lateral direction and a long side, longer than the short side, extending in a longitudinal direction,
a plane formed by the light receiving window intersects a plane including a focal plane formed by the Scheimpflug optical system so as to extend from a near side to a far side of the imaging unit, and
the illumination section is disposed adjacent to the light receiving window in the lateral direction when viewed in a direction facing the light receiving window.

2. The code reader according to claim 1, wherein
the illumination section includes a near illumination section having an optical axis that intersects the focal plane on the near side with respect to the far side of the focal plane and a far illumination section having an optical axis that intersects with the focal plane on the far side with respect to the near side of the focal plane, and a region where illumination light of the near illumination section and illumination light of the far illumination section overlap each other on the focal plane is unevenly distributed on the far side rather than the near side.

3. The code reader according to claim 2, wherein an angle of an optical axis of the near illumination section with respect to the focal plane is larger than an angle of an optical axis of the far illumination section with respect to the focal plane, the near illumination section and the far illumination section are arranged adjacent to each other in an inward direction of the housing from the first side surface, and the near illumination section is arranged on the first side surface side.

4. The code reader according to claim 3, wherein
the housing further includes a lower surface adjacent to the first side surface,
an inclination angle of a far light emitting substrate of the far illumination section with respect to the lower surface is larger than an inclination angle of a near light emitting substrate of the near illumination section with respect to the lower surface, and
the far light emitting substrate is disposed above the near light emitting substrate with reference to the lower surface.

5. The code reader according to claim 1, wherein
the illumination section includes a near illumination section having an optical axis that intersects the focal plane on the near side with respect to the far side of the focal plane and a far illumination section having an optical axis that intersects the focal plane on the far side with respect to the near side of the focal plane, and
a light flux of the far illumination section is larger than a light flux of the near illumination section.

6. The code reader according to claim 5, wherein an angle of an optical axis of the near illumination section with respect to the focal plane is larger than an angle of an optical axis of the far illumination section with respect to the focal plane, the near illumination section and the far illumination section are arranged adjacent to each other in an inward direction of the housing from the first side surface, and the near illumination section is arranged on a first side surface side.

7. The code reader according to claim 6, wherein
the housing further includes a lower surface adjacent to the first side surface,
an inclination angle of a far light emitting substrate of the far illumination section with respect to the lower surface is larger than an inclination angle of a near light emitting substrate of the near illumination section with respect to the lower surface, and
the far light emitting substrate is disposed above the near light emitting substrate with reference to the lower surface.

8. The code reader according to claim 1, wherein the housing further includes a partition member that is disposed between the illumination section and the imaging unit and optically separates the illumination section from the imaging unit.

9. The code reader according to claim 1, further comprising
a heat dissipation portion, wherein
the heat dissipation portion is provided adjacent to the illumination section of the housing, is thermally connected to the illumination section, is adjacent to the first side surface of the housing, and is disposed on a second side surface having a larger area than the first side surface,
the illumination section includes a light emitting substrate on which one or more light emitting elements are disposed,
the code reader further comprises a support member that supports the light emitting substrate, extends in a direction intersecting the second side surface, and has thermal conductivity, and
the support member is thermally connected to the light emitting substrate and the heat dissipation portion.

10. The code reader according to claim 9, further comprising
a control board on which the control unit is provided, wherein
the control board is disposed on an inner wall of the housing on a second side surface side, and
the heat dissipation portion is thermally connected to the control board.

11. The code reader according to claim 1, further comprising
an internal reflection member that is stored in the housing and turns light incident on the imaging unit, wherein
the imaging unit is disposed near one end in the longitudinal direction in the housing, and
the illumination section and the internal reflection member are disposed near an other end in the longitudinal direction in the housing.

12. The code reader according to claim 11, further comprising
a connector portion connected to an outside, wherein
the illumination section and the internal reflection member are disposed between the light receiving window and the connector portion.

13. The code reader according to claim 1, further comprising
a communication unit that receives a dimension of a gap formed between a plurality of conveyance mechanisms included in the conveyance device and a conveyance speed of the conveyance device, wherein
the control unit determines a frame rate of the imaging unit based on the dimension of the gap and the conveyance speed.

14. The code reader according to claim 1, wherein
the image sensor includes a plurality of imaging elements arranged in a row direction and a column direction, and
the row direction corresponds to a direction from the near side to the far side of a focal plane of the Scheimpflug optical system,
an aspect ratio of the image sensor is smaller than an aspect ratio of the light receiving window, and
the image sensor is configured to partially output a signal from an imaging element in a row corresponding to the light receiving window among the plurality of imaging elements.

* * * * *